United States Patent
Bansal et al.

(10) Patent No.: US 11,082,400 B2
(45) Date of Patent: Aug. 3, 2021

(54) FIREWALL CONFIGURATION VERSIONING

(71) Applicant: Nicira, Inc., Palo Alto, CA (US)

(72) Inventors: Kaushal Bansal, Sunnyvale, CA (US); Uday Masurekar, Sunnyvale, CA (US); Shadab Shah, Sunnyvale, CA (US); James Joseph Stabile, Los Altos, CA (US); Steven Peters, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 401 days.

(21) Appl. No.: 15/386,207

(22) Filed: Dec. 21, 2016

(65) Prior Publication Data

US 2018/0007008 A1 Jan. 4, 2018

Related U.S. Application Data

(60) Provisional application No. 62/356,349, filed on Jun. 29, 2016.

(51) Int. Cl.
*H04L 29/06* (2006.01)
*G06F 12/0813* (2016.01)
*G06F 12/0875* (2016.01)

(52) U.S. Cl.
CPC ...... *H04L 63/0263* (2013.01); *G06F 12/0813* (2013.01); *G06F 12/0875* (2013.01);
(Continued)

(58) Field of Classification Search
CPC ... H04L 63/0263; H04L 63/029; G06F 8/314; G06F 9/06

See application file for complete search history.

(56) References Cited

U.S. PATENT DOCUMENTS 5,581,722 A 12/1996 Welland
5,968,176 A 10/1999 Nessett et al.
(Continued)

FOREIGN PATENT DOCUMENTS

EP 2748750 A1 7/2014
JP 2003188906 A 7/2003
(Continued)

OTHER PUBLICATIONS

Herndon, Joseph, "*FairWarning IP, LLC* v. *Iatric Systems, Inc.* (Fed. Cir. 2016)," Oct. 13, 2016, 3 pages.
(Continued)

*Primary Examiner* — Ellen Tran
(74) *Attorney, Agent, or Firm* — Adeli LLP

(57) ABSTRACT

Some embodiments provide a method for managing firewall protection in a datacenter that includes multiple host machines that each hosts a set of data compute nodes. The method maintains a firewall configuration for the host machines at a network manager of the data center. The firewall configuration includes multiple firewall rules to be enforced at the host machines. The method aggregates a first set of updates to the firewall configuration into a first aggregated update and associates the first aggregated update with a first version number. The method distributes a first host-level firewall configuration update to a first host machine based on the first aggregated update and associates the first host machine with the first version number. The method aggregates a second set of updates to the firewall configuration into a second aggregated update and associates the second aggregated update with a second version number.

20 Claims, 24 Drawing Sheets

(52) U.S. Cl.
CPC .. *H04L 63/0218* (2013.01); *G06F 2212/1052* (2013.01); *G06F 2212/152* (2013.01); *G06F 2212/154* (2013.01); *G06F 2212/60* (2013.01); *G06F 2212/62* (2013.01)

(56) References Cited

U.S. PATENT DOCUMENTS

| | | | |
|---|---|---|---|
| 6,154,775 | A | 11/2000 | Coss et al. |
| 6,219,786 | B1 | 4/2001 | Cunningham et al. |
| 6,496,935 | B1 | 12/2002 | Fink et al. |
| 6,600,744 | B1 | 7/2003 | Carr et al. |
| 6,708,187 | B1 | 3/2004 | Shanumgam et al. |
| 6,880,089 | B1 | 4/2005 | Bommareddy et al. |
| 7,032,022 | B1 | 4/2006 | Shanumgam et al. |
| 7,055,173 | B1 | 5/2006 | Chaganty et al. |
| 7,106,756 | B1 | 9/2006 | Donovan et al. |
| 7,227,842 | B1 | 6/2007 | Ji et al. |
| 7,349,382 | B2 | 3/2008 | Marimuthu et al. |
| 7,657,887 | B2 | 2/2010 | Kothandaraman et al. |
| 7,676,836 | B2 | 3/2010 | Prigent et al. |
| 7,724,740 | B1 | 5/2010 | Wang et al. |
| 7,818,452 | B2 | 10/2010 | Matthews et al. |
| 7,831,826 | B2 | 11/2010 | Koti et al. |
| 7,894,480 | B1 | 2/2011 | Wang et al. |
| 7,948,986 | B1 | 5/2011 | Ghosh et al. |
| 7,954,143 | B2 | 5/2011 | Aaron |
| 8,032,933 | B2 | 10/2011 | Turley et al. |
| 8,190,767 | B1 | 5/2012 | Maufer et al. |
| 8,365,294 | B2 | 1/2013 | Ross |
| 8,578,500 | B2 | 11/2013 | Long |
| 8,621,552 | B1 * | 12/2013 | Lotem ............... H04L 63/0263 709/223 |
| 8,660,129 | B1 | 2/2014 | Brendel et al. |
| 8,813,209 | B2 | 8/2014 | Bhattacharya et al. |
| 8,904,511 | B1 | 12/2014 | O'neill et al. |
| 9,015,823 | B2 | 4/2015 | Koponen et al. |
| 9,047,109 | B1 | 6/2015 | Wang et al. |
| 9,130,901 | B2 | 9/2015 | Lee et al. |
| 9,154,462 | B2 | 10/2015 | Grimes et al. |
| 9,215,210 | B2 | 12/2015 | Raman et al. |
| 9,215,213 | B2 | 12/2015 | Bansal et al. |
| 9,215,214 | B2 | 12/2015 | Bansal et al. |
| 9,276,904 | B2 | 3/2016 | Bansal et al. |
| 9,367,257 | B2 | 6/2016 | Hamilton et al. |
| 9,369,431 | B1 * | 6/2016 | Kirby .................. H04L 63/02 |
| 9,479,464 | B1 | 10/2016 | Wang et al. |
| 9,553,806 | B2 | 1/2017 | Anand |
| 9,614,748 | B1 | 4/2017 | Battersby et al. |
| 9,680,706 | B2 | 6/2017 | Masurekar et al. |
| 9,755,903 | B2 | 9/2017 | Masurekar et al. |
| 9,774,707 | B2 | 9/2017 | Parthasarathy et al. |
| 9,806,948 | B2 | 10/2017 | Masurekar et al. |
| 9,860,279 | B2 | 1/2018 | Jain et al. |
| 9,894,103 | B2 | 2/2018 | Kwok et al. |
| 9,906,560 | B2 | 2/2018 | Jain et al. |
| 9,906,561 | B2 | 2/2018 | Jain et al. |
| 9,906,562 | B2 | 2/2018 | Jain et al. |
| 2002/0078370 | A1 | 6/2002 | Tahan |
| 2003/0041266 | A1 | 2/2003 | Ke et al. |
| 2003/0093481 | A1 | 5/2003 | Mitchell et al. |
| 2003/0120955 | A1 | 6/2003 | Bartal et al. |
| 2003/0126468 | A1 | 7/2003 | Markham |
| 2003/0226027 | A1 | 12/2003 | Marquet et al. |
| 2004/0049701 | A1 | 3/2004 | Le Pennec et al. |
| 2004/0177276 | A1 | 9/2004 | Mackinnon et al. |
| 2004/0223495 | A1 | 11/2004 | Pachl |
| 2004/0243835 | A1 | 12/2004 | Terzis et al. |
| 2005/0190909 | A1 | 9/2005 | Yoneyama et al. |
| 2005/0198125 | A1 | 9/2005 | Macleod Beck et al. |
| 2005/0210291 | A1 | 9/2005 | Miyawaki et al. |
| 2005/0276262 | A1 | 12/2005 | Schuba et al. |
| 2005/0278431 | A1 | 12/2005 | Goldschmidt et al. |
| 2006/0013136 | A1 | 1/2006 | Goldschmidt et al. |
| 2006/0129808 | A1 | 6/2006 | Koti et al. |
| 2006/0168213 | A1 | 7/2006 | Richardson et al. |
| 2006/0195896 | A1 | 8/2006 | Fulp et al. |
| 2007/0028291 | A1 | 2/2007 | Brennan et al. |
| 2007/0061492 | A1 | 3/2007 | Van Riel |
| 2007/0118893 | A1 | 5/2007 | Crawford |
| 2007/0136813 | A1 | 6/2007 | Wong |
| 2008/0072305 | A1 | 3/2008 | Casado et al. |
| 2008/0082977 | A1 | 4/2008 | Araujo et al. |
| 2008/0115190 | A1 | 5/2008 | Aaron |
| 2008/0148382 | A1 | 6/2008 | Bartholomy et al. |
| 2008/0189769 | A1 | 8/2008 | Casado et al. |
| 2008/0215518 | A1 | 9/2008 | Matsuda |
| 2008/0267177 | A1 | 10/2008 | Johnson et al. |
| 2008/0289028 | A1 | 11/2008 | Jansen et al. |
| 2008/0298274 | A1 | 12/2008 | Takashige et al. |
| 2009/0007219 | A1 | 1/2009 | Abzarian et al. |
| 2009/0007251 | A1 | 1/2009 | Abzarian et al. |
| 2009/0083727 | A1 | 3/2009 | Fu et al. |
| 2009/0129271 | A1 | 5/2009 | Ramankutty et al. |
| 2009/0150521 | A1 | 6/2009 | Tripathi |
| 2009/0228972 | A1 | 9/2009 | Bandi et al. |
| 2009/0235325 | A1 | 9/2009 | Dimitrakos et al. |
| 2009/0249436 | A1 | 10/2009 | Coles et al. |
| 2009/0249438 | A1 | 10/2009 | Litvin et al. |
| 2009/0249470 | A1 | 10/2009 | Litvin et al. |
| 2009/0249472 | A1 * | 10/2009 | Litvin ................. H04L 63/0263 726/14 |
| 2009/0276771 | A1 | 11/2009 | Nickolov et al. |
| 2009/0327198 | A1 | 12/2009 | Farah |
| 2009/0327781 | A1 | 12/2009 | Tripathi |
| 2010/0037310 | A1 | 2/2010 | Turley et al. |
| 2010/0037311 | A1 | 2/2010 | He et al. |
| 2010/0037331 | A1 | 2/2010 | Blake et al. |
| 2010/0043067 | A1 | 2/2010 | Varadhan et al. |
| 2010/0100616 | A1 | 4/2010 | Bryson et al. |
| 2010/0100949 | A1 | 4/2010 | Sonwane et al. |
| 2010/0125667 | A1 | 5/2010 | Soundararajan |
| 2010/0180331 | A1 | 7/2010 | Murakami et al. |
| 2010/0192215 | A1 | 7/2010 | Yaxuan et al. |
| 2011/0016467 | A1 | 1/2011 | Kane |
| 2011/0022695 | A1 | 1/2011 | Dalal et al. |
| 2011/0055916 | A1 | 3/2011 | Ahn |
| 2011/0072486 | A1 | 3/2011 | Hadar et al. |
| 2011/0103259 | A1 | 5/2011 | Aybay et al. |
| 2011/0113467 | A1 | 5/2011 | Agarwal et al. |
| 2011/0154470 | A1 | 6/2011 | Grimes et al. |
| 2011/0213875 | A1 | 9/2011 | Ferris et al. |
| 2011/0246637 | A1 | 10/2011 | Murakami |
| 2011/0302647 | A1 | 12/2011 | Bhattacharya et al. |
| 2012/0042033 | A1 | 2/2012 | Ayala, Jr. et al. |
| 2012/0137199 | A1 | 5/2012 | Liu |
| 2012/0180104 | A1 | 7/2012 | Gronich et al. |
| 2012/0240182 | A1 | 9/2012 | Narayanaswamy et al. |
| 2012/0263049 | A1 | 10/2012 | Venkatachalapathy et al. |
| 2012/0291024 | A1 | 11/2012 | Barabash et al. |
| 2012/0314617 | A1 | 12/2012 | Erichsen et al. |
| 2013/0007740 | A1 | 1/2013 | Kikuchi et al. |
| 2013/0019277 | A1 | 1/2013 | Chang et al. |
| 2013/0031544 | A1 | 1/2013 | Sridharan et al. |
| 2013/0047151 | A1 | 2/2013 | Sridharan et al. |
| 2013/0073743 | A1 | 3/2013 | Ramasamy et al. |
| 2013/0074066 | A1 | 3/2013 | Sanzgiri et al. |
| 2013/0125230 | A1 | 5/2013 | Koponen et al. |
| 2013/0163594 | A1 | 6/2013 | Sharma et al. |
| 2013/0198355 | A1 | 8/2013 | Kalyanaraman et al. |
| 2013/0219384 | A1 | 8/2013 | Srinivasan et al. |
| 2013/0227097 | A1 | 8/2013 | Yasuda et al. |
| 2013/0227550 | A1 | 8/2013 | Weinstein et al. |
| 2013/0311358 | A1 | 11/2013 | Sethi et al. |
| 2013/0311612 | A1 | 11/2013 | Dickinson |
| 2013/0332983 | A1 | 12/2013 | Koorevaar et al. |
| 2014/0068602 | A1 | 3/2014 | Gember et al. |
| 2014/0108319 | A1 | 4/2014 | Klauser et al. |
| 2014/0115578 | A1 | 4/2014 | Cooper et al. |
| 2014/0149794 | A1 | 5/2014 | Shetty et al. |
| 2014/0195666 | A1 | 7/2014 | Dumitriu et al. |
| 2014/0245423 | A1 | 8/2014 | Lee |
| 2014/0281030 | A1 | 9/2014 | Cui et al. |
| 2014/0282855 | A1 | 9/2014 | Clark et al. |
| 2014/0282889 | A1 | 9/2014 | Ishaya et al. |

(56) References Cited

U.S. PATENT DOCUMENTS

| | | |
|---|---|---|
| 2014/0297780 A1 | 10/2014 | Zhou et al. |
| 2014/0325037 A1 | 10/2014 | Elisha |
| 2015/0052521 A1 | 2/2015 | Raghu |
| 2015/0112933 A1 | 4/2015 | Satapathy |
| 2015/0193466 A1 | 7/2015 | Luft |
| 2015/0200816 A1 | 7/2015 | Yung et al. |
| 2015/0229641 A1 | 8/2015 | Sun et al. |
| 2015/0277949 A1 | 10/2015 | Loh et al. |
| 2016/0050117 A1 | 2/2016 | Voellmy et al. |
| 2016/0050141 A1 | 2/2016 | Wu et al. |
| 2016/0094456 A1 | 3/2016 | Jain et al. |
| 2016/0094643 A1 | 3/2016 | Jain et al. |
| 2016/0105333 A1 | 4/2016 | Lenglet et al. |
| 2016/0112374 A1 | 4/2016 | Branca |
| 2016/0149863 A1 | 5/2016 | Walker et al. |
| 2016/0156591 A1 | 6/2016 | Zhou et al. |
| 2016/0182454 A1 | 6/2016 | Phonsa et al. |
| 2016/0191466 A1 | 6/2016 | Pernicha |
| 2016/0191570 A1 | 6/2016 | Bansal et al. |
| 2016/0241702 A1 | 8/2016 | Gorajala Chandra et al. |
| 2017/0004192 A1 | 1/2017 | Masurekar et al. |
| 2017/0005867 A1 | 1/2017 | Masurekar et al. |
| 2017/0005987 A1 | 1/2017 | Masurekar et al. |
| 2017/0005988 A1 | 1/2017 | Bansal et al. |
| 2017/0026283 A1 | 1/2017 | Williams et al. |
| 2017/0064749 A1 | 3/2017 | Jain et al. |
| 2017/0104720 A1 | 4/2017 | Bansal et al. |
| 2017/0134422 A1 | 5/2017 | Shieh et al. |
| 2017/0180319 A1 | 6/2017 | Nimmagadda et al. |
| 2017/0180320 A1 | 6/2017 | Nimmagadda et al. |
| 2017/0180321 A1 | 6/2017 | Nimmagadda et al. |
| 2017/0180423 A1 | 6/2017 | Nimmagadda et al. |
| 2017/0187679 A1 | 6/2017 | Basak et al. |
| 2017/0250869 A1 | 8/2017 | Voellmy |
| 2017/0317928 A1 | 11/2017 | Gude et al. |
| 2017/0317976 A1 | 11/2017 | Chalvadi et al. |
| 2017/0317977 A1 | 11/2017 | Popuri et al. |
| 2017/0317979 A1 | 11/2017 | Bansal et al. |
| 2017/0318055 A1 | 11/2017 | Popuri et al. |
| 2018/0007000 A1 | 1/2018 | Bansal et al. |
| 2018/0007007 A1 | 1/2018 | Bansal et al. |

FOREIGN PATENT DOCUMENTS

| | | | |
|---|---|---|---|
| JP | 2006040274 A | 2/2006 | |
| JP | 2009017269 A | 1/2009 | |
| JP | 2013012865 A | 1/2013 | |
| KR | 20080100620 A | 11/2008 | |
| WO | 2008095010 A1 | 8/2008 | |
| WO | 2013074828 A1 | 5/2013 | |

OTHER PUBLICATIONS

Author Unknown, "AppLogic Features," Jul. 2007, 2 pages. 3TERA, Inc.

Author Unknown, "CISCO Identity-Based Firewall Security," Month Unknown, 2011, 2 pages, CISCO Systems, Inc.

Author Unknown, "Enabling Service Chaining on Cisco Nexus 1000V Series," Month Unknown, 2012, 25 pages, CISCO.

Author Unknown, "Next-Generation Firewalls," Oct. 1, 2013, 1 page, Palo Alto Networks.

Basak, Debashis, et al., "Virtualizing Networking and Security in the Cloud," Month Unknown, 2010, 9 pages, VMware.com.

Casado, Martin, et al., "SANE: A Protection Architecture for Enterprise Networks," Proceedings of the 15th USENIX Security Symposium, Jul. 31, 2006, 15 pages.

Dixon, Colin, et al., "An End to the Middle," Proceedings of the 12th conference on Hot topics in operating systems USENIX Association, May 2009, 5 pages, Berkeley, CA, USA.

Dumitriu, Dan Mihai, et al., U.S. Appl. No. 61/514,990, filed Aug. 4, 2011.

Guichard, J., et al., "Network Service Chaining Problem Statement; draft-quinn-nsc-probiem-statement-00.txt," Jun. 13, 2013, 14 pages, Cisco Systems, Inc.

Ioannidis, Sotiris, et al., "Implementing a Distributed Firewall," CCS'00, Month Unknown, 2000, 10 pages, ACM, Athens, Greece.

Joseph, Dilip Antony, et al., "A Policy-aware Switching Layer for Data Centers," Jun. 24, 2008, 26 pages, Electrical Engineering and Computer Sciences, University of California, Berkeley, CA, USA.

Mayer, Alain, et al., "Offline Firewall Analysis," Int. L. Inf. Secur. (2006) 5(3), Jun. 16, 2005, 20 pages, Springer-Verlag.

Scarfone, Karen, et al., "Guidelines on Firewalls and Firewall Policy," Sep. 2009, 48 pages, NIST, U.S. Department of Commerce.

Sekar, Vyas, at al., "Design and Implementation of a Consolidated Middlebox Architecture," In Proc. of NSDI, Month Unknown, 2012, 14 pages.

Sherry, Justine, et al., "Making Middleboxes Someone Else's Problem: Network Processing as a Cloud Service," In Proc. of SIGCOMM, Aug. 13-17, 2012, 12 pages, Helsinki, Finland.

Stojanovski, Nenad, et al., "Architecture of a Identity Based Firewall System," Jul. 2011, 9 pages.

Stojanovski, Nenad, et al., "Analysis of Identity Based Firewall Systems," Jun. 2010, 9 pages.

Thames, J. Lane, et al., "A Distributed Firewall and Active Response Architecture Providing Preemptive Protection," ACM-SE'08, Mar. 28-29, 2008, 6 pages, Auburn, AL, USA.

* cited by examiner

405 — High Level Firewall Rules with Higher Level AppliedTo Identifiers

| Source | Source Port | Destination | Destination Port | Service | AppliedTo | Action |
|---|---|---|---|---|---|---|
| WS1 | * | DBS1 | * | Any | Compute Cluster X | Allow |
|  |  |  |  |  |  |  |
| Any | * | Blacklist | * | Any | Datacenter Y | Deny |
| AS10 | * | Any | * | http | Logical Switch Z | Deny |

410 — Low Level Firewall Rules with Lower Level AppliedTo Identifiers

| Source | Source Port | Destination | Destination Port | Service | AppliedTo | Action |
|---|---|---|---|---|---|---|
| WS1 | * | DBS1 | * | Any | VNIC 1, VNIC A... | Allow |
|  |  |  |  |  |  |  |
| Any | * | Blacklist | * | Any | * | Deny |
| AS10 | * | Any | * | http | VNIC M, ... | Deny |

412

415 — Host Level Rule Tables

| Source | Source Port | Destination | Destination Port | Service | AppliedTo | Action |
|---|---|---|---|---|---|---|
| WS1 | * | DBS1 | * | Any | VNIC A... | Deny |
|  | * |  | * |  |  |  |

420 — VNIC Level Rule Table

| Source | Source Port | Destination | Destination Port | Service | Action |
|---|---|---|---|---|---|
| WS1 | * | DBS1 | * | Any | Deny |
|  |  |  |  |  |  |

*Figure 4*

FIREWALL CONFIGURATION VERSIONING

BACKGROUND

In computing, a firewall is a network security system that monitors and controls the incoming and outgoing network traffic based on predetermined security rules. A firewall typically establishes a barrier between a trusted, secure internal network and another outside network, such as the Internet, that is assumed to not be secure or trusted.

Firewalls are often categorized as either network firewalls or host-based firewalls. Network firewalls are software appliances running on general-purpose hardware or hardware-based firewall computer appliances that filter traffic between two or more networks. Host-based firewalls provide a layer of software on one host that controls network traffic in and out of that single machine.

Software defined data center that provides network virtualization platform to different tenants also provide firewall services to those tenants. As these software defined data centers provide ever more networking and computing capacities to ever more tenants, the software defined data center has to configure and manage ever greater number of firewall rules in its networking and computing resources in order to serve the ever more complex security requirements of its tenants.

SUMMARY

Some embodiments of the invention provide a method for managing firewall protection in a datacenter that includes a plurality of host machines capable of enforcing firewall protection based on firewall configuration maintained at a network manager of the datacenter. The network manager in some embodiments receives tenant updates to entities of the firewall configuration. The network manager associates each updated firewall configuration entity with a version number that corresponds to a time instant that the firewall configuration entity is updated. The network manager generates local-level firewall configurations to be enforced at the host machines of the datacenter and associates each local-level firewall configuration with a version number that is based on the version numbers associated with the firewall configuration entities.

Some embodiments allow each tenant to freely manage their own sections in the firewall configuration. The network manager in some embodiments provides UI or API that allow each tenant to add, modify, or delete rules in the firewall configuration sections that the tenant owns. The network manager also allows each tenant to add new firewall configuration sections or delete firewall configuration sections that the tenant owns. In some embodiments, the various changes and update to the firewall configurations from the different tenants are then aggregated into host-level firewall configuration update and distributed to the individual host machines.

In order to identify discrepancies between the desired firewall configuration and the actual firewall configuration distributed to the host machines (i.e., to detect any obsolescence in the actual firewall configuration), some embodiments associate the firewall configuration with version numbers. In some embodiments, the network manager records the version number of the firewall configuration that is distributed to each host machine in a firewall configuration status. This enables the network manager to identify host machines (by monitoring the firewall configuration status) having obsolete actual firewall configurations by comparing the version number of the firewall configuration distributed to the host machine with the version number of the up-to-date desired firewall configuration at the network manager. Some embodiments would then generate a more up-to-date host-level firewall configuration for distribution to that identified host machine.

Some embodiments maintain a version number for each firewall configuration section. When aggregating the firewall configuration update for distribution to a host machine, the network manager in some embodiments determines a version number for the aggregated update based on the version numbers of the sections that are included in aggregation. This aggregated version number is in some embodiments stored in the firewall configuration status to record the version number of the firewall configuration distributed to the host machines.

In some embodiments, the version numbers stored in the firewall configuration status are also used for indicating whether the host-level firewall configurations to the host machines were successfully delivered. In some embodiments, the network manager delivers the host-level firewall configuration update to its target host machine along with the version number of the host-level update. The network manager then waits for an acknowledgement or response from the target host machine. In some embodiments, such response includes the version number of the host-level firewall configuration that was successfully received by the host machine, and the distributor stores this version number into the firewall configuration status. In some embodiments, the network manager keeps a time-out timer that would time out if the host machine fails to acknowledge the delivery of host-level firewall configuration in time. The network manager in these instances would mark the host machine as having host-level firewall configuration of version zero to indicate the delivery failure.

In some embodiments, the network manager translates high-level identifier referenced by firewall rules to low-level identifier. When the network manager encounters a rule that references high-level constructs, the network manager performs a translation operation. To accelerate the translation operation, the network manager in some embodiments includes a translator cache that stores the result of previous translations along with their associated version numbers. Upon cache miss, the network manager performs the translation and store the translation result in the translation cache along with the version number associated with the rule. Upon cache hit, the network manager uses the cached translation result rather than performing a new translation if the version number stored in the cache is equal to (or newer) a minimum required version number. If the stored translation result has an older version number than the minimum required version number, the translator would treat the request as a cache miss and perform a new translation based on dynamic definition of the high-level identifier.

In some embodiments, different rules belonging to the same section can have the same version number. In some embodiments, different rules belonging to different sections can also have the same version number, if, for example, the entire firewall configuration was updated by a firewall configuration level API. In these instances, different rules having the same version number may refer to the same containers, security groups, etc., and the translation result of a particular high-level construct for one rule can be cached and reused for another rule having the same version number. It is also possible that the publishing engine thread is preparing host-level firewall configuration update for different host machines based on the same version of the firewall configuration. In these instances, the translation engine may store and retrieve the translation result for one rule and apply it to another rule, or the translation result for one host machine and apply it to another host machine.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 4 illustrates several examples of rule tables.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for managing firewall protection in a datacenter that includes a plurality of host machines capable of enforcing firewall protection based on firewall configuration maintained at a network manager of the datacenter. The network manager in some embodiments receives tenant updates to entities of the firewall configuration. The network manager associates each updated firewall configuration entity with a version number that corresponds to a time instant that the firewall configuration entity is updated. The network manager generates local-level firewall configurations to be enforced at the host machines of the datacenter and associates each local-level firewall configuration with a version number that is based on the version numbers associated with the firewall configuration entities.

Several more detailed embodiments of the invention are described below. Section I describes the distribution of firewall configuration from a network manager to host machines of the datacenter for enforcement. Section II describes the organization of the firewall configuration of a datacenter into various firewall configuration entities. Section III describes using versioning to monitor the distribution of firewall configuration to the host machines. Section IV describes a translation cache that caches result of the translation of high-level constructs used in firewall rules. Section V describes the network control system of some embodiments of the invention. Lastly, Section VI describes electronic devices that are used to implement the controller and/or hosts of some embodiments of the invention.

I. Distribution of Firewall Configuration

Some embodiments provide the ability to specify for a particular firewall rule, a set of network node locations (called a set of enforcement points below) at which the particular firewall should be enforced. To provide this ability, the network manager of some embodiments adds an extra tuple (referred to below as the AppliedTo tuple) to a firewall rule. This added AppliedTo tuple lists the set of enforcement points at which the firewall rule has to be applied (i.e., enforced).

Figure 1:
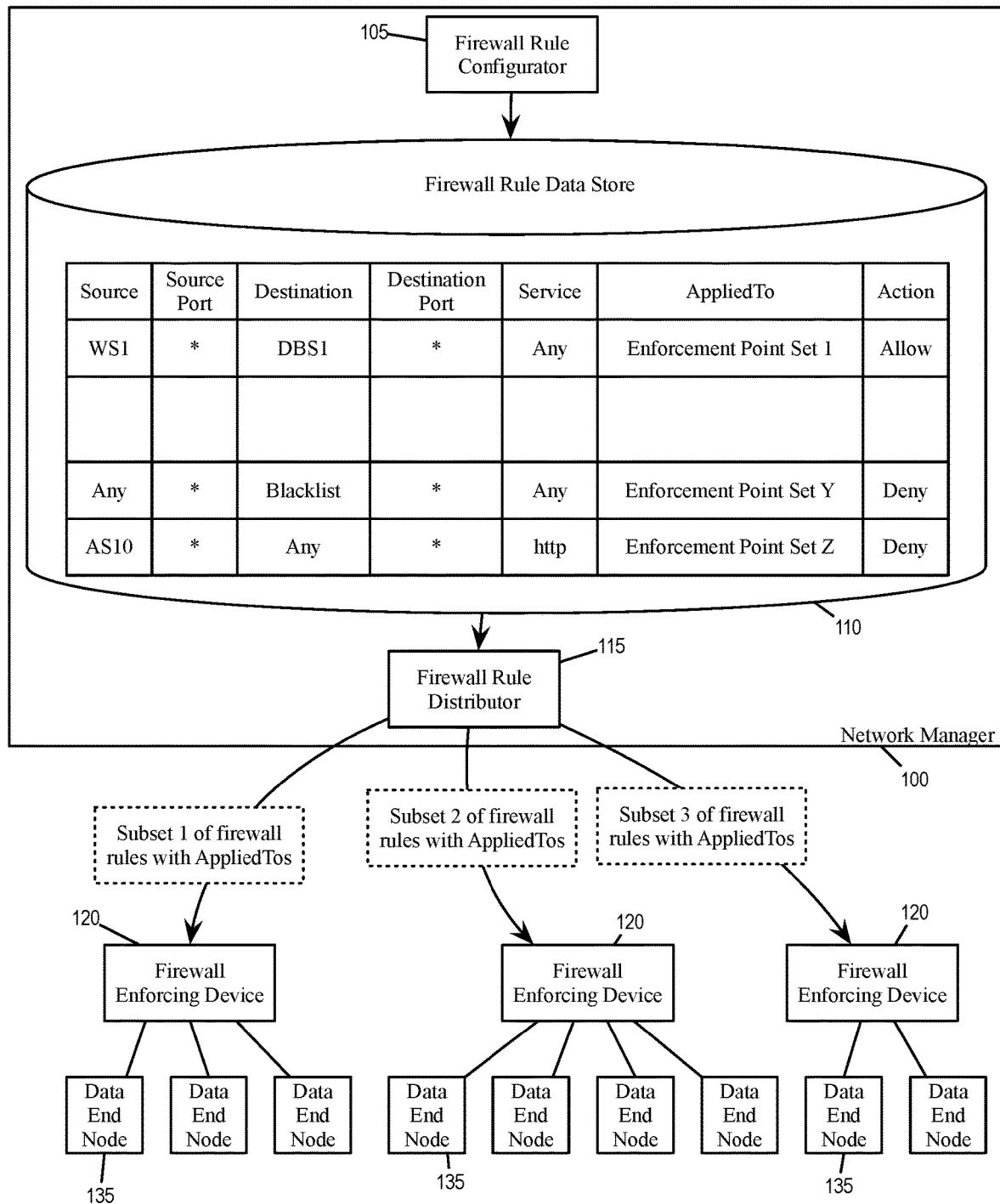
FIG. 1 illustrates a controller that configures and distributes firewall rules with AppliedTo identifiers.

FIG. 1 illustrates a network manager 100 that implements such a method. The network manager 100 allows AppliedTo firewalls to be configured by users and/or automated processes. This manager also distributes the configured AppliedTo firewall rules to multiple firewall-enforcing devices 120 in a network (not shown) that includes multiple network nodes that are managed by the network manager. As shown in FIG. 1, the network manager includes a firewall rule configurator 105, a firewall data storage 110, and a firewall rule distributor 115. The firewall rule configurator 105 configures the AppliedTo firewall rules by interacting with users (through one or more user-interface (UI) modules) or with automated processes that are part of firewall provisioning and/or network configuration. This configurator 105 stores the configured AppliedTo rules in the firewall rule data storage 110.

As shown in FIG. 1, the rule configurator 105 specifies each firewall rule 125 in the data storage 110 in terms of n-data tuples for matching a packet with a firewall rule and an action to perform when a packet is matched to the rule. In this document, the term "packet" is to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

In the example illustrated in FIG. 1, the n-data tuples are the six data tuples, Source, Source Port, Destination, Destination Port, Service (also called protocol), and AppliedTo identifiers. One or more of these identifiers may be specified by wildcard value that signifies the applicability of all possible values. As further described below, the AppliedTo identifier specifies the set of enforcement points at which the firewall rule has to be applied (i.e., enforced).

In some embodiments, the source and destination identifiers for L3 level firewall rules are specified in terms of IP addresses, while they are specified in terms of MAC address for L2 level firewall rules. In some embodiments, one or more of the source and destination identifier values can be logical values that are defined for a logical network (e.g., can be IP addresses defined in a logical address space). In other embodiments, all of the identifier values are defined in the physical domains. In still other embodiments, some of the identifier values are defined in logical domain, while other identifier values are defined in the physical domain. Logical networks and logical constructs will be further described below.

To ensure that packets match at least one firewall rule, the rule configurator 105 specifies at least one catchall firewall rule in the data storage 110 that ensures that each packet matches at least one rule when it does not match any other rule in the firewall table. Also, to address situations where a packet might match multiple rules, the rule configurator in some embodiments arranges the rules in the data storage 110 according to a precedence hierarchy that ensures that higher priority rules appear in the storage before lower priority rules. However, given that AppliedTo identifiers can be used to specify different enforcement nodes for different rules, the rule configurator (or a user that acts through the rule configurator) does not have to address precedence orders for firewall rules that are to be sent to different enforcement nodes.

In the example illustrated in FIG. 1, as well as other figures described below, the source and destination port values for the firewall rules are specified as wildcard values. One of ordinary skill will realize that this does not have to be the case for all firewall rules. AppliedTo firewall rules can be specified with respect to traditional port values, such as port 20, 80, 143, etc. Also, in the examples illustrated in the figures, the acronyms WS, AS, and DBS stand for webserver, application server, and database server. These servers can be specified by their associated network addresses (e.g., IP addresses). Also, the example firewall rules in these figures are meant to simply conceptually convey the notion of a firewall rule, as opposed to representing actual firewall rules of a system.

When a firewall engine (not shown) identifies a firewall rule that matches a packet, the engine performs on the packet the act that is specified by the rule's Action identifier. In some embodiments, the Action identifier specifies that the packet should be dropped or allowed to pass through. In other embodiments, other acts may be specified instead of or in conjunction with the drop and allow acts.

As mentioned above, the AppliedTo identifier specifies the set of enforcement points at which the firewall rule has to be applied. In some embodiments, the enforcement points can be defined in terms of (1) VNICs, VMs, hosts, or other compute constructs (e.g., compute clusters, datacenters, etc.), (2) network elements, such as physical forwarding elements (e.g., physical switches, physical routers, etc.), logical forwarding elements (e.g., logical switches, logical routers, etc.), other managed appliances, unmanaged third-party appliances (e.g., third party firewalls), and/or combination of such elements, and/or (3) security groups that are formed by a set of one or more VNICs, VMs, hosts, compute constructs and/or network constructs. By allowing AppliedTo identifiers to be specified in terms of both managed network devices and unmanaged network devices, the firewall configurator 105 provides a single unified interface to manage the entire firewall rule definition for the network that includes both managed and unmanaged devices.

In some embodiments, the AppliedTo tuple can also be set to a wildcard value, which signifies all possible values for the AppliedTo tuple (e.g., all VNICs). As further described below, the AppliedTo identifier in some embodiments can refer to dynamically modifiable constructs, which, in turn, allows the network manager to dynamically adjust the firewall rules for different locations within a network by dynamically adjusting the membership of the dynamically modifiable constructs.

As shown in FIG. 1, the network manager distributes the AppliedTo firewall rules to various firewall-enforcing devices 120 in the network. In some embodiments, the firewall-enforcing devices include hosts on which multiples VMs execute. In addition to, or instead of, such hosts, the firewall-enforcing devices in some embodiments include other types of firewall-enforcing devices, such as physical forwarding elements, service nodes (e.g., managed dedicated machines or managed VMs), edge appliances (e.g., top-of-rack switches), and third-party appliances.

In some embodiments, the network manager distributes some of the AppliedTo firewall rules to some of the nodes with the AppliedTo tuples (that specify the sets of enforcement points associated with the firewall rules), while distributing other firewall rules to other nodes without the AppliedTo tuples. For instance, in some embodiments, the method distributes the AppliedTo firewall rules to hosts with one or more executing VMs, while distributing non-AppliedTo firewall rules to one or more third party appliances that cannot process AppliedTo firewall rules. In other embodiments, however, the method distributes AppliedTo firewall rules to some or all third-party appliances as these appliances can process AppliedTo firewall rules. In still other embodiments, the method distributed non-AppliedTo firewall rules (i.e., firewall rules without AppliedTo data tuples) to hosts with one or more executing VMs. In some of these embodiments, the method uses the AppliedTo data tuples to identify the hosts or VMs to which it has to forward the firewall rules.

The firewall-enforcing devices 120 connect to one or more data end nodes 135, which can include different types of end nodes in different embodiments. Examples of such data end nodes include VMs and non-VM addressable nodes (e.g., volume mounters (iSCSI mounter, NFS mounter, etc.), VM migrators (e.g., vMotion module used in the ESX hypervisor of VMware Inc.), and hypervisor kernel network interface (e.g., vmknic of VMware Inc.)). For each data end node, or for a set of data end nodes, the firewall-enforcing devices 120 in some embodiments generate custom firewall data storages (e.g., firewall rule tables) based on the received AppliedTo firewall rules. To generate the custom firewall data storages, the firewall-enforcing devices use the AppliedTo identifiers of the received AppliedTo firewall rules to identify the firewall rule to store in the different custom firewall data storages.

For instance, in some embodiments, a multi-VM host that receives the AppliedTo firewall rules specifies multiple firewall rule tables for multiple VNICs of the VMs based on the AppliedTo identifiers of the firewall rules. The specified VNIC-level firewall rule tables in some embodiments no longer have the AppliedTo tuples. In some embodiments, the VNIC-level firewall rule table contains only the set of rules that are applicable to the VNIC's VM, and this set of rules is smaller than the overall number of rules that the host stores for all the VMs executing on it. Also, each rule in the VNIC-level firewall rule table is specified in terms of six tuples, which are the Source, Source Port, Destination, Destination Port, Service, and Action identifiers.

In some embodiments, the firewall-enforcing devices 120 connect directly to the data end nodes 135, or indirectly through one or more forwarding elements. Through their connections to the data end nodes, the firewall-enforcing devices 120 receive packets to and from the data end nodes. The enforcing devices 120 of some embodiments compare the attributes of the received packets with the firewall rules (e.g., with the five data tuples, Source, Source Port, Destination, Destination Port, and Service identifiers of the firewall rules) in the custom firewall data storages that the enforcing devices have created for the source or destination node of the packet. Based on this comparison, the enforcing devices identify a firewall rule corresponding to the packet, and then perform the action specified by the identified firewall rule.

Figure 2:
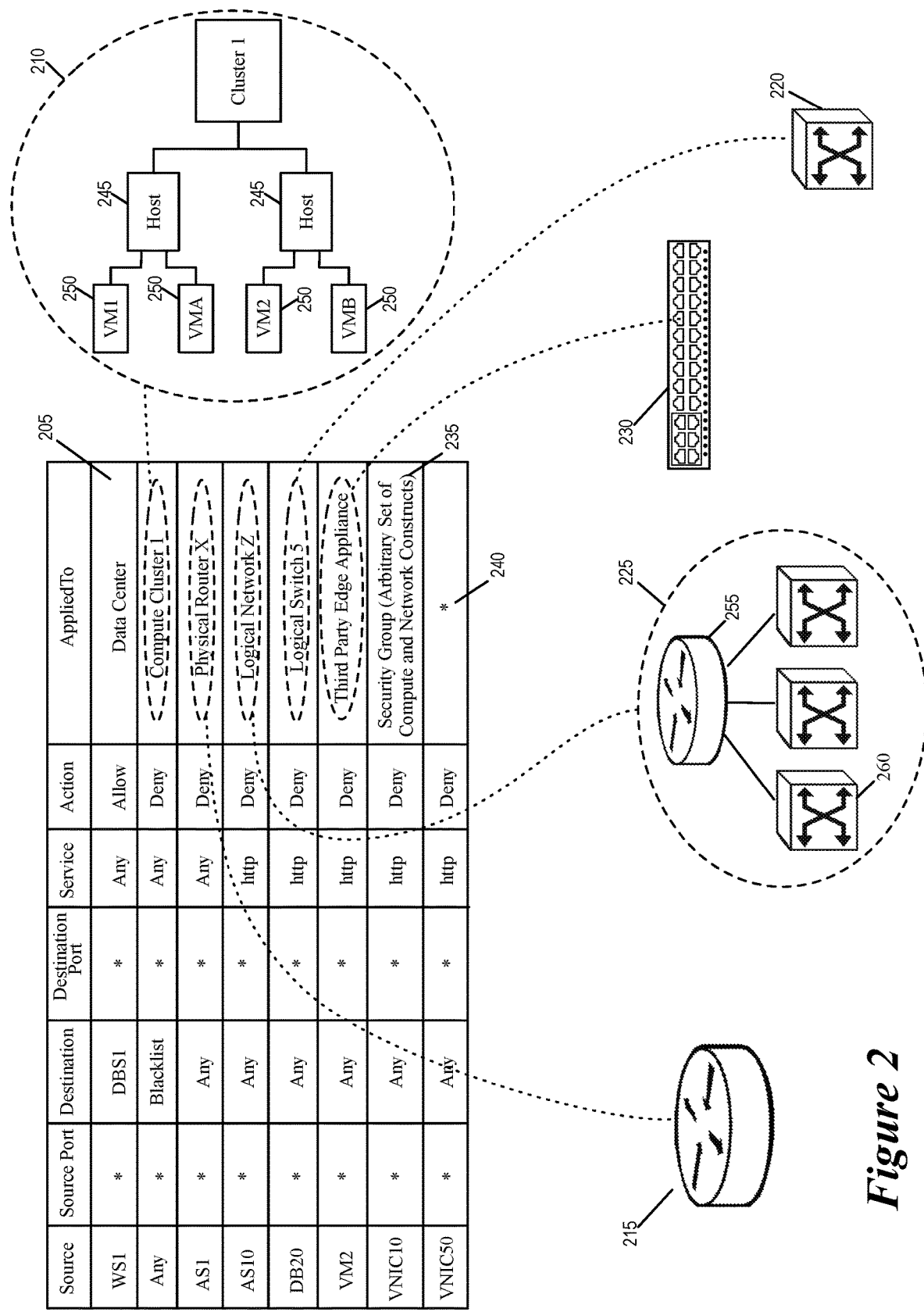
FIG. 2 illustrates several examples of enforcement points that are used to specify the AppliedTo tuples in some embodiments.

FIG. 2 illustrates several examples of enforcement points that are used to specify the AppliedTo tuples in some embodiments. Specifically, this figure illustrates several examples of AppliedTo firewall rules 125 that are configured and stored by the manager 100 of some embodiments. As before, each of these rules includes the traditional five tuples, Source, Source Port, Destination, Destination Port, and Service, in addition to the AppliedTo tuple and the Action value.

The examples of the AppliedTo tuples that are shown in FIG. 2 include (1) compute constructs, such as data center 205 and compute cluster 210, (2) network constructs, such as physical router 215, logical switch 220, and logical network 225, (3) third-party network appliance 230, (4) a security group 235, and (5) a wildcard entry 240.

In some embodiments, a datacenter is a location that houses multiple hosts, each of which might be dedicated to one tenant or multiple tenants. Each host might be a dedicated non-virtualized machine, or it might be a virtualized machine on which multiple VMs execute. A compute cluster is a group of hosts in a datacenter. FIG. 2 illustrates an example of a compute cluster that is formed by two hosts 245 that each executes two VMs 250. In some embodiments, each host in a compute cluster is configured to support a set of tenants, so that when a VM is instantiated on or moved to one such host, some or all of the data needed for configuring that VM and configuring the VNIC-level firewall data storage on the host already exists on the host.

In some embodiments, each physical forwarding element (PFE) is a forwarding element that exists in the physical world. FIG. 2 illustrates the physical router 215 as an example of a PFE. Examples of such a PFE include a switch, a router, a firewall appliance, a load balancer, etc. In some embodiments, all such physical devices (switches, routers, firewall appliances, load balancers, etc.) can be standalone hardware devices, hardware devices that are implemented by the physical NICs of the hosts, or software devices that execute on shared or dedicated hosts.

In this document, software-forwarding elements are referred to as physical forwarding elements (PFEs), in order to distinguish them from logical forwarding elements, which are logical constructs that are not tied to the physical world. In other words, the software forwarding elements are referred to as PFEs because they exist and operate in the physical world, whereas logical forwarding elements are simply a logical representation of a forwarding element that is presented to a user or a program in some embodiments.

In some embodiments, software forwarding elements executing on different host devices (e.g., different computers) are configured to implement different logical forwarding elements (LFEs) for different logical networks of different tenants, users, departments, etc. that use the same shared compute and networking resources. For instance, two software forwarding elements executing on two host devices can perform L2 switching functionality. Each of these software switches can in part implement two different logical L2 switches, with each logical L2 switch connecting the VMs of one entity. In some embodiments, the software forwarding elements provide L3 routing functionality, and can be configured to implement different logical routers with the software L3 routers executing on other hosts. FIG. 2 illustrates a logical switch 220 as an example of a logical forwarding element. Logical forwarding elements are further described in U.S. patent application Ser. No. 14/070,360, published as U.S. Patent Application Publication 2015/0058968, which is incorporated herein by reference.

A logical network is a network that is formed by one or more logical forwarding elements. FIG. 2 illustrates an example of a logical network 225 that is formed by one logical router 255 and three logical switches 260. Like logical forwarding elements, logical networks are a logical representation of a network that is presented to a user or a program in some embodiments. Although not shown in the example illustrated in FIG. 2, the AppliedTo tuple can also specify a physical network (that is formed by one or more PFEs) as an enforcement point for a firewall rule.

In some embodiments, AppliedTo tuples can specify the enforcement points in terms of security groups that are formed by grouping one or more VNICs, VMs, hosts, compute constructs and/or network constructs. For instance, an AppliedTo firewall rule can be limited (by the AppliedTo tuple) to a security group that is specified in terms of a particular compute cluster and a particular logical network that connects a particular tenant's VMs that execute on the cluster's hosts. Security groups can be specified by users (e.g., network administrators) in some embodiments. Conjunctively, or alternatively, security groups can be specified by automated process in some embodiments. As shown by entry 240, a wildcard value can also specify an AppliedTo tuple. The wildcard value in some embodiments signifies all possible values for the AppliedTo tuple (e.g., all VNICs).

The AppliedTo identifier in some embodiments can refer to dynamically modifiable constructs, which, in turn, allows the network manager to dynamically adjust the firewall rules for different locations within a network by dynamically adjusting the membership of the dynamically modifiable constructs. In some embodiments, one or more of the compute constructs, network constructs and security groups can be specified as dynamic containers that can have members (e.g., forwarding elements, hosts, VNICs, etc.) dynamically added and/or removed from them. When a dynamic container that is used to define the AppliedTo tuple(s) of one or more firewall rules is modified, the manager of some embodiments does not resend the firewall rule to the affected network nodes, but instead only sends the updated membership change to the group that is defined by the dynamic container.

Figure 3:
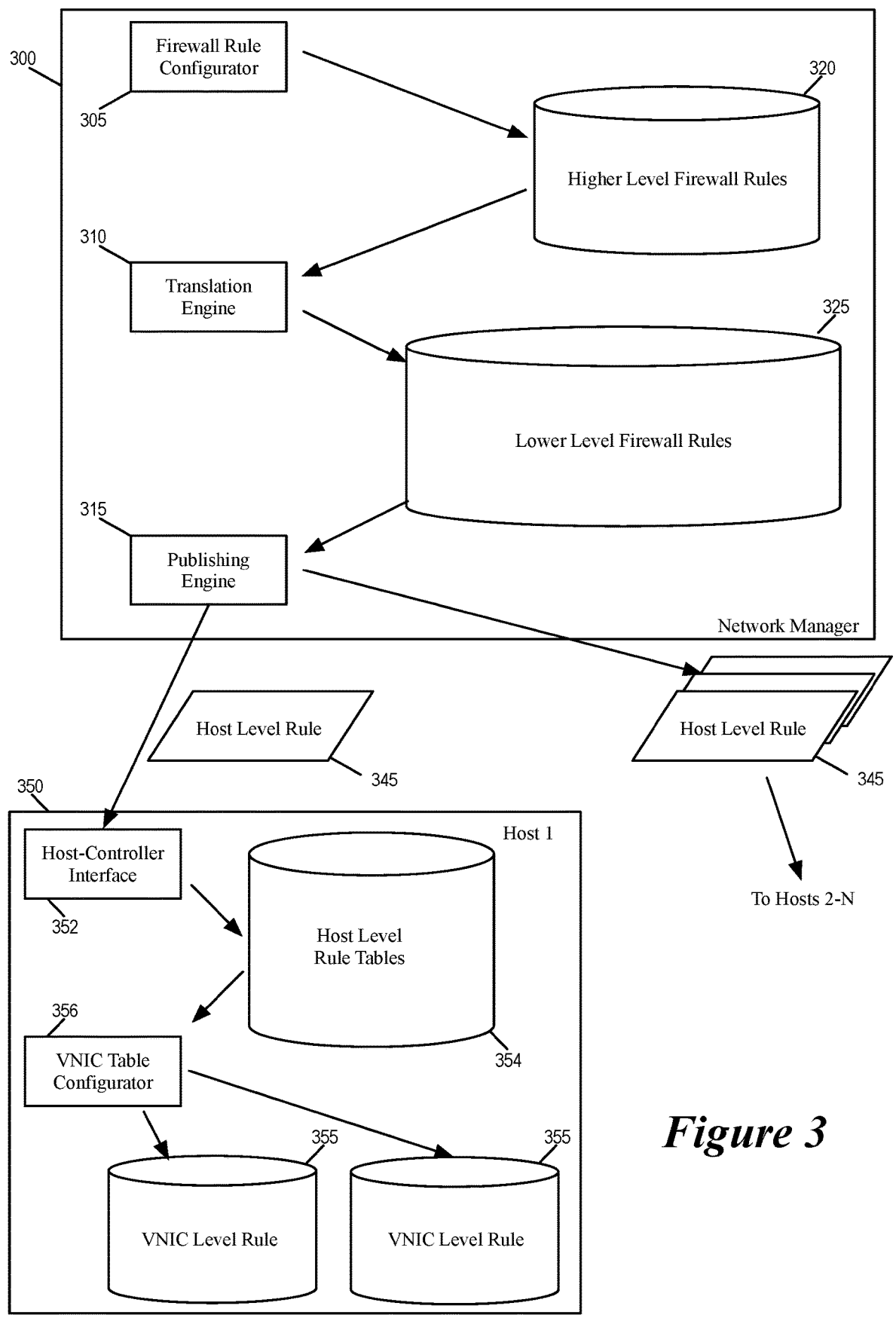
FIG. 3 illustrates another controller that specifies and distributes AppliedTo firewall rules.

The network manager of some embodiments allows the AppliedTo firewall rules (1) to be specified (e.g., by a network administrator or by an automated firewall configurator) in terms of high-level enforcement point identifiers, but then (2) to be distributed in terms of low-level enforcement point identifiers that are decipherable or easier to decipher by the firewall-enforcing devices. FIG. 3 illustrates one such network manager 300, as well as one host 350 that receives firewall rules that are distributed by the manager 300. As shown in this figure, the manager 300 includes a firewall rule configurator 305, a translation engine 310, a publishing engine 315, a high-level rule data storage 320, and a low-level rule data storage 325. The example illustrated in FIG. 3 will be described by reference to FIG. 4, which illustrates several firewall rule tables that are created by the manager 300 and the host 350 in some embodiments of the invention.

Like the firewall rule configurator 105, the firewall rule configurator 305 configures the AppliedTo firewall rules by interacting with users (through one or more user-interface (UI) modules) and/or automated processes. The firewall rule configurator 305 allows users or automated processes to specify AppliedTo firewall rules in terms of high-level enforcement point identifiers. Examples of such high-level enforcement point identifiers are the high-level network, compute, and security constructs, such as logical switches, logical routers, logical networks, physical networks, compute clusters, datacenters, etc.

The configurator 305 stores the AppliedTo firewall rules that it configures in the rule data storage 320. FIG. 4 illustrates an example of a high-level firewall rule table 405 that the manager configures and stores in the high-level data storage 320 of some embodiments. As shown, the high-level firewall rule table 405 stores multiple AppliedTo firewall rules that have AppliedTo identifiers defined in terms of high-level constructs, such as a compute cluster, a datacenter, and a logical switch.

From the rule data storage 320, the translation engine 310 retrieves the AppliedTo firewall rules, and converts the high-level enforcement point identifier in the AppliedTo tuples of the retrieved rules to low-level enforcement point identifiers. For instance, in some embodiments, the translation engine converts compute constructs (e.g., datacenter identifiers, compute cluster identifiers, host identifiers, etc.) and network constructs (e.g., LFE identifiers, logical network identifiers, etc.) into VNIC values (VNIC identifiers) and wildcard values. FIG. 4 illustrates an example of a low-level firewall rule table 410. As shown, this table 410 contains the same firewall rules as the high-level firewall rule table 405 but each rule's AppliedTo identifier now specifies either a wildcard value 412 or a set of VNICs associated with the high-level identifiers.

In so converting the enforcement point identifiers, the translation engine 310 ensures that all AppliedTo firewall rules are defined by low-level enforcement point identifiers that can be deciphered by all firewall-enforcing devices that receive the AppliedTo firewall rules. The translation engine stores the AppliedTo firewall rules that it retrieves, and when necessary converts, in the rule data storage 325.

In some embodiments, the translation engine 310 translates other parameters of the firewall rules from the data storage 320 before storing the translated rules in the data storage 325. For instance, in some embodiments, the source and destination identifiers of the firewall rules might be specified in terms of high-level constructs (e.g., containers such as web server, app server, database server, etc.) that have to be converted to low-level identifiers (e.g., specific IP addresses) before distributing the firewall rules to the firewall-enforcing devices.

One of ordinary skill in the art will realize that the translation engine operates differently in other embodiments. For instance, in some embodiments, the translation engine does not translate, or does not always translate, high-level source and destination identifiers to low-level source and destination identifiers. In some of these embodiments, the translation engine leaves this translation to some or all of the firewall-enforcing devices to do. Similarly, in some embodiments, the translation engine does not translate, or does not always translate, high-level AppliedTo identifiers to low-level AppliedTo identifiers for some or all of the firewall-enforcing devices, because the translation engine leaves this translation to some or all of the firewall-enforcing devices to do. Foregoing some or all of translation of the high-level firewall identifiers (e.g., AppliedTo, source and destination identifiers), simplifies the size and/or number of firewall rules that the manager distributes to the enforcing devices, but comes at the expense of requiring the enforcing devices to have the capability (e.g., the network state information) to perform this translation.

Even in some embodiments that have the network manager distribute firewall rules with low-level AppliedTo identifiers (e.g., with only VNIC and wildcard values), the manager may not use a translation engine 310 that unpacks (i.e., converts) the high-level AppliedTo identifiers (e.g., the high-level network, compute, and/or security constructs) into low-level AppliedTo identifiers. For instance, each high-level AppliedTo identifier (e.g., each compute cluster identifier, LFE identifier, etc.) is specified as an object with a reference to a list of VNIC values. In some of these embodiments, the translation engine's job is to populate the VNIC list of the high-level identifier object with the identities or references to wildcard values or the VNICs that are members of the high-level AppliedTo identifier (e.g., are members of the compute cluster, the LFE, etc.). In some embodiments, the rule configurator 305 so populates the VNIC list, and hence in these embodiments, a translation engine is not used for any processing associated with the high-level AppliedTo identifiers.

For each data end node that should receive AppliedTo firewall rules, the publishing engine 315 (1) collects host-level (i.e., applicable locally only to the host machine) AppliedTo rules 345 from the low-level data storage 325, and (2) distributes the collected firewall rules to the data end nodes. FIG. 3 shows the publishing engine distributing firewall rules to multi-VM hosts. However, one of ordinary skill in the art will realize that the publishing engine 315 is used to distribute firewall rules to other firewall-enforcing devices in other embodiments.

For each host, the publishing engine 315 identifies and retrieves from the low-level data storage 325, the AppliedTo rules that pertain to the host. In some embodiments, the publishing engine only sends to each host the AppliedTo rules that pertain to the host. These AppliedTo rules in some embodiments include the AppliedTo rules that relate to VMs that are executing on the host. FIG. 4 illustrates an example of a host-level firewall rule table 415 that the publishing engine distributes to a host in some embodiments. This table only includes the AppliedTo firewall rules that are applicable to the recipient host. As such, this table is typically much smaller than the high-level and low-level AppliedTo tables 405 and 410, because this table 415 contains AppliedTo rules that pertain to one host.

In some embodiments, the rules that pertain to each host also include the AppliedTo rules that relate to VMs that may be instantiated on the host. For instance, when a particular host belongs to a compute cluster that implements a particular logical network, the publishing engine 315 of some embodiments pushes the AppliedTo rules for the logical network to the particular host even before a VM that belongs to the logical network is instantiated on the particular host. Pushing the AppliedTo firewall rules ahead of time to such a host is advantageous because it allows the host to configure the firewall rules for the VM without interacting with the network manager or a controller. Such configuration of the firewall rules is referred to below as headless provisioning of the firewall rules as it does not require interaction with the network manager.

In some embodiments, the publishing engine 315 collects the AppliedTo rules 345 for each host by examining the high-level AppliedTo data storage 320. For instance, some embodiments do not define a low-level AppliedTo data storage 325. In these embodiments, the publishing engine 315 sifts through the high-level AppliedTo data storage 320 to identify AppliedTo firewall rules that are applicable to a host.

Also, even though FIGS. 3 and 4 illustrate the creation and distribution of host-level AppliedTo rule sets to different hosts, one of ordinary skill in the art will realize that in other embodiments the publishing engine 315 examines the manager's AppliedTo data storage(s) to identify and publish firewall rule sets to non-host firewall-enforcing devices (such as third-party firewall devices). The publishing engine (1) only publishes non-AppliedTo firewall rules (i.e., rules without the AppliedTo identifier) to the non-host firewall-enforcing devices in some embodiments, (2) only publishes AppliedTo firewall rules (i.e., rules with AppliedTo identifiers) to the non-host firewall-enforcing devices in other embodiments, and (3) publishes non-AppliedTo firewall rules to some non-host firewall-enforcing devices while publishing AppliedTo firewall rules to other non-host firewall-enforcing devices.

Each host 350 has a host-controller interface 352 that receives and stores the host-level rules in a host-level rules table 354. Each host also has a VM firewall configurator that from the host-level rules that are stored in the host-level rules tables 354 identifies and stores a subset of firewall rules for each VM that is executing on the host. In the embodiments illustrated in FIG. 3, the VM firewall configurator is a VNIC-table configurator 356 that generates one VNIC-level firewall rule set for each VNIC of each VM, by (1) using the AppliedTo data tuples in the host-level rules 354 to identify the firewall rules that are applicable to the VNIC, (2) retrieving the identified rules from the host-level rules, and (3) storing the retrieved rules in the VNIC-level firewall data storage 355 for the VNIC. In some embodiments, each VM has one VNIC. However, in other embodiments, some or all VMs can have more than one VNIC.

FIG. 4 illustrates an example of a VNIC-level firewall rule table 420. As shown in this table, the firewall rules in the VNIC-level firewall rule table do not include the AppliedTo tuple, and are each specified only in terms of five tuples (Source, Source Port, Destination, Destination Port, and Service identifiers) and the action value. As the VNIC-level firewall rule table contains only the set of rules that are applicable to a particular VNIC, this set of rules is smaller than the overall number of rules that the host stores for all the VMs executing on it. This smaller size allows for faster processing of the firewall rules by a firewall rule engine (not shown) of a host.

The above-described firewall rule distribution methodologies have several advantages. By using AppliedTos to specify the enforcement point sets for the firewall rules, and applying rule filtering at multiple levels during management-plane provisioning and data plane deployment, these methodologies allow concise, non-bloated firewall rule tables to be easily specified for data end nodes (e.g., VMs, VNICs, etc.). Also, the non-bloated firewall rule tables result in faster processing by the firewall rule engine and hence better performance.

A. Operations at Network Manager

Figure 5:
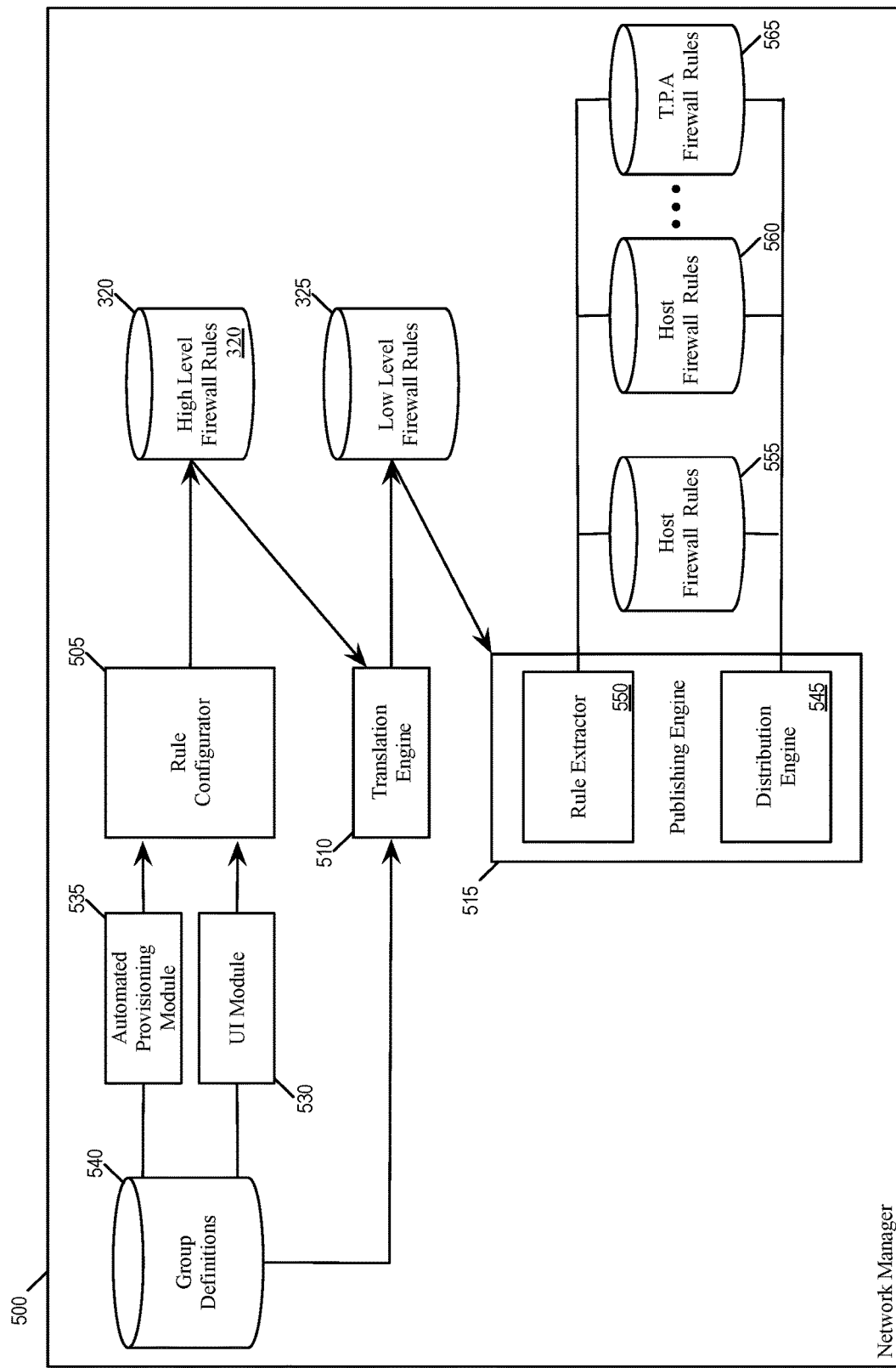
FIG. 5 illustrates another controller that specifies and distributes AppliedTo firewall rules.

FIG. 5 illustrates a network manager 500 of some embodiments of the invention. Like the network manager 300 of FIG. 3, the network manager 500 can configure AppliedTo firewall rules in terms of high-level enforcement point identifiers, but distributes the AppliedTo firewall rule in terms of low-level enforcement point identifiers. Also, like the manager 300, the manager 500 includes a rule configurator 505, a translation engine 510, a publishing engine 515, a high-level data storage 320, and a low-level data storage 325. In addition to these components, FIG. 5 illustrates the network manager 500 to include a user interface (UI) module 530, an automated provisioning module 535, a group-definition data storage 540, and several enforcing-device data storages 555, 560 and 565.

The firewall rule configurator 505 configures the AppliedTo firewall rules by interacting with users (e.g., network administrators) through the UI module 530. It also configures the AppliedTo firewall rules at the direction of automated provisioning module 535 that directs the configurator to specify these rules as part of the provisioning of a physical or logical network. For instance, when the network manager 500 is part of a network control system that manages logical networks in a multi-user (e.g., multi-tenant) hosted environment, the provisioning module 535 in some embodiments directs the configurator 505 to specify at least some of the AppliedTo firewall rules when a logical network is being specified for one user (e.g., for one tenant).

The configurator 505 allows users (through the UI module 530) or the provisioning module 535 to specify AppliedTo firewall rules in terms of high-level enforcement point identifiers. Examples of such high-level enforcement point identifiers are the high-level network, compute, and security constructs, such as logical switches, logical routers, logical networks, physical networks, compute clusters, datacenters, etc. The configurator 505 stores the AppliedTo firewall rules that it configures in the rule data storage 320.

From the rule data storage 320, the translation engine 510 retrieves the AppliedTo firewall rules, and converts the high-level enforcement point identifiers in the AppliedTo tuples of the retrieved rules to low-level enforcement point identifiers. For instance, in some embodiments, the translation engine converts compute constructs (e.g., datacenter identifiers, compute cluster identifiers, host identifiers, etc.), network constructs (e.g., LFE identifiers, logical network identifiers, etc.), and security groups (formed by one or more network or compute constructs) into VNIC and wildcard values. More generally, in some embodiments, the translation engine is for translating identifiers in the firewall rules from high-level constructs such as containers or security groups to lower end identifiers such as IP addresses, MAC addresses, VNIC identifiers, or wildcards. In so converting the enforcement point identifiers, the translation engine 510 ensures that all AppliedTo firewall rules are defined by low-level enforcement point identifiers that can be deciphered by all firewall-enforcing devices that receive the AppliedTo firewall rules. The translation engine stores the AppliedTo firewall rules that it retrieves, and when necessary converts, in the low-level rule data storage 325.

To convert high-level enforcement point identifiers (e.g., the high-level network construct, compute construct, and security groups) to low-level enforcement point identifiers (e.g., to VNIC and wildcard values), the translation engine relies on the definition of the high-level groups that are stored in the group definition data storage 540. These definitions are stored by a user (through the UI module 530) or by the automated provisioning module 535.

In some embodiments, these definitions are statically defined. In other embodiments, some or all of the high-level group definitions are dynamically modifiable by a user or the provisioning module 535. Specifically, the AppliedTo identifier in some embodiments can refer to dynamically modifiable constructs, which, in turn, allows the manager 500 to dynamically adjust the firewall rules for different locations within a network by dynamically adjusting the membership of the dynamically modifiable constructs. In some embodiments, the rule configurator 305 can specify one or more of the compute constructs, network constructs and security groups as dynamic containers that can have members (e.g., forwarding elements, hosts, VNICs, etc.) dynamically added and/or removed from them.

For enforcement points that are defined by reference to static or dynamic groups, the translation engine 510 (1) uses the group definitions in the data storage 540 to identify the low-level identifiers (e.g., the VNIC and wildcard values) associated with the high-level identifiers, (2) substitutes the high-level identifiers with the identified low-level identifiers, and (3) stores the resulting rules in the data storage 325. When a dynamic container that is used to define the AppliedTo tuple(s) of one or more firewall rules is modified, the translation engine updates the low-level enforcement point identifiers of the affected firewall rules. As further described below, the publishing engine 515 then sends the updated membership change for the affected firewall rules to the firewall-enforcing devices that need to be informed of this membership change. This approach foregoes the need to resend the affected firewall rules to the firewall-enforcing devices that previously received these rules. However, the publishing engine will send an affected firewall rule to a new firewall-enforcing device when the membership change to a dynamic container requires the addition of a new firewall-enforcing device.

Like the translation engine 310 of the network manager 300, the translation engine 510 of the network manager 500 translates other parameters (e.g., source and destination identifiers) of the firewall rules from the data storage 320 before storing the translated rules in the data storage 325. Also, like the translation engine of the manager 300, the translation engine 510 of the network manager 500 operates differently in other embodiments. For instance, in some embodiments, the translation engine leaves some or all of the translation of the high-level constructs of the firewall rules of the data storage 320 to some or all of the firewall-enforcing devices to do.

Also, even in some embodiments that have the network manager 500 distribute firewall rules with low-level AppliedTo identifiers (e.g., with only VNIC and wildcard values), the network manager 500 does not use the translation engine 510 to unpack (i.e., to convert) the high-level AppliedTo identifiers (e.g., the high-level network, compute, and/or security constructs) into low-level AppliedTo identifiers. For instance, in some embodiments that specify each high-level AppliedTo identifier (e.g., each compute cluster identifier, LFE identifier, etc.) as an object with a reference to a list of VNIC values, the translation engine's job is to populate the VNIC list of the high-level identifier object with the identities or references to wildcard values or the VNICs that are members of the high-level AppliedTo identifier (e.g., are members of the compute cluster, the LFE, etc.). In some embodiments, the rule configurator 305 so populates the VNIC list (e.g., by reference to the group definitions in the data storage 540), and hence in these embodiments, a translation engine will not be needed for any processing associated with the high-level AppliedTo identifiers.

The publishing engine 515 collects and distributes enforcing-device AppliedTo rules from the low-level data storage 325. As shown in FIG. 5, the publishing engine 515 includes a rule extractor 550 and a distribution engine 545. For each firewall-enforcing device, the rule extractor 550 identifies and retrieves from the low-level data storage 325, the AppliedTo rules that pertain to the enforcing device. The rule extractor 550 stores the retrieved firewall rules for each particular firewall-enforcing device in a data storage (e.g., data storages 555, 560, and 565) that the publishing engine maintains for the particular firewall-enforcing device.

In some embodiments, the rule extractor 550 only retrieves and stores for each firewall-enforcing device the AppliedTo rules that pertain to that firewall-enforcing device. As such, the enforcing-device data storages (e.g., data storages 555, 560, and 565 that store the firewall rules for each firewall-enforcing device) are typically much smaller than the high-level and low-level data storages 320 and 325, because the enforcing-device data storages contain only AppliedTo rules that pertain to their respective enforcing device.

In some embodiments, the AppliedTo firewall rules that pertain to a firewall-enforcing device include the AppliedTo rules that relate to data end nodes (e.g., the VMs or the VM VNICs) that are connected to the firewall-enforcing device. In some embodiments, the rules that pertain to each firewall-enforcing device also include the AppliedTo rules that relate to data end nodes that may be connected to the firewall-enforcing device. For instance, when a particular host belongs to a compute cluster that implements a particular logical network, the rule extractor 550 of some embodiments stores, in a data storage for the particular host, the AppliedTo rules that are specified for the logical network even before a VM that belongs to the logical network is instantiated on the particular host. Pushing the AppliedTo firewall rules ahead of time to such a host is advantageous because it allows the host to configure the firewall rules for the VM without interacting with a network manager.

In some embodiments, the rule extractor 550 collects the AppliedTo rules for each enforcing device by examining the high-level AppliedTo data storage 320. For instance, some embodiments do not define a low-level AppliedTo data storage 325. In these embodiments, the rule extractor 550 sifts through the high-level AppliedTo data storage 320 to identify AppliedTo firewall rules that are applicable to a firewall-enforcing device.

FIG. 5 shows three of the data storages 555, 560, and 565 that the rule extractor 550 maintains. Two of these data storages 555 and 560 are for hosts that execute firewall engines that serve as firewall-enforcing devices for the VMs executing on the hosts. The third data storage 565 is for a third-party firewall appliance. The publishing engine (1)

only publishes non-AppliedTo firewall rules (i.e., rules without the AppliedTo identifier) to the non-host firewall-enforcing devices in some embodiments, (2) only publishes AppliedTo firewall rules to the non-host firewall-enforcing devices in other embodiments, and (3) publishes non-AppliedTo firewall rules to some non-host firewall-enforcing devices while publishing AppliedTo firewall rules to other non-host firewall-enforcing devices.

Accordingly, in some embodiments, the rule extractor removes the AppliedTo identifiers for all firewall rules that are to be published to non-host firewall-enforcing devices, before storing the firewall rules in the data storages (e.g., data storage 565) that it maintains for these devices. In other embodiments, the rule extractor stores the firewall rules with their AppliedTo identifiers in the data storages (e.g., data storage 565) that it maintains for the non-host firewall-enforcing devices. In still other embodiments, the rule extractor stores the firewall rules without their AppliedTo identifiers for some non-host firewall-enforcing devices while storing the firewall rules with their AppliedTo identifiers for other non-host firewall-enforcing devices.

In some embodiments, the distribution engine 545 of the publishing engine 515 pushes to each firewall-enforcing device (through a network) the firewall rules that are stored in the data storage that the rule extractor maintains for the firewall-enforcing device. In other embodiments, the firewall-enforcing devices pull the firewall rules from the distribution engine. In still other embodiments, the distribution engine pushes the firewall rules to some of the firewall-enforcing devices, while serving as a resource to pull firewall rules for other firewall-enforcing devices.

As mentioned above, the publishing engine distributes to the firewall-enforcing devices updates to AppliedTo enforcement point sets when a user or an automated process dynamically modifies such sets. Such modifications cause the translation engine in some embodiments to update the firewall rules in the low-level data storage 325. This, in turn, can cause the rule extractor to update the AppliedTo fields in one or more rules in one or more enforcing-device data storages that it maintains for the firewall-enforcing devices. Updates to the firewall rules in the low-level data storage can also cause the rule extractor to create a new firewall rule for a newly specified enforcement point (i.e., a firewall-enforcing device that is added as an enforcement point for a previously specified AppliedTo firewall rule in the data storage 325). The distribution engine then distributes (e.g., through push or pull actions) the updated AppliedTo memberships and/or newly added firewall rules to the affected firewall-enforcing devices.

Figure 6:
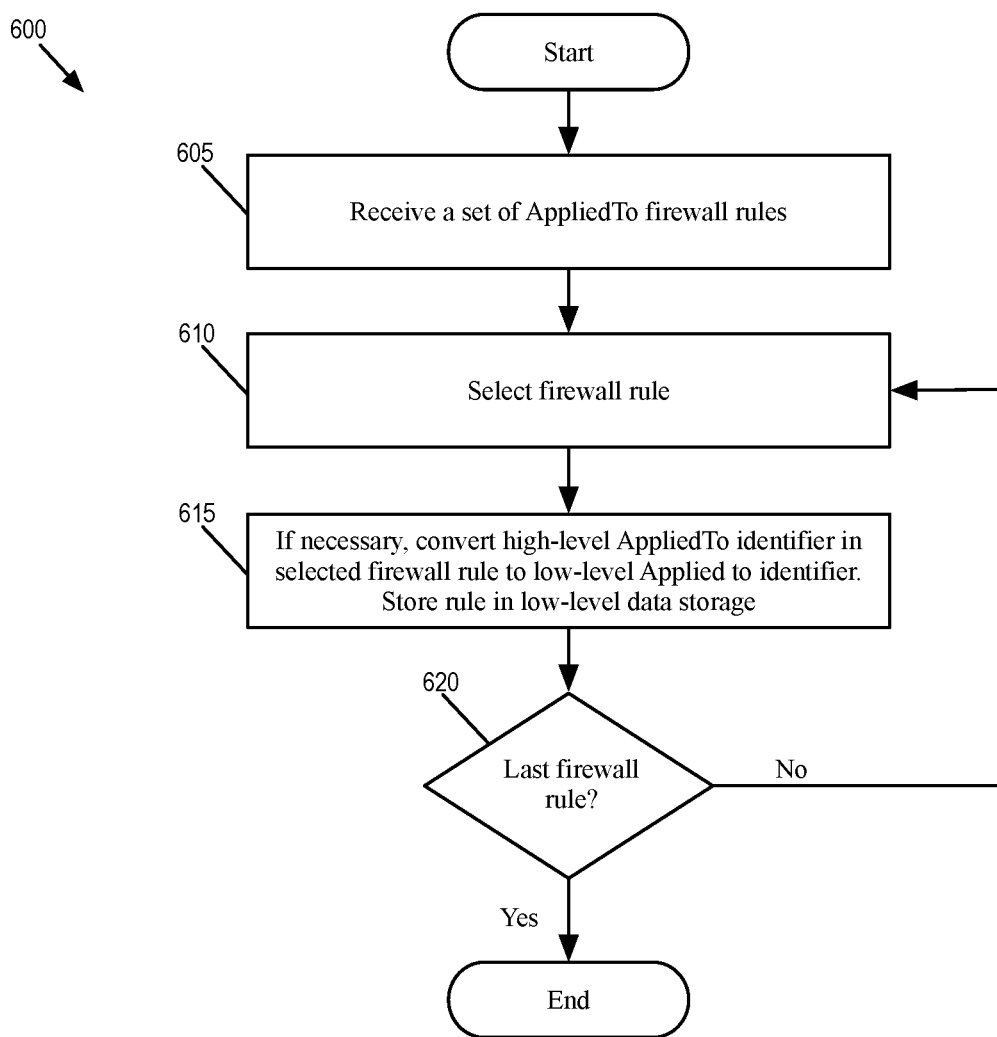
FIGS. 6-8 illustrate processes for several operations of the controller of FIG. 5 in some embodiments.

The operation of the network manager 500 in some embodiments will now be described by reference to FIGS. 6-9. FIG. 6 illustrates a process 600 that the translation engine 510 of the network manager 500 performs in some embodiments. The process 600 in some embodiments is performed each time a set of AppliedTo firewall rules are stored in the high-level data storage 320. In some embodiments, the process 600 is performed as a batch process, while in other embodiments it is performed in real-time upon receiving a notification of the storage of the set of AppliedTo firewall rules in the high-level data storage 320.

As shown in FIG. 6, the process initially receives (at 605) the identity of the set of AppliedTo firewall rules that have been added to the high-level data storage. These rules may be specified in terms of high-level AppliedTo identifiers (e.g., high-level compute constructs, network constructs, and/or security groups) or low-level AppliedTo identifiers (e.g., VNIC and wildcard values).

The process then selects (at 610) one of the AppliedTo firewall rules in the received set. Next, at 615, the process determines whether the selected AppliedTo firewall rule has an AppliedTo identifier that is defined in terms of at least one high-level construct. If so, the process converts (at 615) the high-level AppliedTo identifier to a low-level Applied to identifier. To convert high-level AppliedTo identifiers (e.g., the high-level network construct, compute construct, and security groups) to low-level AppliedTo identifiers (e.g., to VNIC and wildcard values), the process 600 relies on the definitions of the high-level groups that are stored in the group definition data storage 540. Specifically, for AppliedTo identifiers that are defined by reference to groups defined in the data storage, the process 600 (1) uses the group definitions in the data storage 540 to identify the low-level identifiers (e.g., the VNIC and wildcard values) associated with the high-level identifiers, (2) substitutes the high-level identifiers in the AppliedTo firewall rule with the identified low-level identifiers, and (3) stores the resulting rules in the data storage 325. At 615, the process in some embodiments translates other parameters (e.g., source and destination identifiers) of the firewall rules (from the data storage 320) before storing the translated rules in the data storage 325.

At 620, the process determines whether it has examined all the AppliedTo firewall rules in the set received at 605. If not, the process returns to 610 to select another AppliedTo firewall rule, and then performs the operation 615 to translate this rule to a low-level rule, if such a translation is necessary. When the process determines (at 620) that it has examines all the AppliedTo firewall rules in the received set, it ends.

In this manner, the process 600 converts high-level compute constructs (e.g., datacenter identifiers, compute cluster identifiers, host identifiers, etc.), network constructs (e.g., LFE identifiers, logical network identifiers, etc.), and security groups (formed by one or more network or compute constructs) in the AppliedTo firewall rule, into low-level identifiers (e.g., VNIC and wildcard values). In so converting the enforcement point identifiers, the translation process 600 ensures that all AppliedTo firewall rules are defined by low-level enforcement point identifiers that can be deciphered by all firewall-enforcing devices that receive the AppliedTo firewall rules.

Figure 7:
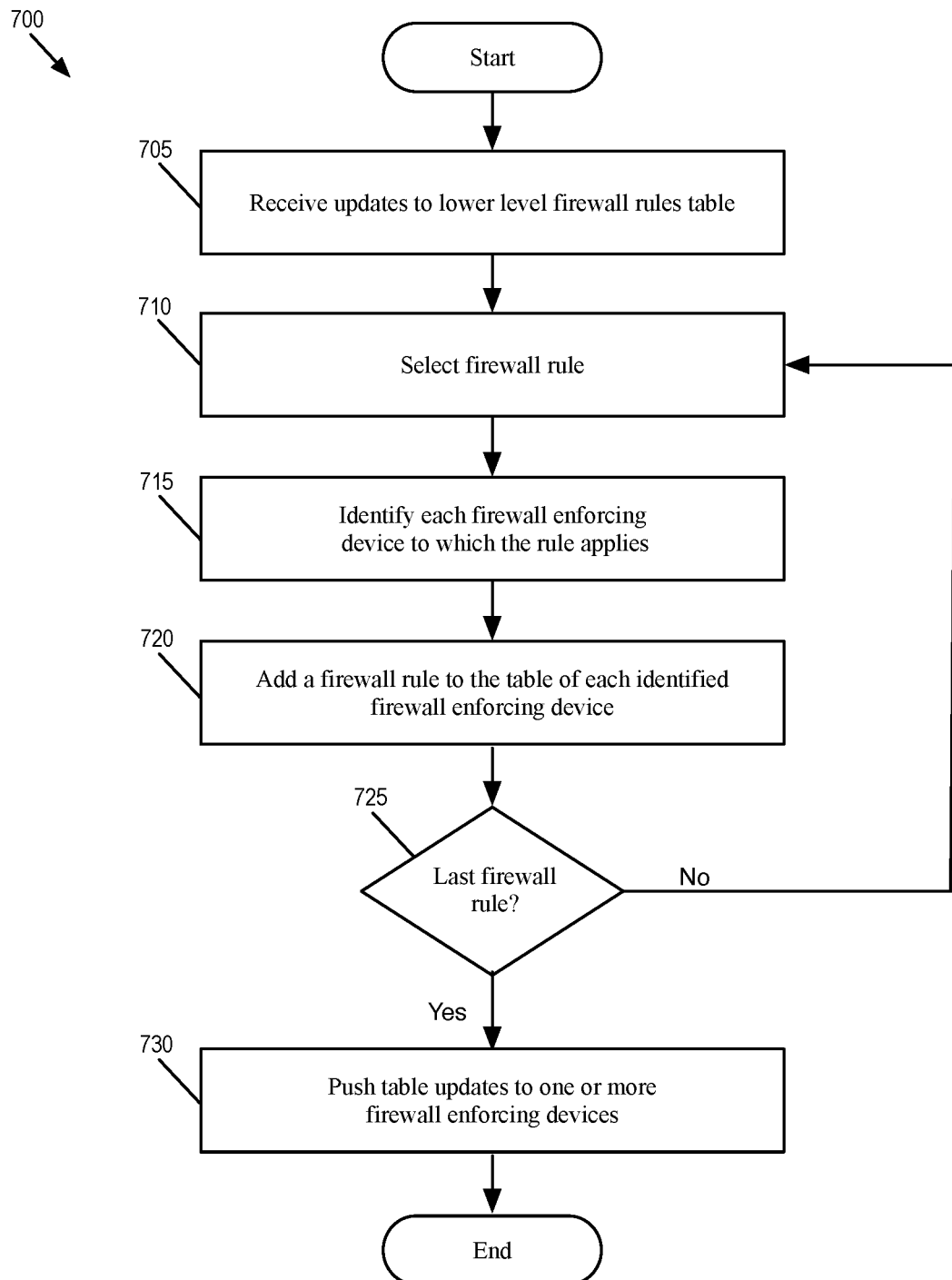

FIG. 7 illustrates a process 700 that the publishing engine 515 of the network manager 500 performs in some embodiments. In some embodiments, the process 700 is performed each time a set of AppliedTo firewall rules are stored in the low-level data storage 325. This process 700 collects and distributes host-level AppliedTo rules from the low-level rule data storage 325. In some embodiments, the process 700 is performed as a batch process, while in other embodiments it is performed in real-time upon receiving a notification of the storage of a set of AppliedTo firewall rules in the low-level data storage 325.

As shown in FIG. 7, the process initially receives (at 705) the identity of the set of AppliedTo firewall rules that have been added to the low-level data storage. In some embodiments, the AppliedTo data tuples of these rules are specified in terms of VNIC and wildcard values. The process then selects (at 710) one of the AppliedTo firewall rules in the received set.

Next, at 715, the process identifies each firewall-enforcing device to which the selected rule applies. This rule extraction operation 715 is based on the value(s) specified by the AppliedTo identifier of the selected rule. For instance, in some embodiments, the rule extractor 550 examines each value specified by the AppliedTo identifier of the selected rule to identify the firewall-enforcing device that is related to the examined value (e.g., to identify hypervisor firewall engine or to identify a host that is related to a VNIC value specified by an AppliedTo identifier).

In some embodiments, only one firewall-enforcing device is related to any one non-wildcard AppliedTo value. In other embodiments, however, more than one firewall-enforcing device can be related to an AppliedTo value because multiple firewall-enforcing devices may connect at different times to a data end node specified by the AppliedTo value. Because of this, the publishing engine distributes a firewall rule for the data end node to each firewall-enforcing device that may connect to the data end node. For instance, when a particular host belongs to a compute cluster that implements a particular logical network on which a particular VM is connected, the rule extraction operation 715 of some embodiments identifies a host as being related to the particular VM's VNIC that is specified by an AppliedTo value, even before the VM is instantiated on the particular host. This is because in these embodiments all the hosts in a compute cluster receive the firewall rules for the VMs connected to the logical network so that any host can configure on the fly the firewall rule table for a VM when the VM is instantiated on the host.

Next, for each firewall-enforcing device that the process 700 identified at 715, the process adds (at 720) the firewall rule selected at 710 to a firewall rule data storage that the process maintains for the firewall-enforcing device. These firewall-enforcing device data storages are typically much smaller than the high-level and low-level data storages 320 and 325, because the enforcing-device data storages contain only AppliedTo rules that pertain to their respective enforcing device. When adding some of the AppliedTo firewall rules to the data storages for some of the firewall-enforcing devices, the process 700 removes the AppliedTo identifier from the rule in some embodiments. The circumstances under which some embodiments remove the AppliedTo identifier were described above in the description of the operation of the publishing engine 515.

At 725, the process determines whether it has examined all the AppliedTo firewall rules in the set received at 705. If not, the process returns to 710 to select another AppliedTo firewall rule, and then performs the operations 715-725 for this newly selected AppliedTo firewall rule. When the process determines that it has examined all the AppliedTo firewall rules in the received set, the process 700 (at 730) pushes (through a network) to each firewall-enforcing device the firewall rules that it stored (at 720) in the data storage of the firewall-enforcing device. After 730, the process ends.

While the rule extraction and distribution process 700 was described above by reference to numerous details, one of ordinary skill in the art will realize that this process can be implemented differently in other embodiments. For instance, instead of pushing the firewall rules to the enforcing devices, the firewall-enforcing devices pull the firewall rules from the publishing engine in other embodiments.

Also, as mentioned above, the process 700 in some embodiments examines each AppliedTo value of each firewall rule to identify the enforcing device data storage that should store the firewall rule. Instead of examining each value specified by the AppliedTo identifier of a low-level firewall rule, the rule extraction operation 715 in some embodiments associates some or all of the firewall rules to the firewall-enforcing devices by associating the high-level or low-level AppliedTo identifiers of the firewall rules in the high-level data storage 320 with one or more firewall-enforcing devices. While using the AppliedTo identifiers (e.g., high or low level identifiers) in the high-level data storage 320 to associate the firewall rules with the firewall-enforcing devices, some embodiments push to the firewall-enforcing devices (1) the low-level AppliedTo identifiers that are stored in the high-level data storage 320, and (2) the low-level AppliedTo identifiers (e.g., from the group-definition storage 540) that correspond to the high-level AppliedTo identifiers that are identified in the high-level data storage 320.

Also, instead of defining and maintaining data storages for all firewall-enforcing devices individually, the rule extraction operation 715 aggregates the firewall rules for at least one group of related firewall-enforcing devices in one data storage in some embodiments. For instance, in some embodiments, all hosts of one compute cluster in a datacenter receive the same set of firewall rules because each host in the compute cluster needs to be prepared to implement each logical switch that is implemented by any one host in the compute cluster. Accordingly, for all hosts in one compute cluster, the process 700 in some embodiments creates just one compute-cluster data storage 555 that contains all the firewall rules for all the hosts in that cluster.

Figure 8:
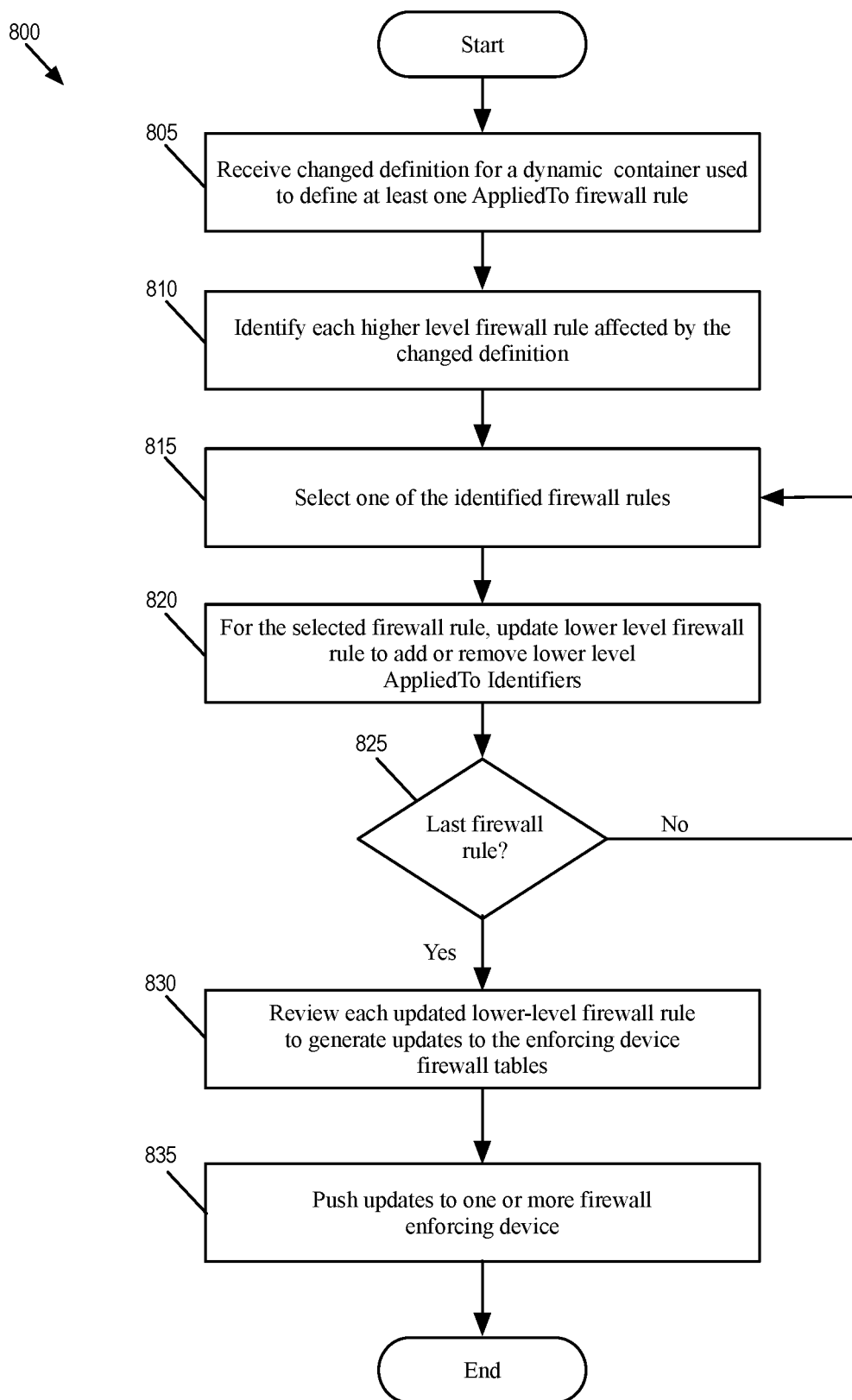

FIG. 8 illustrate a process 800 that the network manager 500 performs in some embodiments to update the AppliedTo values of firewall rules when the membership of a dynamic construct that is used to define an AppliedTo identifier is modified. The process 800 sends updated membership change for the affected firewall rule(s) to any firewall-enforcing devices that need to be informed of this membership change. The process 800 also sends an affected firewall rule to a new firewall-enforcing device, or removes the affected firewall rule from a firewall-enforcing device, when the membership change to a dynamic container requires the addition or removal of a firewall-enforcing device.

The process 800 will be explained by reference to an example illustrated in FIG. 9. This example illustrates the creation of AppliedTo firewall rules in the high- and low-level data storages 320 and 325 based on a dynamic security group SGZ (stored in a storage 940 for dynamic security groups), and the modification of the AppliedTo firewall rule in the low-level data storage 325 after a modification to the membership of the security group SGZ.

As shown in FIG. 8, the process 800 starts when it is notified (at 805) of the modification to the definition of a dynamic construct (e.g., a network construct, a compute construct, or a security group) that is used to define the AppliedTo identifier of one or more AppliedTo rules in the high-level data storage 320. As mentioned above, the group-definition data storage stores the definition of the dynamic constructs in some embodiments. In some of these embodiments, a user (through the UI module 530) or the automated provisioning module 535 can modify the definition of a dynamic construct at 805. Also, in some embodiments, the group-definition storage 540 provides (at 805) a callback to the translation engine, in order to notify this engine of a modification to a definition of a dynamic construct.

At 810, the process identifies each high-level firewall rule that is affected by the changed definition of the dynamic construct. This is because one dynamic construct can be used in multiple AppliedTo identifiers of multiple AppliedTo firewall rules in the high-level data storage 320. The process 800 then selects (at 815) one of the high-level firewall rules identified at 810. For the selected high-level firewall rule, the process 800 then updates (at 820) its corresponding low-level firewall rule in the low-level data storage 325 to reflect the change to the definition of the dynamic construct. This update may result in the addition or removal of one or more low-level AppliedTo identifiers from the corresponding low-level firewall rule.

Figure 9:
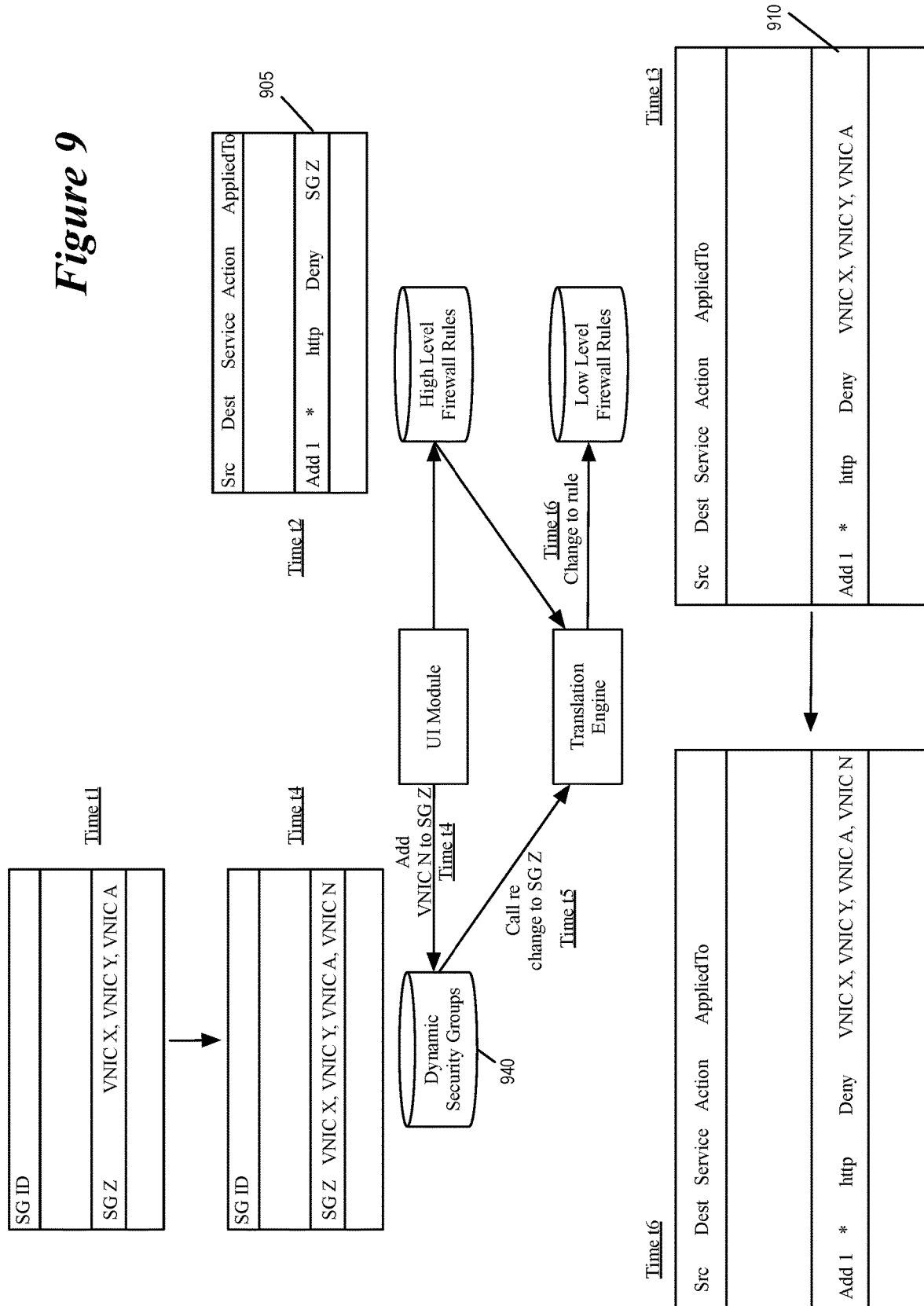
FIG. 9 illustrates an example that reflects the addition of a VNIC to a low-level firewall rule after this VNIC has been added to the definition of a security group.

FIG. 9 illustrates an example that reflects the addition of a VNIC (called VNIC N) to a low-level firewall rule after this VNIC has been added to the definition of the security group SGZ. As shown in this figure, before VNIC N is added to the definition of the security group SGZ, the security group is defined (at time t1), a high-level rule 905 is created by reference to this group SGZ in the high-level data storage 320 (at time t2), and a low-level rule 910 is created for the high-level rule 905 in the low-level data storage 325 (at time t3). Once the security group SGZ is modified (at time t4) to include the VNIC N, the translation engine is notified (at time t5) of this change. The translation engine then identifies high-level rule 905 as a rule that refers to the modified security group SGZ. This engine next modifies the low-level rule 910 (at time t6) to include VNIC N in the AppliedTo identifier of this rule.

After 820, the process determines (at 825) whether it has examined all high-level firewall rules that it identified at 810 (i.e., all the high-level rules that refer to the modified dynamic construct). If not, the process returns to 815 to select another identified high-level firewall rule and to update (at 820) the low-level firewall rule corresponding to the high-level firewall rule. Otherwise, the process transitions to 830.

At 830, the process 800 reviews each low-level rule that it has updated at 820, in order to update the enforcing-device data storages (e.g., data storages 555, 560 and 565) that contain the firewall rules for the firewall-enforcing devices. To perform this update, the process in some embodiments identifies the newly added or removed AppliedTo value(s) of each affected low-level firewall rule, and adds or removes this value from each enforcing-device firewall rule (in an enforcing-device data storage) that needs to be so updated. For instance, in the example illustrated in FIG. 9, the addition of the VNIC N to the low-level firewall rule 910 might require the addition of this VNIC to a host-level or a compute-cluster level data storage that stores the firewall rules for an affected host or compute cluster. An affected host is a host that executes or may execute a VM with the VNIC N, while an affected compute cluster is a compute cluster that includes such a host.

In this manner, the process (at 830) pushes to one or more enforcing-device data storages the updated membership change to the low-level firewall rule(s) that is caused by the change in the dynamic construct. In some cases, the change in the dynamic construct and resulting change in one or more low-level firewall rules require a firewall rule to be added to or removed from one or more enforcing-device data storages. Accordingly, in some cases, the process 800 sends an affected firewall rule to a new firewall-enforcing device, or removes the affected firewall rule from a firewall-enforcing device, when the membership change to a dynamic container requires the addition or removal of a firewall-enforcing device.

After updating the enforcing-device data storage(s) at 830, the process 800 pushes (at 835) updates to each firewall-enforcing device (through a network) which had a data storage updated at 830 by the process 800. When the process updates (at 830) the AppliedTo membership of a firewall rule in an enforcing device's data storage, the process sends (at 835) the membership change to the enforcing device. On the other hand, when the process adds (at 830) a new firewall rule to an enforcing device's data storage, the process sends (at 835) the firewall rule to the enforcing device. Based on the received modification, the firewall-enforcing device modifies the membership of its firewall rule, or adds or removes a firewall rule. After 835, the process ends.

One of ordinary skill in the art will realize that the update process 800 is implemented differently in other embodiments of the invention. For instance, the network manager 500 in some embodiments does not maintain low-level rules in the low-level data storage 325. In these embodiments, the update process uses the updated group definitions in the group-definition storage 540 to update directly the firewall rules that it stores in the enforcing device data storages, when the membership of a dynamic construct is modified in the group-definition store.

B. Operation at Hosts

Figure 10:
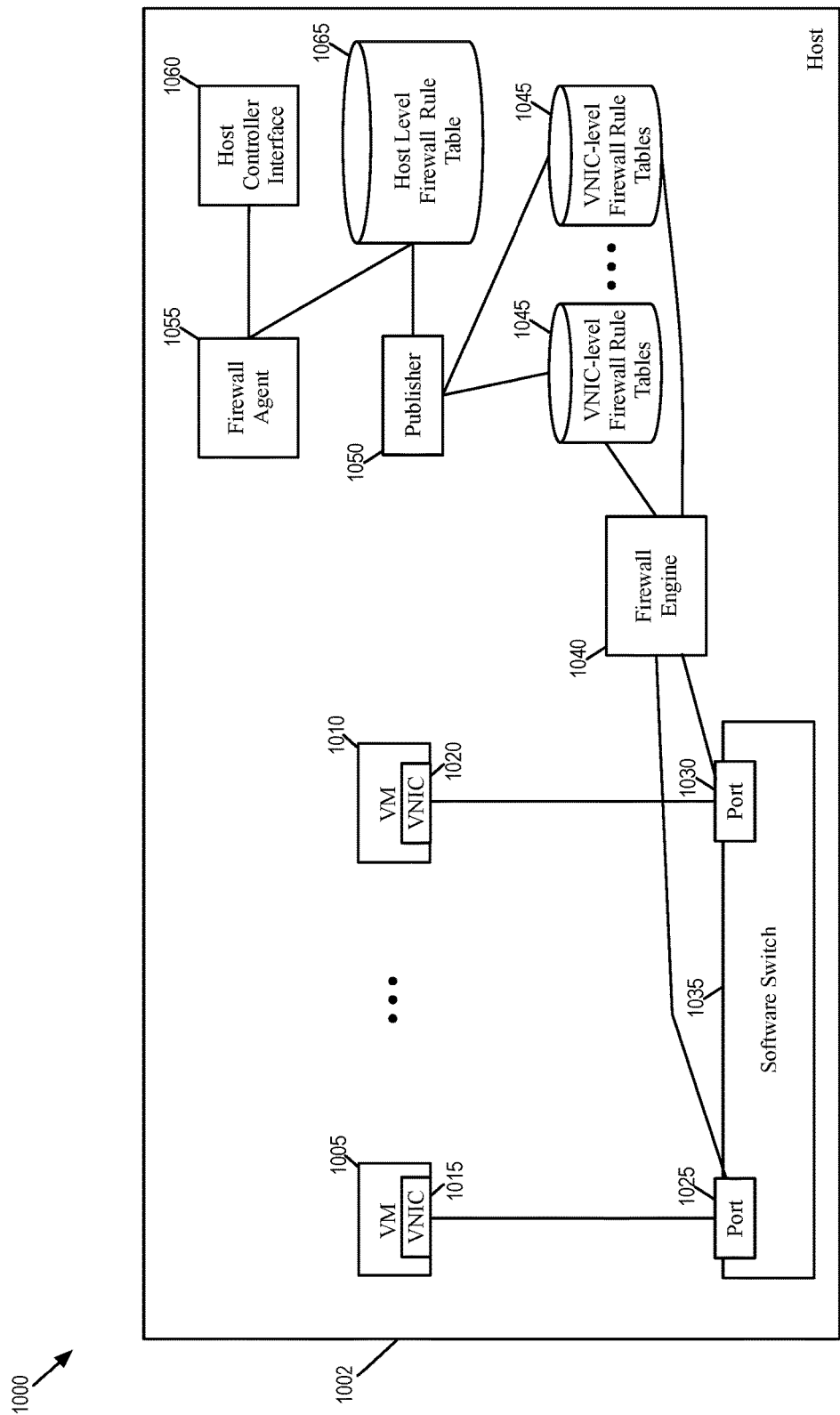
FIG. 10 illustrate the firewall enforcement architecture of a multi-VM host of some embodiments of the invention.

FIG. 10 illustrate the firewall enforcement architecture 1000 of a multi-VM host 1002 of some embodiments of the invention. This host receives AppliedTo firewall rules and based on these rules, specifies multiple VNIC-level firewall rule data storages, which it then uses to perform VNIC-level firewall operations on packets sent by, and received for, each VM.

As shown in FIG. 10, the virtualization architecture 1000 includes (1) multiple VMs 1005 and 1010, (2) a VNIC 1015 or 1020 for each VM, (3) a software switch 1035, (4) a port 1025 or 1030 for each VNIC, (5) a firewall engine 1040, (6) VNIC-level firewall rules 1045, (7) a firewall rule publisher 1050, (8) a firewall agent 1055, (9) a host-level firewall rule table 1065, and (1) a host-controller interface 1060.

In some embodiments, the VMs execute on top of a hypervisor (not shown) that is executing on the host. FIG. 10 illustrates just two VMs 1005 and 1010, but a larger number of VMs execute on the host 1002 in some cases. Each VM may belong to one tenant or to multiple tenants when the host operates in a multi-tenant environment.

Each VM includes a VNIC in some embodiments. For instance, VM 1005 includes VNIC 1015 while VM 1010 includes VNIC 1020. Each VNIC of the VM is responsible for exchanging packets between the VM and the software switch. As further described below, each VNIC connects to a particular port of the software switch, which connects to a physical NIC (not shown) of the host. In some embodiments, the VNICs are software abstractions of a physical NIC that are implemented by the virtualization software.

In some embodiments, the software switch maintains a single port for each VNIC of each VM. For instance, for VNICs 1015 and 1020, the software switch 1035 includes ports 1025 and 1030. The software switch 1035 performs packet-processing operations to forward packets that it receives on one of its ports to another one of its ports. For example, in some embodiments, the software switch tries to use data in the packet (e.g., data in the packet header) to match a packet to flow based rules, and upon finding a match, to perform the action specified by the matching rule. The software switch 1035 connects to a physical NIC (through a NIC driver (not shown)) to send outgoing packets and to receive incoming packets. In some embodiments, the software switch 1035 is defined to include a port (not shown) that connects to the physical NIC's driver to send and receive packets to and from the NIC.

Also, in some embodiments, the software switch of one host can form multiple logical switches with software switches of other hosts, with each logical switch serving a conceptual switch that services a logical network. In other words, different logical switches can be defined to specify different logical networks for different users, and each logical switch can be defined by multiple software switches on multiple hosts. VXLAN provides one manner for creating such logical switches. The VXLAN standard is described in Mahalingam, Mallik; Dutt, Dinesh G.; et al. (2013 May 8), VXLAN: A Framework for Overlaying Virtualized Layer 2 Networks over Layer 3 Networks, IETF, which is incorporated herein by reference.

In some embodiments, the ports of the software switch 1035 include one or more function calls to one or more modules that implement special input/output operations on incoming and outgoing packets that are received at the ports. One of these function calls is to the firewall engine 1040, which performs in some embodiments firewall operations on incoming and/or outgoing packets (i.e., on packets that are received by the host for one of the VMs or on packets that are sent by one of the VMs). Other examples of such I/O operations include ARP broadcast suppression operations and DHCP broadcast suppression operations, as described in U.S. patent application Ser. No. 14/070,360, published as U.S. Patent Application Publication 2015/0058968. Other I/O operations can be so implemented in some embodiments of the invention. By implementing a stack of such function calls, the ports can implement a chain of I/O operations on incoming and/or outgoing packets in some embodiments. Also, in some embodiments, other modules in the data path (such as the VNICs, etc.) implement the I/O function call operations (such as the firewall function calls).

As mentioned above, the firewall engine 1040 can be called (e.g., by a port 1025 or 1030 of the software switch 1035) for incoming or outgoing packets to check whether such packets should be delivered to a VM or sent from a VM based on VNIC-level firewall rules that are stored for the VM's VNIC in the VNIC-level firewall data storage 1045. In some embodiments, the firewall engine 1040 can be called by the port that connects to the physical NIC's driver (e.g., for incoming packets).

The firewall engine tries to match the received packets' identifiers (e.g., five-tuple identifiers extracted from the packet header) with the associated identifiers (e.g., five-tuple identifiers) of the firewall rules stored in the VNIC data storage 1045 of the VNIC that is the destination of an incoming packet or the source of an outgoing packet. In other words, to match a rule with a packet, the firewall engine identifies n-data tuples for a packet (e.g., extracts these tuples from the packet's header) and compares the identified tuples with the n-data tuples of each rule.

The firewall rule publisher 1050 populates and updates the VNIC-level firewall rule data storages 1045 based on the host-level AppliedTo firewall rules that are stored in the host-level firewall rule data storage 1065. In some embodiments, the publisher examines the AppliedTo identifier of each new firewall rule or updated firewall rule in the host-level firewall data storage 1065 to determine whether the rule pertains to a VNIC of one of the VMs currently instantiated on the host. Whenever the publisher 1050 identifies a new or updated rule that pertains to one such VNIC, the publisher pushes the new rule or updated rule to the VNIC's firewall rule table 1045. In pushing this rule to the VNIC's firewall rule table, the publishing engine removes the AppliedTo identifier from the firewall rule before storing the firewall rule in the VNIC's firewall rule table.

The firewall agent 1055 populates and updates the host-level firewall rule data storage 1065 based on host-level AppliedTo firewall rules that it receives from the network manager through the host-controller interface 1060 and the network (not shown). As mentioned above, the network manager in some embodiments pushes to each host the AppliedTo firewall rules for not only the VMs that the host is currently executing but also for the VMs that the host may execute at some later point in time. Also, as mentioned above, a host may operate as part of a compute cluster, and all hosts of the compute cluster in some embodiments are configured to support a set of tenants or logical networks, so that when a VM for one of the tenants or logical networks is instantiated on or moved to one such host, some or all of the data needed for configuring that VM on the host already exists on the host. In some such embodiments, each host in the compute cluster receives the same set of AppliedTo firewall rules, so that each host can configure on its own (without going to the network manager or a controller) the VNIC firewall rule table for any possible VM that may be instantiated on or moved to the host.

In some embodiments, the software switch 1035, the firewall engine 1040, and the VNIC-level firewall rule tables 1045 operate in the kernel space, while the publisher 1050, the firewall agent 1055, the host-level firewall rule table 1065, the host-controller interface 1060 and the VMs 1005 and 1010 operate in the user space. By operating in the kernel space, the firewall engine 1040 operates faster than it would otherwise do in the user space.

Figure 11:
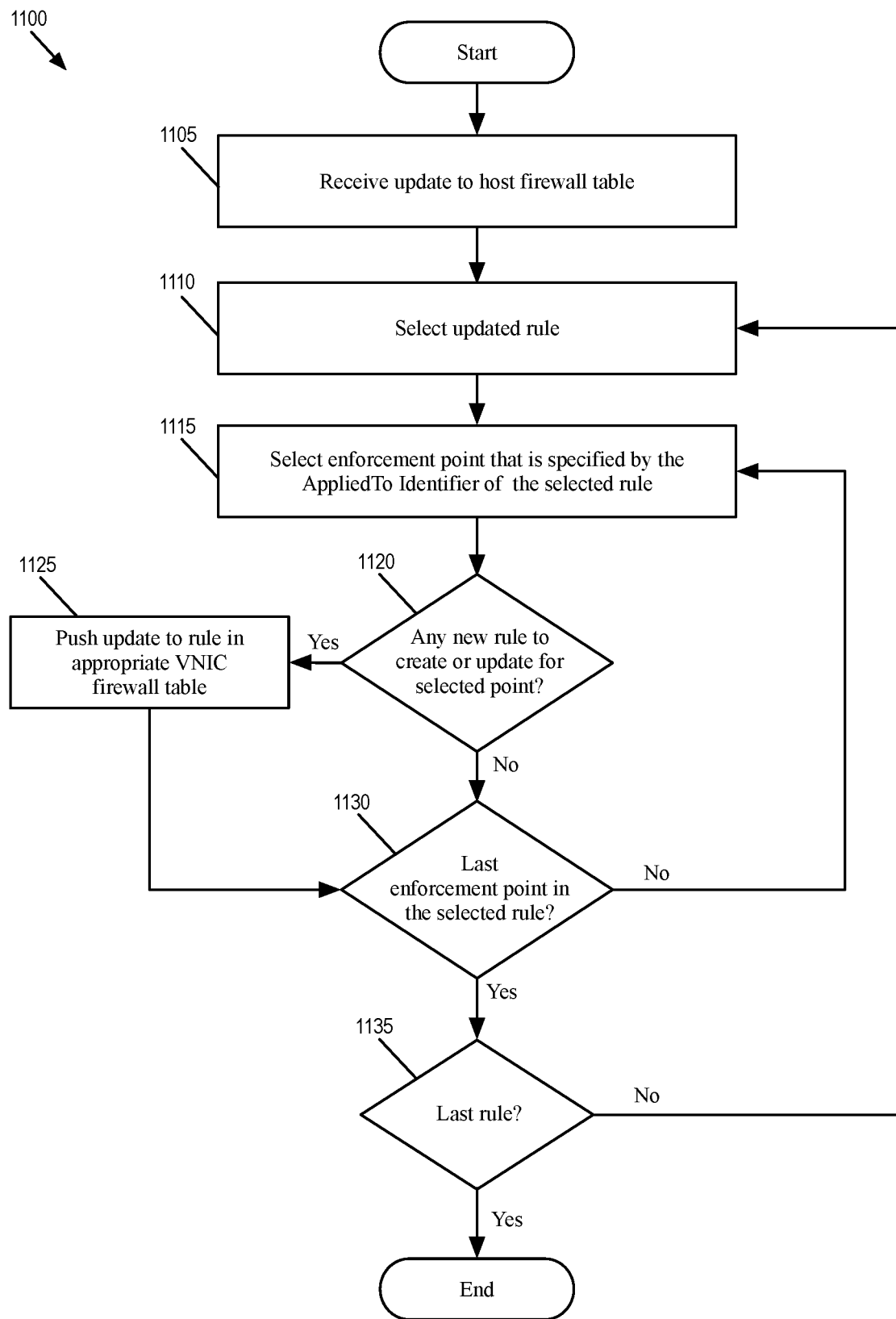
FIGS. 11-13 illustrate processes for several operations of the firewall enforcing modules of the host of FIG. 10 in some embodiments.

The operation of the host 1002 in some embodiments will now be described by reference to FIGS. 11-13. FIG. 11 illustrates a process 1100 that the publisher 1050 performs in some embodiments to maintain the VNIC-level firewall tables 1045. The publisher performs this process each time that the host-level firewall rule table 1065 receives additions and/or modifications to a set of rules from the network manager. In other words, the process 1100 is performed each time the firewall agent 1055 stores a new set of rules in the rule table 1065, removes a set of rules from the rule table 1065, and/or modifies a previous set of rules in the rule table 1065.

As shown in FIG. 11, the process 1100 initially receives (at 1105) a notification of an update to the host firewall table 1065. This update may add one or more rules to the table 1065, remove one or more rules from the table 1065, or modify one or more rules in the table 1065. The collection of all rules affected by this update is referred to below as the received set of updated rules. The notification in some embodiments is in the form of a callback from the data storage 1065. In other embodiments, the notification is provided by the firewall agent 1055. In still other embodiments, the publisher periodically checks the data storage 1065.

Next, at 1110, the process 1100 selects one of the rules in the set of updated rules. The process then selects (at 1115) an enforcement point that is associated with the selected rule. When the selected rule is a newly received rule, the selected enforcement point can be any one of the enforcement points identified by the AppliedTo identifier of the rule selected at 1110. When the selected rule is a rule that has been removed from the host firewall rule table 1065, the selected enforcement point can be any enforcement point that is identified by the AppliedTo identifier of the rule that is being removed. When the selected rule is a rule that was previously stored and that has its set of enforcement points modified, the enforcement point selected at 1115 is one of the enforcement points that has been added or removed by the update to the selected rule.

After 1115, the process determines (at 1120) whether any VNIC-level rule has to be added to, removed from, or updated in a VNIC-level firewall table 1045. In other words, at 1120, the process determines whether the selected enforcement point (i.e., the enforcement point selected at 1115) corresponds to a VNIC of a VM that is executing on the host. If not, the process transitions to 1130, which will be described below. Otherwise, the process pushes (at 1125) an update to the firewall rule data storage 1045 of the VNIC that corresponds to the selected enforcement point. This update adds a firewall rule to the VNIC's data storage 1045 when the selected rule is a new rule or is an updated rule that now also includes the VNIC as an enforcement point. This update removes a previous firewall rule from the VNIC's data storage 1045 when the selected rule is a rule that is being removed or is an updated rule that no longer includes the VNIC as an enforcement point. In adding a firewall rule to the VNIC's data storage 1045, the process 1100 removes (at 1025) the AppliedTo tuple from the firewall rule before adding this firewall rule to the data storage 1045.

From 1125, the process transitions to 1130. At 1130, the process determines whether it has examined all of the enforcement points that it has to examine for the rule selected at 1110. When the selected rule is a new rule to add, or is a previous rule to remove, the process has to examine all the enforcement points that are specified in the AppliedTo identifier of the rule. On the other hand, when the selected rule is an update to a previous rule, the process has to examine all of the new enforcement points that are added to the rule and all of the previous enforcement points that are removed from the rule.

When the process determines (at 1130) that it has not examined all of the necessary enforcement points for the selected rule, it returns to 1115 to select another enforcement point of the selected rule that it has to examine. The process then repeats the subsequent operations to determine whether it has to make any VNIC-level rule changes and if so, to make the VNIC level rule change.

When the process determines (at 1130) that it has examined all of the necessary enforcement points for the selected rule, it determines (at 1135) whether it has examined all of the rules specified by the set of updated rules. If not, it returns to 1110 to select another one of the rules that is specified by the set of updated rules, and then repeats its operations 1115-1130 for this selected rule. When the process determines (at 1135) that it has examined all of the rules specified by the set of updated rules, it ends.

Figure 12:
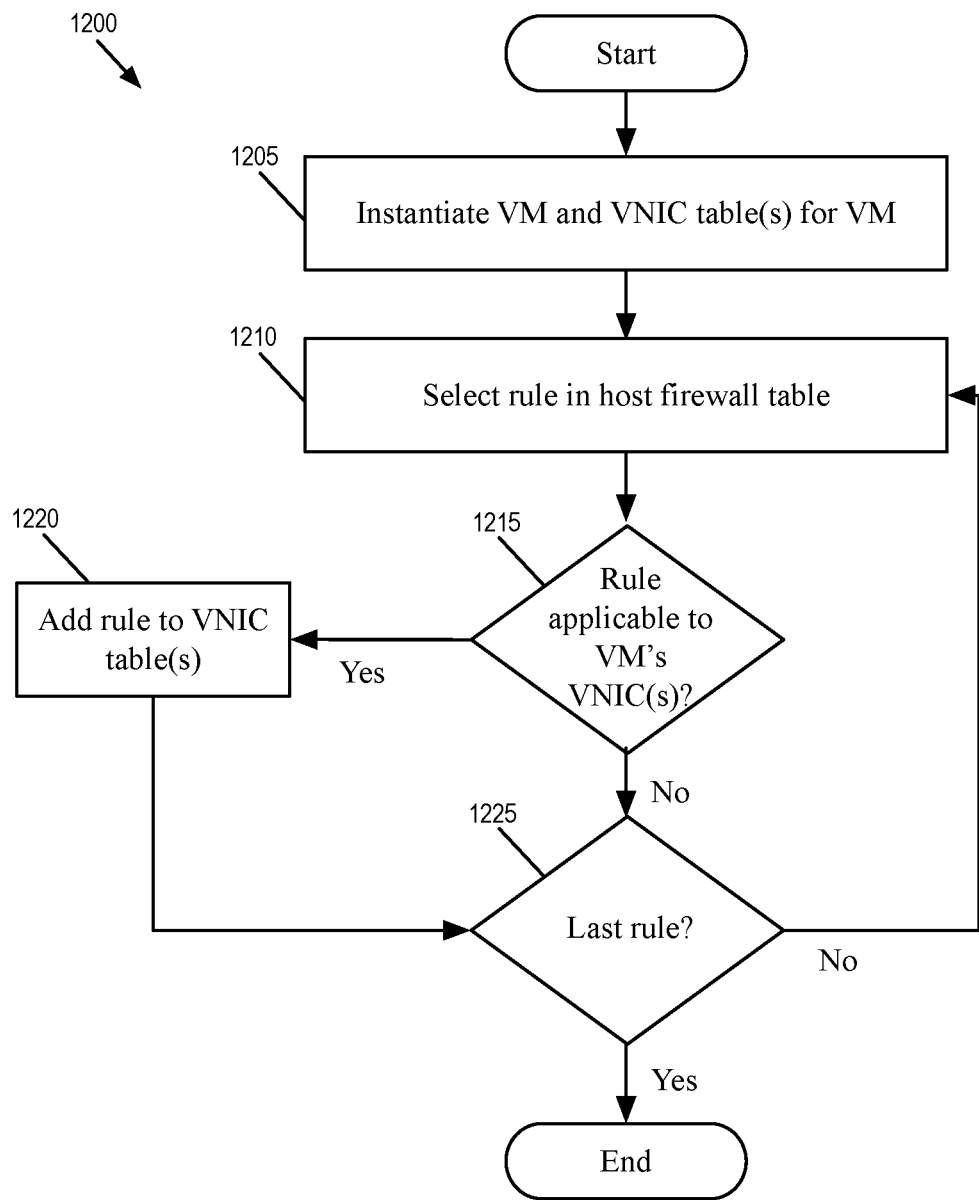

FIG. 12 illustrates a headless process 1200 that the host performs in some embodiments to configure a VNIC-level firewall table when a VM is instantiated on the host. This process is referred to as a headless process as it configures the VNIC-level firewall table without referring to a manager during the configuration of the table. The process is performed as part of the instantiation of the VM, or after the process for instantiating the VM, on the host. As shown, the process initially (at 1205) instantiates the VM and specifies a VNIC-level table for the VM's VNIC. Next, the process selects (at 1210) a firewall rule in the host-firewall rule table 1065.

The process determines (at 1215) whether the selected rule is applicable to the instantiated VM's VNIC. In other words, the process determines whether the AppliedTo identifier of the selected rule identifies the VNIC as one of the enforcement points of the selected firewall rule. When the selected firewall rule is not applicable to the instantiated VM's VNIC (i.e., when the rule's AppliedTo identifier does not identify this VNIC), the process transitions to 1225, which will be explained below.

When the selected firewall rule's AppliedTo identifier identifies the instantiated VM's VNIC, the process adds (at 1220) the selected firewall rule to the VNIC's firewall data storage 1045. In adding this selected firewall rule to the VNIC-level firewall data storage 1045, the process 1200 removes the AppliedTo tuple from the firewall rule. From 1220, the process transitions to 1225.

At 1225, the process determines whether it has examined all the AppliedTo rules in the host-level firewall rule data storage 1065. If not, it returns to 1210 to select another rule, and then repeats its subsequent operations for this selected rule. When the process determines (at 1225) that it has examined all of the AppliedTo rules, it ends.

Figure 13:
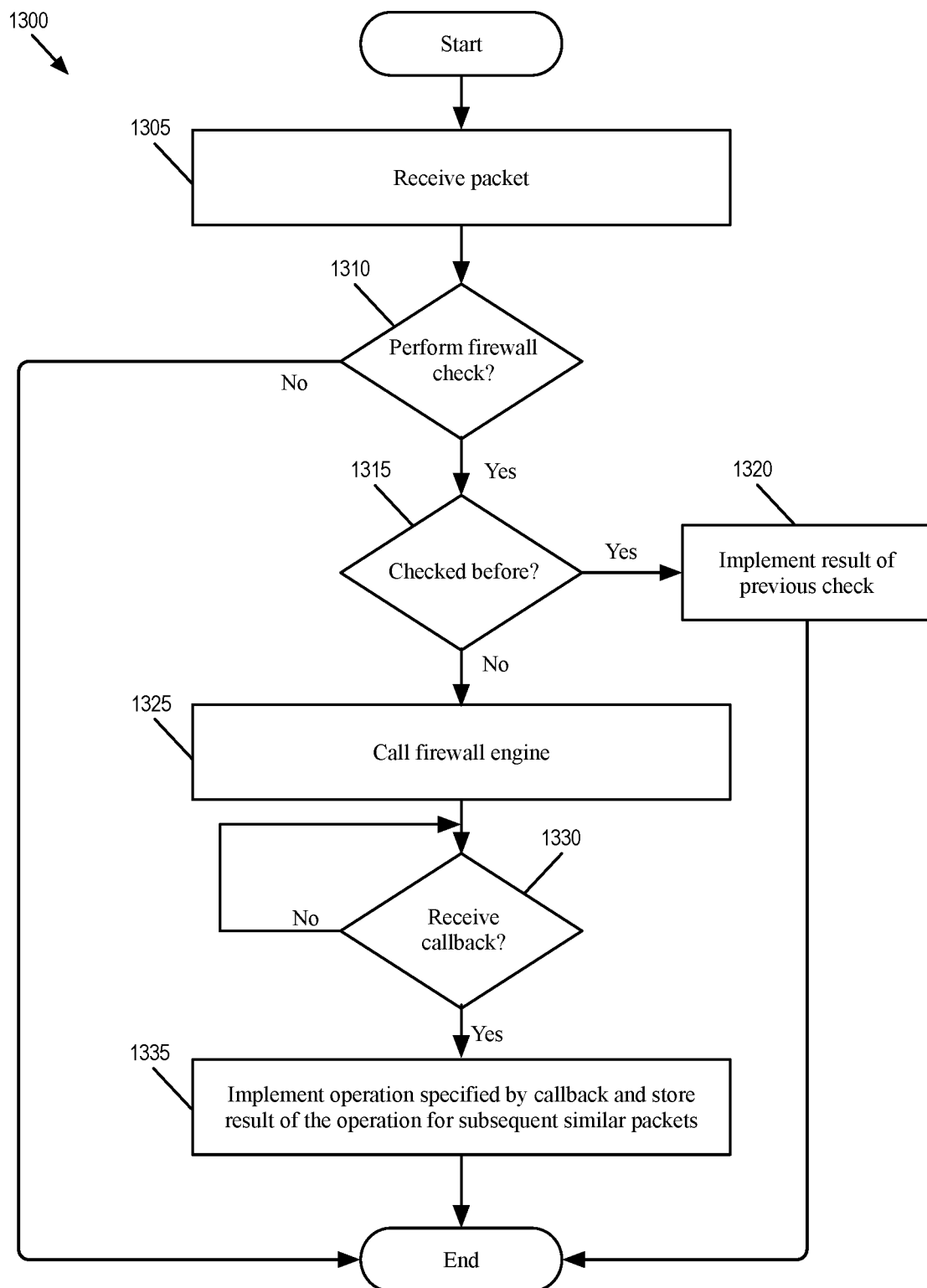

FIG. 13 illustrates a process 1300 that a port of the software switch 1035 performs in some embodiments to enforce firewall rules on a packet that it receives. In some embodiments, the port performs this operation for both incoming and outgoing packets. In other embodiments, the port performs this operation for either only the incoming packets or only the outgoing packets. In still other embodiments, one port (e.g., the port that connects to a VM's VNIC) of the switch performs this operation for outgoing packets, while another port (e.g., the port that connects the software switch to the physical NIC, e.g., through the NICs driver) performs this operation for incoming packets. By checking both incoming and outgoing packets, the process 1300 can enforce AppliedTo firewall rules at both source and destination of packets.

As shown in FIG. 13, the process initially receives (at 1305) a packet. It then determines (at 1310) whether it should perform firewall check for the received packet. In some embodiments, the process makes this determination by determining whether the firewall feature has been enabled for the VNIC that is the source of an outgoing packet or the destination of an incoming packet. If the firewall feature has not been enabled, the process ends.

Otherwise, the process determines (at 1315) whether it previously checked the firewall rules for a packet with identical firewall attribute tuples as the received packet. The firewall engine identifies a firewall rule for a packet based on n-tuples that are retrieved from the packet's header (e.g., the packet's five tuples: source, source port, destination, destination port, and service). Two packets have identical firewall attributes when their n-tuples match. As mentioned below, the process 1300 in some embodiments stores the action that it performs on a particular packet after identifying the firewall rule for the packet, so that it can subsequently perform this action again on packets that are identical to the particular packet.

When the process determines (at 1315) that it has previously checked the firewall rules for an identical packet, it transitions to 1320 to perform the operation (e.g., drop or allow) that was the result of the previous check, and then ends. It should be noted that other embodiments, however, do not store the action that is performed. In these embodiments, the process would not perform the check at 1315 and would transition from 1310 to 1325 when it determines (at 1310) that it has to perform a firewall check on a packet. Alternatively, other embodiments that store the actions that are specified by prior firewall rule checks of the firewall engine 1040, have the firewall engine store these actions in a connection state data storage that the firewall engine maintains for all of the VMs (e.g., stores the prior actions for each port in a connection state table for that port). In these embodiments, the check 1315 for the prior firewall rule and the subsequent operation 1320 based on the prior check, are performed by the firewall engine 1040. In these embodiments, the process 1300 would transition from 1310 to 1325 when it determines (at 1310) that it has to perform a firewall check on a packet, and the firewall rule engine 1040 would perform the check 1315.

When the process 1300 determines (at 1315) that it has not previously checked the firewall rules for an identical packet, it passes the n-tuples of the received packet (i.e., the packet received at 1305) to the firewall engine. With the n-tuples, the firewall engine checks the VNIC-level firewall table 1045 of the VNIC that is the source of an outgoing packet or the destination of an incoming packet to determine what action needs to be done on the received packet. In some embodiments, the VNIC-level firewall table has a catchall rule that ensures that each packet matches at least one rule (i.e., the catchall rule) when it does not match any other rule in the firewall table. Also, in some embodiments, the rules in the firewall rule table are arranged in a hierarchical way, and the rule check is performed according to the hierarchy, to ensure that a packet matches a higher priority rule before matching a lower priority rule when the packet can match more than one rule.

After 1325, the process transitions to 1330, where it waits until it receives a callback from the firewall engine. In some embodiments, the firewall engine's callback either specifies that the packet should be allowed to pass through or it should be dropped. When the process receives the engine's callback, the process transitions to 1335 to perform the action according to the engine's callback. In other words, the process in some embodiments drops the packet when the callback specifies that the packet should be dropped. On the other hand, the process allows the packet to pass through when the callback specifies that the packet should be allowed. It should be noted that in some embodiments the port might not allow a packet to pass through even when the callback specifies that the packet should be allowed to pass through, because some other function might direct the port to drop the packet.

At 1335, the process also stores the operation that the firewall engine specified so that this operation can be used subsequently at 1320, when the port receives a packet that is identical to the received packet. After 1335, the process ends.

II. Firewall Configuration by Sections

In some embodiments, the firewall configuration of a software defined data center is divided into multiple sections that each contains a set of firewall rules. In some embodiments, the updating of one firewall configuration section would not affect the access of data in other firewall configuration sections. In some embodiments, each tenant of the software defined data center has a corresponding set of sections in the firewall configuration. Each tenant is allowed to independently access and update/manage its own corresponding set of sections.

Figure 14:
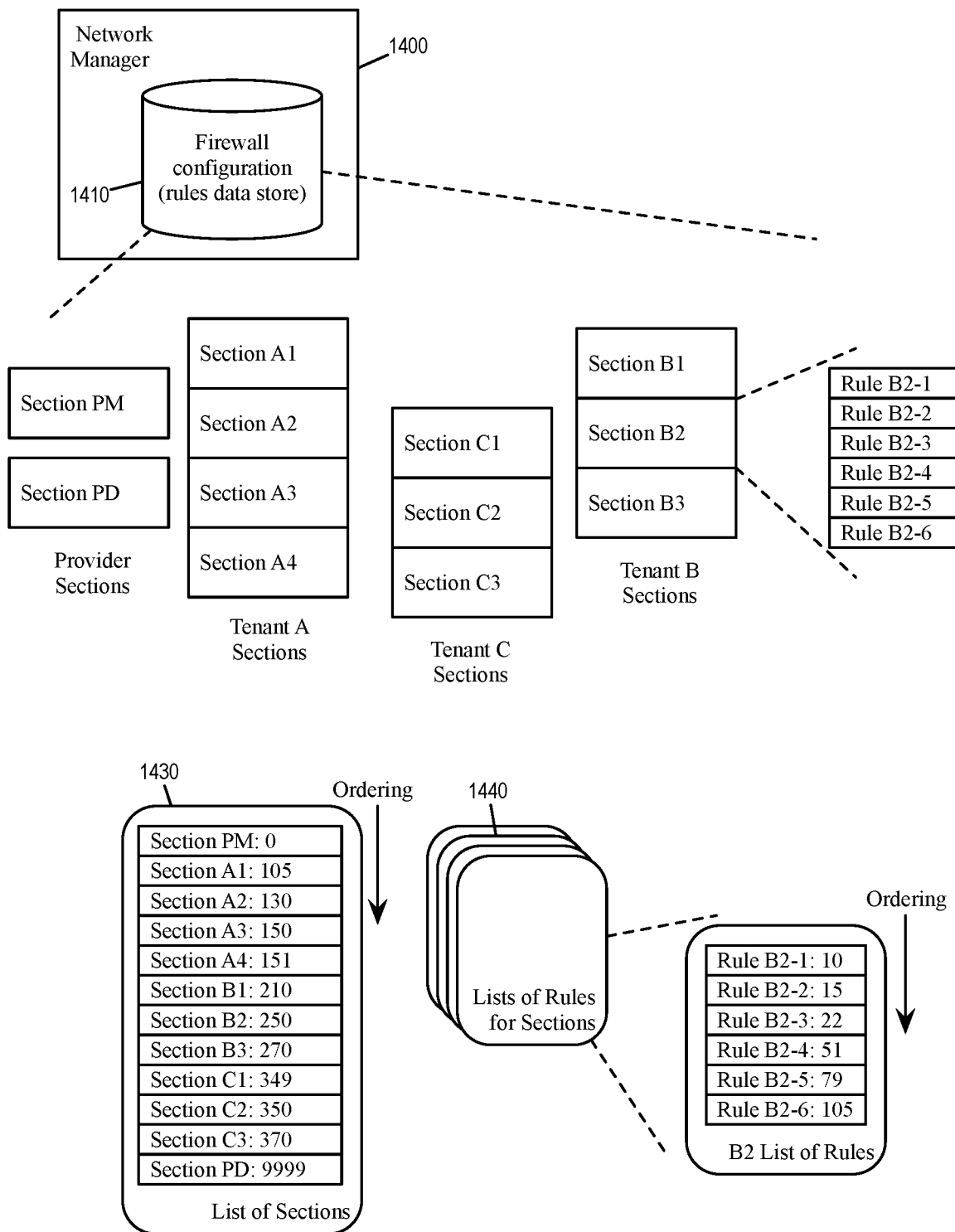
FIG. 14 illustrates a firewall configuration that is divided into multiple sections.

FIG. 14 illustrates a firewall configuration 1410 that is divided into multiple sections. As illustrated, the firewall configuration 1410 includes sections PM, A1, A2, A3, A4, B1, B2, B3, C1, C2, C3, and PD. Each section contains a set of firewall rules. For example, the section B2 includes rules B2-1 through B2-6.

Different tenants of the datacenter own different sets of sections in the firewall configuration. A section owned by a particular tenant is managed/controlled by the particular tenant. In the example of FIG. 14, tenant A owns sections A1-4, tenant B owns sections B1-3, tenant C owns sections C1-C3, and the provider (i.e., the administrator of the datacenter) owns sections PM and PD.

The firewall configuration 1410 is stored at a firewall rules data store (similar to the data store 110 of FIG. 1) and is managed by the network manager 1400 (similar to the network manager 100 of FIG. 1) of the datacenter. The network manager 1400 allows tenants A, B, and C to each access and manage its own sections, and the different tenants may access and manage their own sections concurrently by corresponding APIs.

Furthermore, in some embodiments, each section of the firewall configuration is associated with a priority number or position number that determines the order by which the sections will be examined for matching firewall rules. A section with a higher priority number (e.g., closer to 0) will be examined for matching firewall rules before sections with lower priority number (e.g., farther from 0). In some embodiments, a firewall configuration maintains a list of sections. This list of sections records the position of each section in the firewall configuration. In some embodiments, each rule is also associated with a priority number, and the firewall configuration maintains a list of rules for each section to record the position of each rule in the section.

As illustrated in FIG. 14, the firewall configuration is maintaining a list of sections 1430. The firewall configuration is also maintaining lists of rules 1440 for the different sections, each section having a corresponding list of rules in 1440. The list of sections 1430 records the priority number of each section. For example, the section A2 has priority number 130, while the section A3 has priority number 150. This assures that the section A2 will be examined for matching firewall rules before the section A3. Each list of rules in 1440 of a section records the priority number of each rule in that section. For example, in the list of rules for the section B2, the rule B2-3 has priority number of 22 while the rule B2-4 has priority number 51. This assures that the rule B2-3 will be examined before the rule B2-4.

As mentioned, in some embodiments, the network manager distributes to each host machine a subset of the firewall rules based on which rules are applicable to the host machine. In some of these embodiments, different host machine may receive and use different subsets of the firewall configuration sections based on which sections have rules that are applicable to the host machine. Each of such host machines however still relies on the priority numbers of the sections as well as the priority numbers of the rules to determine the order by which the firewall rules (that are distributed to the host machines) are examined. The network manager in some embodiments distributes/publishes the list of sections and the list of rules to the enforcing host machines so that the host machines would know the ordering among the sections and among the rules when enforcing the firewall protection.

Figure 15:
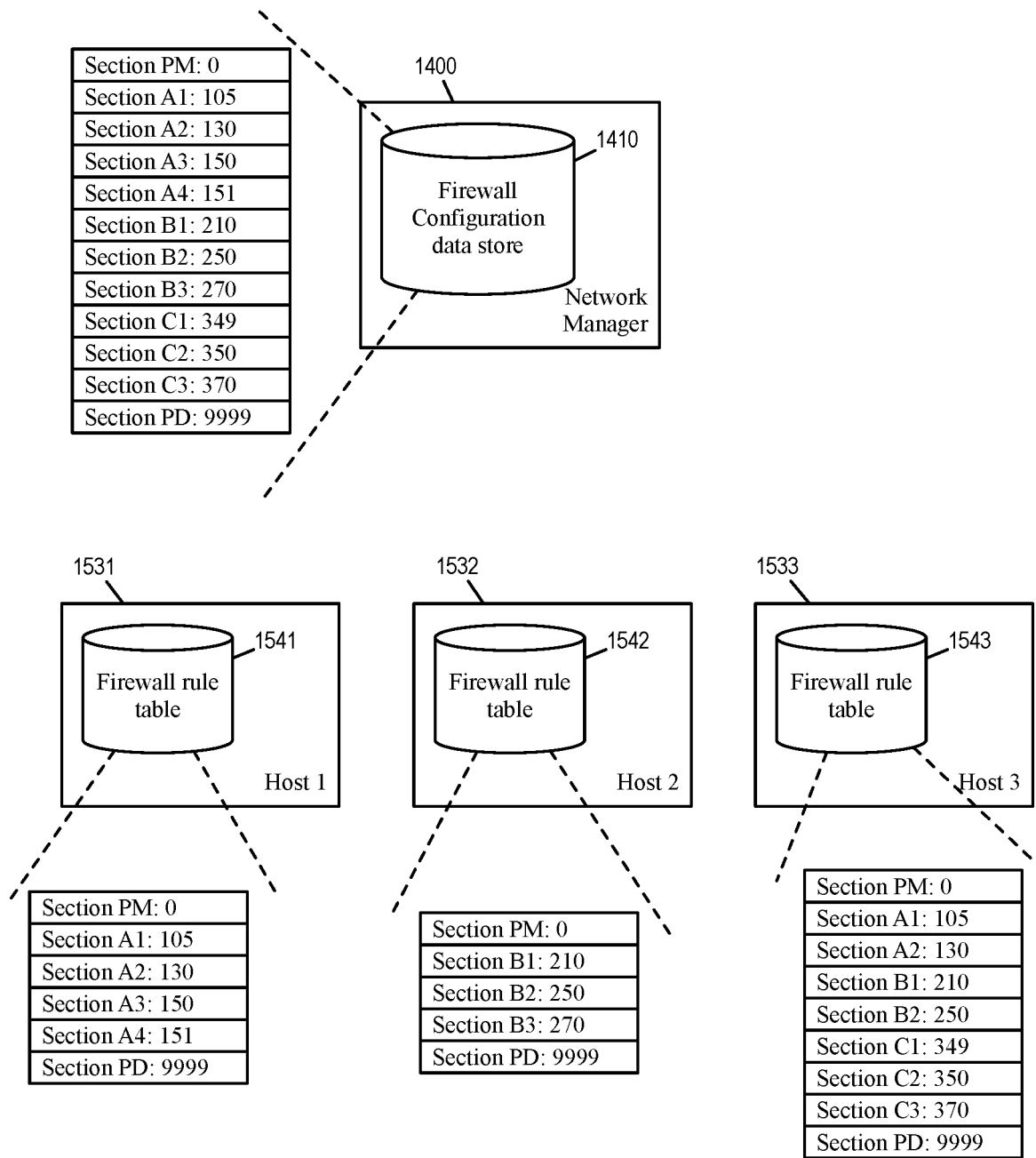
FIG. 15 illustrates the distribution of the firewall configuration to the various host machines.

FIG. 15 illustrates the distribution of the firewall configuration 1410 to the various host machines. As illustrated, the network manager 1400 distributes different sections of the firewall configuration 1410 to host machines 1531-1533. Each of the host machines stores the received firewall configuration sections in a firewall rule table (1541-1543) as host-level firewall configuration or host firewall rules. In the example illustrated, the firewall rule table 1541 of the host 1531 stores and enforces firewall configuration sections PM, A1, A2, A3, A4, PD; the firewall rule table 1542 of the host 1532 stores and enforces firewall configuration sections PM, B1, B2, B3, and PD; the firewall rule table 1543 of the host 1533 stores and enforces firewall configuration sections PM, A1, A2, B1, B2, C1, C2, C3, and PD.

III. Versioning Firewall Configuration

As mentioned, some embodiments allow each tenant to freely manage their own sections in the firewall configuration. The network manager in some embodiments provides UI or API that allow each tenant to add, modify, or delete rules in the firewall configuration sections that the tenant owns. The network manager also allows each tenant to add new firewall configuration sections or delete firewall configuration sections that the tenant owns. In some embodiments, the various changes and update to the firewall configurations from the different tenants are then aggregated into host-level firewall configuration update and distributed to the individual host machines as described in Section I above (by e.g., the publishing engine 315 of FIG. 3 or the publishing engine 515 of FIG. 5).

The firewall configuration stored at the data store of the network manager can be considered the "desired" or "intended" state of the firewall, as it is the most update-to-date record of the tenants' intended specification. The firewall configuration that has been distributed to the host machines is on the other hand the "actual" state of the firewall, as it is what is actually being used to enforce firewall protection. In some embodiments, the desired state and the actual state of the firewall configuration can differ since while the network manager is aggregating and distributing updated firewall configuration to the host machines, the tenants/users are free to make changes to the firewall configuration. In other words, while the desired firewall configuration is continuously being updated to the newest version, the actual firewall configuration being enforced at some of the host machines may be out-of-date.

In order to identify discrepancies between the desired firewall configuration and the actual firewall configuration distributed to the host machines (i.e., to detect any obsolescence in the actual firewall configuration), some embodiments associate the firewall configuration with version numbers. In some embodiments, the network manager records the version number of the firewall configuration that is distributed to each host machine in a firewall configuration status. This enables the network manager to identify host machines (by monitoring the firewall configuration status) having obsolete actual firewall configurations by comparing the version number of the firewall configuration distributed to the host machine with the version number of the up-to-date desired firewall configuration at the network manager. Some embodiments would then generate a more up-to-date host-level firewall configuration for distribution to that identified host machine.

Some embodiments maintain a version number for each firewall configuration section. When aggregating the firewall configuration update for distribution to a host machine, the network manager in some embodiments determines a version number for the aggregated update based on the version numbers of the sections that are included in aggregation. This aggregated version number is in some embodiments stored in the firewall configuration status to record the version number of the firewall configuration distributed to the host machines.

Figure 16:
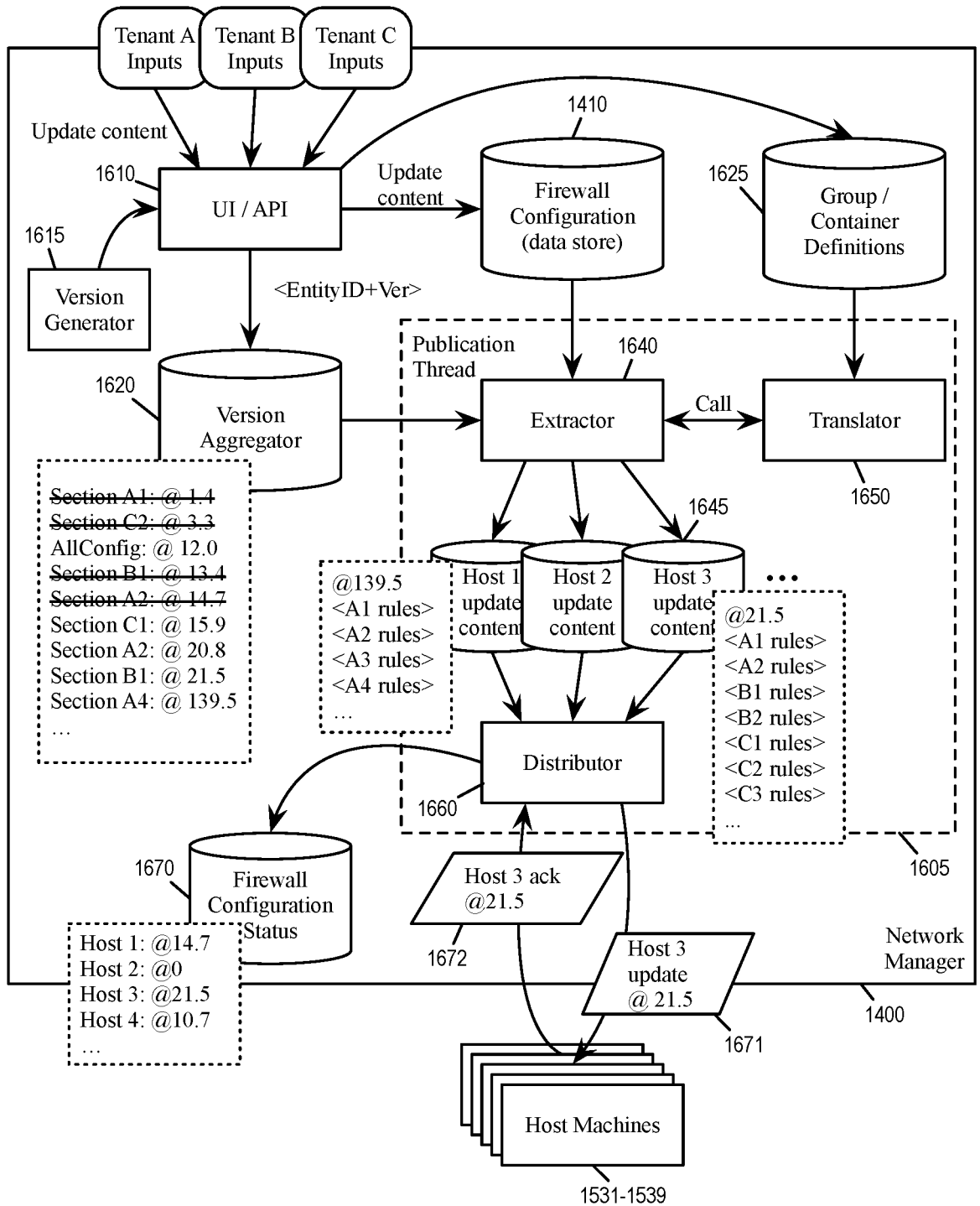
FIG. 16 illustrates the distribution and the versioning of firewall configuration.

FIG. 16 illustrates the distribution and the versioning of firewall configuration. The figure illustrates the network manager 1400 receiving inputs from tenants A, B, and C and producing corresponding firewall configuration updates for host machines 1531-1539. As illustrated, the network manager 1400 includes a UI/API module 1610, the firewall configuration data store 1410, a version aggregator 1420, a version generator 1615, a group container definition store 1625, an extractor 1640, host update storage 1645, a translator 1650, a distributor 1660, and a firewall configuration store 1670.

The UI/API module 1610 provides interface to users of the network manager 1610, which are typically administrators of the various tenants of the data center. In some embodiments, the API provides various firewall management routines, including those for adding/deleting/modifying rules, adding/deleting sections, etc. The UI/API module translates the input from the various tenants into update content for the firewall configuration 1410, including changes the various logical entities of the firewall configuration (i.e., the rules, the lists of rules for different sections, and the list of sections). The UI/API module 1610 also associates each updated firewall configuration entity with a version number provided by the version generator 1615. The identifier of each updated firewall configuration entity (i.e., the rule ID, the section ID, etc.) and its associated version number is then stored in the version aggregator 1620.

The version generator 1615 generates the version number for the UI/API module 1610 to associate with the identifiers of the updated firewall configuration entities. The version generator 1615 is a counter in some embodiments, whose count is the generated version number. In some embodiments, the counter increments each time the UI/API calls the version generator 1615 for version number. In some embodiments, the counter is a timer that monotonically increments and the generator version number is actually a timestamp based on the current time.

The version aggregator 1620 stores the identities of the updated firewall configuration entities and their associated version numbers. For example, if a tenant uses the UI/API module 1610 to update rules of a particular section, that section's identifier is stored in the version aggregator 1620 along with a version number. Or, if a tenant uses the UI/API module 1610 to update the list of sections (i.e., to add or remove a section), the identifier for the list of sections is stored along with a version number in the version aggregator 1620. In the example illustrated in FIG. 16, the version aggregator 1620 has recorded a series of updates and their corresponding version numbers, including updates to firewall configuration sections A1, A2, A4, B1, C1, C2, as well as to the list of sections.

Some of the firewall configuration entities have been updated multiple times with different version numbers. For example, the section A2 is updated twice, (once with version number 14.7 and once with version number 20.8), the section B1 is updated twice (once with version number 13.4 and once with version number 21.5). Each time there is an update to the entire firewall configuration as an entity, the version number of all sections is set to the version number of the entire firewall configuration. For example, the all firewall configuration entity is updated with version number 12.0. This effectively causes all sections to have version umber 12.0 and override any previous version numbers for individual sections (such as sections A1 and C2 at 1.4 and 3.3).

In some embodiments, the version aggregator stores only the latest/newest version number for each firewall configuration entity. Thus, for example, the version aggregator would only store the version number 20.8 for the section A2, the version number 21.5 for the section B1, etc. (the older version numbers are overwritten and illustrated by strikethrough).

The extractor 1640 creates host-level firewall configuration update to individual host machines by fetching updated rules and/or sections from the firewall configuration data store 1410. The created host-level firewall configuration updates are stored in the host update storage 1645. The operations of the extractor 1640 are similar to that of the rule extractor 550 in FIG. 5, which extract firewall rules stored in the network manager to create host firewall rules for different host machines based on the "appliedTo" fields of the firewall rules. In addition, the extractor 1650 identifies or computes a version number for the host-level firewall configuration update based on the content of the version aggregator.

For example, when preparing for the host-level update for the host machine 1531 (host 1), the extractor would fetch the content update for the firewall configuration sections A1, A2, A3, and A4. According to the content of the version aggregator 1620, the version numbers of sections A1, A2, A3, and A4 are respectively 12.0, 20.8, 12.0 and 139.5 (the version number of A1 and A3 are that of an update to the entire firewall configuration at 12.0). The extractor 1640 then uses the last version number 139.5 as the version number of the host level firewall configuration update of host 1. As another example, when preparing for the host-level update for the host machine 1533 (host 3), the extractor would fetch the content update for the firewall configuration sections A1, A2, B1, B2, C1, C2, and C3. According to the content of the version aggregator 1620, the version numbers of sections A1, A2, B1, B2, C1, and C2 are respectively 12.0, 20.8, 21.5, 15.9, 12.0, and 12.0 (the version numbers of A1, C2, and C3 are that of the update to the entire firewall configuration at 12.0). The extractor 1640 then uses the latest version number 21.5 as the version number of the host level firewall configuration update of host 3.

The translator 1650 is for translating identifiers for high-level constructs referenced by the firewall rules (such as for security groups, containers) into actual low-level constructs such as MAC addresses or IP addresses. The extractor 1640 calls the translator 1650 when it is extracting rules from the firewall configuration 1410. In some embodiments, the translation is based on the content of a group container definition storage 1625, which stores the definitions of various different high-level constructs that can be dynamically modifiable, including definitions of dynamic security groups. The operations of the translator 1650 are similar to that of the translation engine 510. In addition, in some embodiments, the translator 1650 has a translation cache that determines cache hit or miss based on version numbers. The translation cache will be further described below by reference to FIGS. 19-21.

The group container definition storage 1625 stores the definitions of the various high-level constructs, including security groups, containers, logical forwarding elements, etc. Its content is provided by the data center and by the user through UI/API module 1610. The operations of the group container definition storage 1625 are similar to those of the group definition storage 540 of FIG. 5 and of the dynamic security groups 940 of FIG. 9.

The distributor 1660 fetches the host-level firewall configuration updates stored in the host update storage 1645 and deliver them to the host machines 1531-1539. Its operations are similar to that of the distribution engine 545 of FIG. 5. In addition, the distributor also keeps track of the version numbers of the host-level firewall configuration that have been successfully delivered to the host machines and being enforced by storing the version numbers of the successfully delivered host-level firewall configurations in the firewall configuration status storage 1670. Some embodiments use these stored version numbers to determine which host machine has out-of-date actual configurations by comparing them with the version numbers stored in the version aggregator 1620.

In the example illustrated in FIG. 16, according to the firewall configuration status 1670, the host machine 1531 (host 1) is currently operating on a host-level firewall configuration that is associated with version number 14.7. However, the network manager 1400 has already generated a new host-level firewall configuration for host 1 with version number 139.5. Some embodiments therefore identify host 1 as having an obsolete host-level configuration and would know to deliver the new host-level configuration to host 1 having version number 139.5.

In some embodiments, the version numbers stored in the firewall configuration status 1670 are also used for indicating whether the host-level firewall configuration to the host machines were successfully delivered. In some embodiments, the distributor 1660 delivers the host-level firewall configuration update to its target host machine along with the version number of the host-level update. The distributor 1660 then waits for an acknowledgement or response from the target host machine. In some embodiments, such response includes the version number of the host-level firewall configuration that was successfully received by the host machine, and the distributor stores this version number into the firewall configuration status 1670. In some embodiments, the distributor 1660 keeps a time-out timer that would time out if the host machine fails to acknowledge the delivery of host-level firewall configuration. The distributor 1660 in these instances would mark the host machine as having host-level firewall configuration of version zero in the firewall configuration status 1670 to indicate the delivery failure.

In the example of FIG. 16, the distributor 1660 is illustrated as sending the host-level firewall configuration update 1671 to the host machine 1533 (host 3) with version number 21.5, and the host machine 1533 has acknowledge the delivery of firewall configuration by embedding the version number 21.5 in the acknowledgment 1672. The distributor 1660 then stores the version number 21.5 as the status for the host machine 1553 in the firewall configuration status 1670. Within the firewall configuration status 1670, the status for host 1 shows that its firewall configuration has version number 139.5, the status for host 3 shows that its firewall configuration has version number 21.5. The status of host 2 shows that its firewall configuration has version number zero, indicating that, at least the last attempt to deliver an updated firewall configuration to host machine 1532 was a failure and that updated firewall configuration is needed.

In some embodiments, the extractor 1640, the translator 1650, and the distributor 1660 are operations perform by one firewall configuration publication thread 1605 that is executing on a processor. Some embodiments allow multiple firewall configuration publication threads (e.g., to aggregate and distribute firewall configuration update for different host machines) as long as there are sufficient computing resources.

Figure 17:
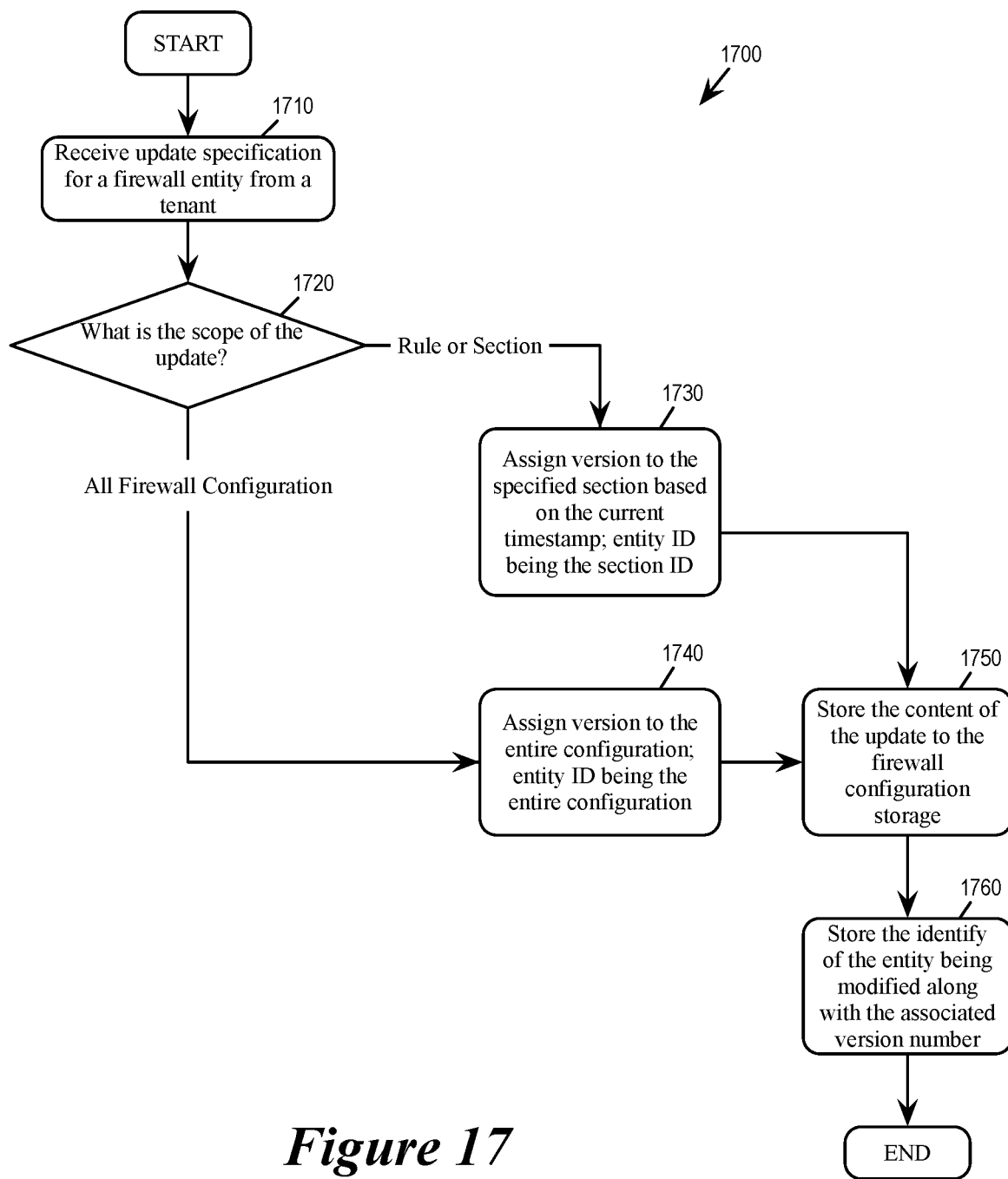
FIG. 17 conceptually illustrates a process for assigning version numbers to firewall configuration.

FIG. 17 conceptually illustrates a process 1700 for assigning version numbers to (entities of) firewall configuration. In some embodiments, a network manager (such as 1400) performs the process 1700 as its API/UI is invoked to make changes to the firewall configuration (i.e., 1410) based on input from a tenant. In some embodiments, the network manager performs the process 1700 in multiple threads concurrently for different tenants.

The process 1700 starts when it receives (at 1710) specification from user/tenant to update a firewall configuration entity (i.e., a rule, a section, or the entire firewall configuration).

The process then determines (at 1720) whether the firewall configuration entity being updated is a rule, a section, or the entire firewall configuration. In some embodiments, the process identifies the scope of the firewall configuration update according to the type of API is being invoked to update the firewall configuration. If the API being invoked is for a rule or for a section, the process proceeds to 1730. If the API being invoked involves the entire firewall configuration, such as adding or deleting a section or otherwise affects the list of sections, the process proceeds to 1740.

At 1730, the process assigns or associates a version number with the section being updated (or the section containing the rule being updated). The version number can be a counter value or a timestamp as discussed above by reference to the version generator 1615. The process then proceeds to 1750.

At 1740, the process assigns or associates a version number with the list of section. The process then proceeds to 1750.

At 1750, the process stores the content of the update (e.g., changes to the rules of a section, changes to the list of sections, etc.) to the firewall configuration. The process then stores (at 1760) the identity of the firewall configuration entity being updated (identifier of the rule or section updated) (e.g., into version aggregator 1620) along with the version number associated with the identity. The process 1740 then ends.

Figure 18:
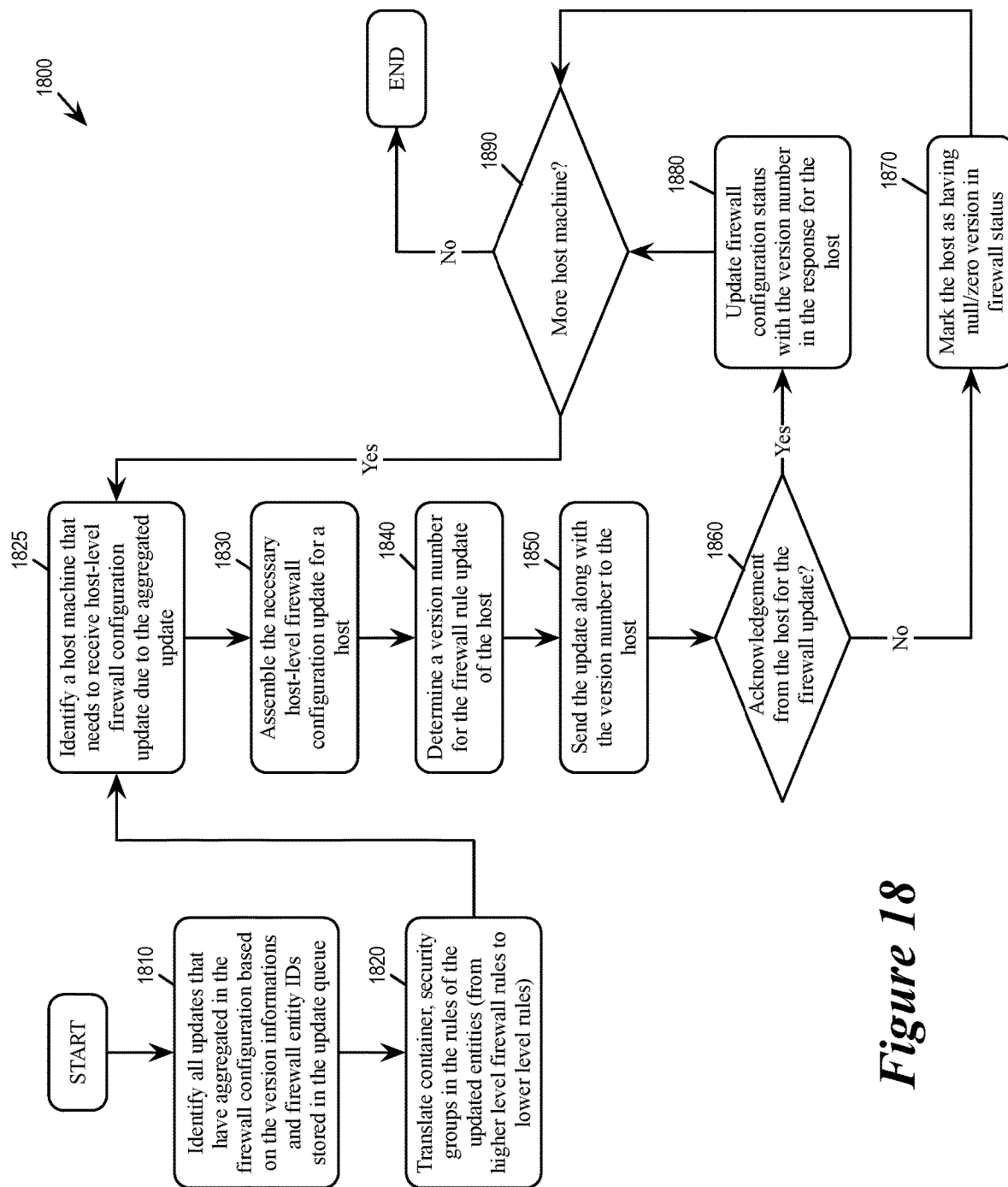
FIG. 18 conceptually illustrates a process creating and distributing host level firewall configuration updates.

FIG. 18 conceptually illustrates a process 1800 creating and distributing host level firewall configuration updates. In some embodiments, a publication thread such as 1605 performs the process 1800 for performing its extractor (e.g., 1640), translator (e.g., 1650), and distributor (e.g., 1660) operations.

In some embodiments, the publication thread starts the process 1800 periodically. In some embodiments, the network manager schedules the process 1800 to start at the conclusion of the process 1700, i.e., whenever the network manager has completed storing update into the firewall configuration (1410) and the corresponding information (the identifiers of the updated entities and the corresponding version numbers) into the version aggregator (1620). In some embodiments, the process 1800 starts only when the network manager determines that the requisite computation resource has become available, e.g., when a previous publication thread has completed executing. While the process 1800 is waiting to execute, the version aggregator and the firewall configuration would aggregate additional firewall configuration updates for more firewall configuration entities, thereby minimize the number of times that the network manager has to generate and distribute firewall configuration updates.

The process starts by identifying (at 1810) all updates that have aggregated in the firewall configuration up to the current time by examining the IDs of firewall configuration entities and their corresponding version numbers in the version aggregator. The process then translates (at 1820) the references to high-level constructs (containers, security groups, etc.) in the rules into low-level identifiers (IP addresses, MAC addresses, etc.).

The process then identifies (at 1825) a host machine that would need to receive host-level firewall configuration update due to the aggregated update. The process then assembles (1830) the necessary host-level firewall configuration update for the host. In some embodiments, this is based on the applied-to field of the updated firewall rules, which is used by the network manager to identify the host machines that needs to receive the update.

The process then determines (at 1840) an overall version number for the host-level firewall configuration update of the host. In some embodiments, the version number for the host-level firewall configuration is identified from the version numbers of the firewall configuration entities that are applicable to the host, for example, the latest version number among the updated firewall configuration entities applicable to the host. The process then sends (at 1650) the assembled host-level firewall configuration update to the identified host and wait for a response/acknowledgement.

The process then determines (at 1860) whether it has received an acknowledgement for the successful delivery of the host-level configuration update. In some embodiments, the process waits for a particular period of time for the acknowledgement before deciding that the delivery of the host-level firewall configuration has failed. If the process does not receive acknowledgement from the identified host, the process proceeds to 1870. If the process does receive an acknowledgement from the identified host, the process proceeds to 1880.

At the 1870, the marks the identified host as having failed to acknowledge the delivery of firewall configuration, which is an indication that the identified host's firewall configuration is obsolete or otherwise invalid. Some embodiments mark the host has having zero or null version number in the firewall configuration status (i.e., 1670). The process then proceeds to 1890.

At 1880, the process updates the firewall configuration status with the version number that is in the host's acknowledgement. This indicates that the actual firewall configuration at the host machine is valid, and it also allows the network manager to check for obsolescence by comparing the host's version number in the firewall configuration status (1670) with the version number in the version aggregator (1620). The process then proceeds to 1890.

At 1890, the process determines whether there is another host machine that needs an updated firewall configuration. Some embodiments make this determination by examining the firewall configuration status to identify host machines having null or obsolete version numbers. If there is a host machine that needs firewall configuration update, the process returns to 1825. Otherwise the process 1800 ends.

IV. Translation Cache

As mentioned, in some embodiments, the network manager (at publication engine or rule extractor) relies on a translator/translation engine to translate high-level identifier referenced by firewall rules to low-level identifier. When the rule extractor encounters a rule that references high-level constructs, the extractor makes a translation request to the translation engine. To accelerate the translation operation, the translation engine in some embodiments includes a translator cache that stores the result of previous translations along with their associated version numbers. Upon cache miss, the translation engine performs the translation and store the translation result in the translation cache along with the version number associated with the rule for which the translation is requested. Upon cache hit, the translation engine uses the cached translation result rather than performing a new translation if the version number stored in the cache is equal to (or newer) a minimum required version number for the translation request. If the stored translation result has an older version number than the minimum required version number, the translator would treat the request as a cache miss and perform a new translation.

In some embodiments, different rules belonging to the same section can have the same version number. In some embodiments, different rules belonging to different sections can also have the same version number, if, for example, the entire firewall configuration was updated by a firewall configuration level API. In these instances, different rules having the same version number may refer to the same containers, security groups, etc., and the translation result of a particular high-level construct for one rule can be cached and reused for another rule having the same version number. It is also possible that the publishing engine thread is preparing host-level firewall configuration update for different host machines based on the same version of the firewall configuration. In these instances, the translation engine may store and retrieve the translation result for one rule and apply it to another rule, or the translation result for one host machine and apply it to another host machine.

Figure 19:
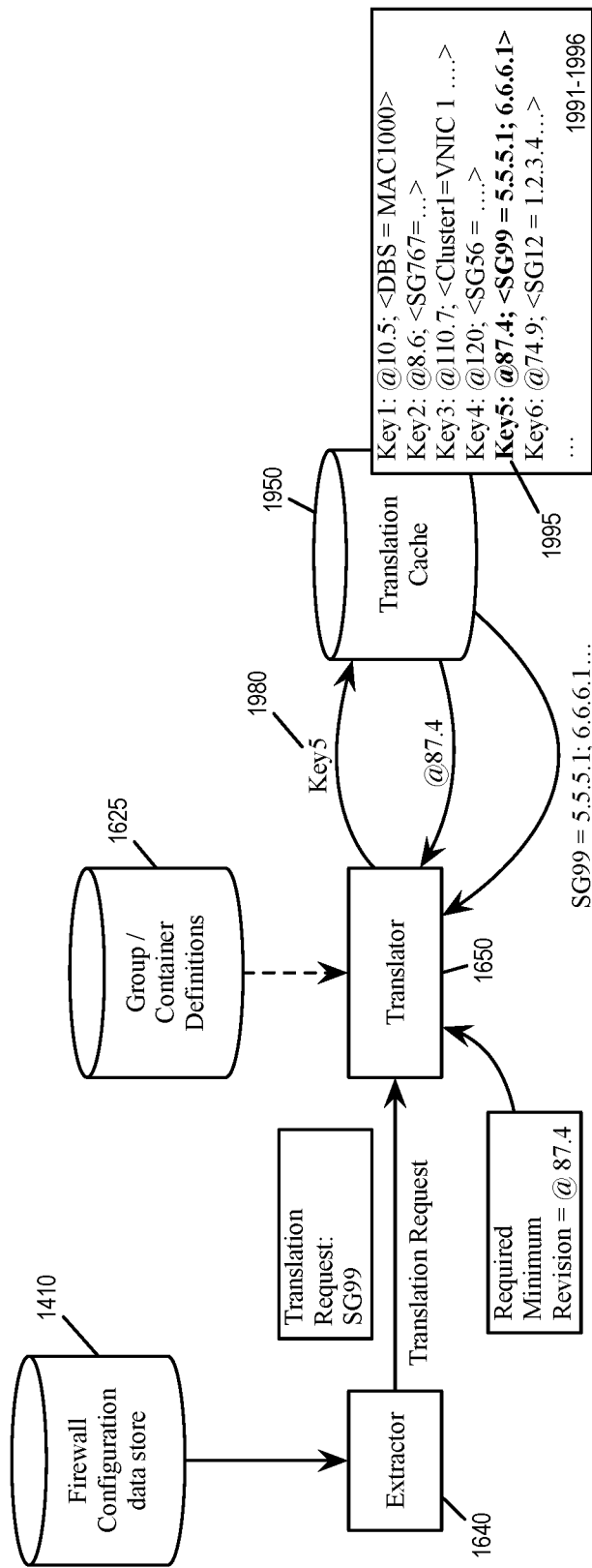
FIGS. 19-20 illustrate a translation engine that caches translation result and version numbers.
Figure 20:
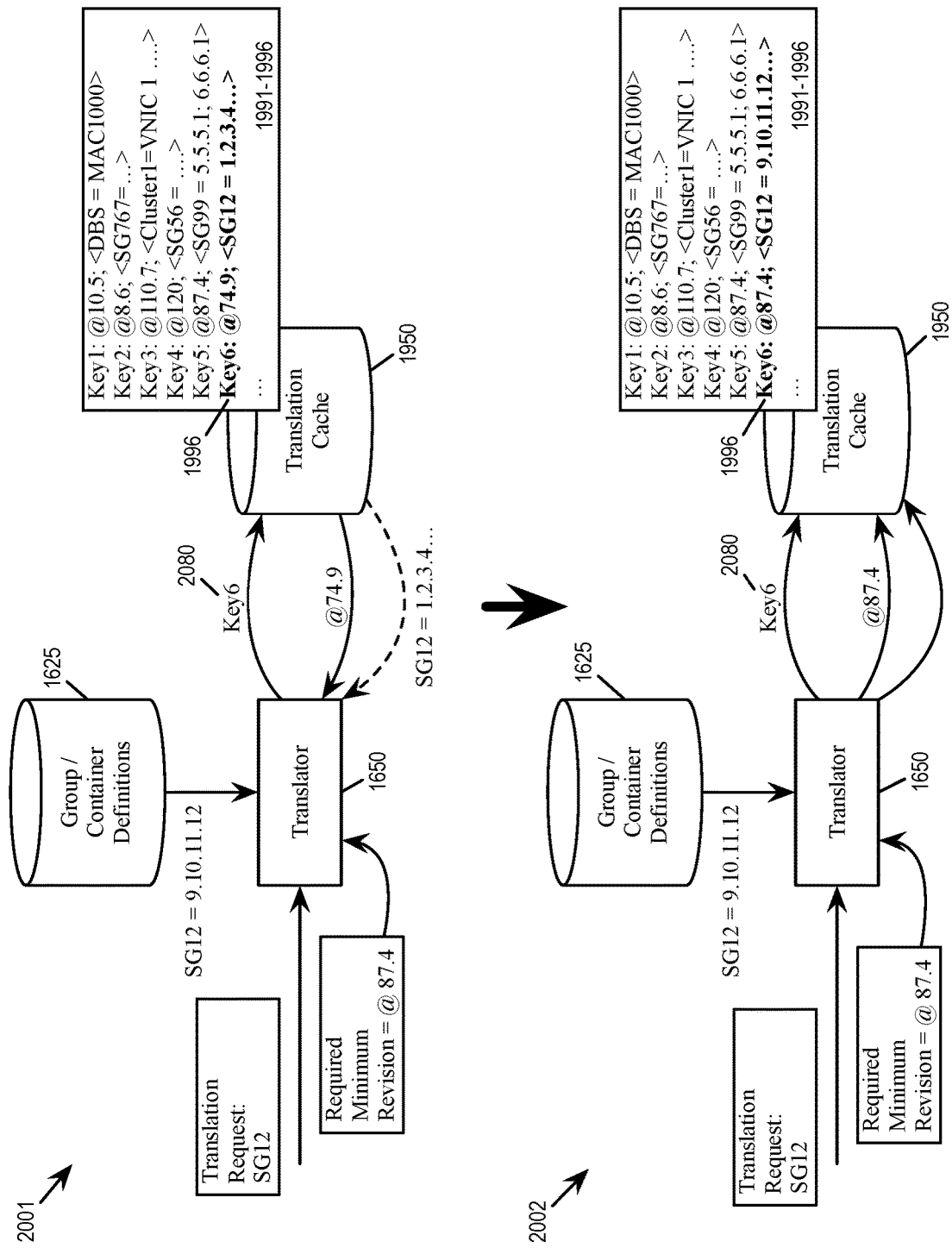

FIGS. 19-20 illustrates a translation engine that caches translation result and version numbers. As illustrated, the translation engine 1650 of FIG. 16 performs translation from high-level constructs to low-level constructs based on definitions provided by the data center or the tenants (represented by the group container definitions storage 1625.) The translation engine 1650 also has a translation cache 1950, which caches the result of previous translation performed by the translation engine. Each cached translation result is associated with a version number.

FIG. 19 illustrates a cache-hit scenario in which the requested translation has a valid corresponding entry in the translation cache that is not obsolete. This request in some embodiments comes from the rules extractor 1640 of the publication thread 1605 that is assembling host-level firewall configuration update from content of the firewall configuration data store 1410.

As illustrated, the translator 1650 receives a translation request for a high-level construct "SG99", which is an identifier of a security group that is referenced by one of the rules being updated in one of the firewall configuration sections. The translation request also comes with a version number. This version number is the minimum required version number, meaning that a previous translation result can only be used for this request if it is associated with a version number that is at least as new as the minimum required version number. This minimum required version number is based on a time instant of a previous update to the firewall configuration. In some embodiments, the minimum required version number of a translation request is the version number associated with the rule being updated or with the section of the firewall configuration that contains the rule being updated.

In the example of FIG. 19, the request for translating the security group "SG99" has required minimum version number 87.4. This version number is associated with a rule for which the translation is requested (which can be the version number of the section containing the rule or the version number of the entire firewall configuration). In some embodiments, the required minimum version number is not submitted to the translator along with the translation request. Rather, it is kept in a thread local storage for the translator to access for subsequent translation requests until a new version number is provided (by the rule extractor).

Based on the parameters of the request, the translator 1650 generates a key 1980 (labeled as "key5") for accessing the translation cache. In some embodiments, the request includes parameters such as identifiers of a firewall context and a target class, which can be used to uniquely identify a high-level construct such as a container or a security group. In some embodiments, these parameters are hashed to generate the key for accessing the translation cache.

The generated key 1980 is provided to the translation cache 1950, which stores various cache entries 1991-1996 corresponding to different key values, i.e., different high-level constructs. Each cache entry is a cached result of a previous translation result for a high-level construct identified by the key value of the entry. The key value that corresponds to the key 1980 ("key5") corresponds to an entry 1995 that translates the security group "SG99" to a group of IP addresses ("5.5.5.1" and "6.6.6.1"). This entry is also associated with version number 87.4. The translator 1650 therefore knows that it is a cache hit. Furthermore, because the cached version number is equal to the minimum required version number (also 87.4), the cached translation result can be used for the current translation request. Since the content of the cache 1950 is used for the translation, the definitions provided by the group/container definitions storage 1625 is not used.

FIG. 20 illustrates a cache-miss scenario in which the requested translation has a corresponding entry in the translation cache that is obsolete based on version number. As illustrated, the translator 1650 receives another translation request for a high-level construct "SG12". The minimum required version number remains the same as before, i.e., 87.4. The figure illustrates the cache miss scenario in two stages 2001 and 2002.

At the stage 2001, the translator 1650 generates a key 2080 (labeled as "key6") based on the parameters of the request for accessing the translation cache 1950. The generated key 2080 is provided to the translation cache 1950. The key value that corresponds to the key 2080 ("key6") corresponds to an entry 1996 that translates the security group "SG12" to a group of IP addresses ("1.2.3.4"). This entry is associated with version number 74.9, which is older than the minimum required version number 87.4. The translator therefore knows that the corresponding entry stored in the cache 1950 is out-of-date and cannot be validly reused as the result of the translation. The translation engine in some embodiments would treat this as a cache miss and disregard the entry from the translation engine (as if there is no corresponding entry in the cache).

Figure 21:
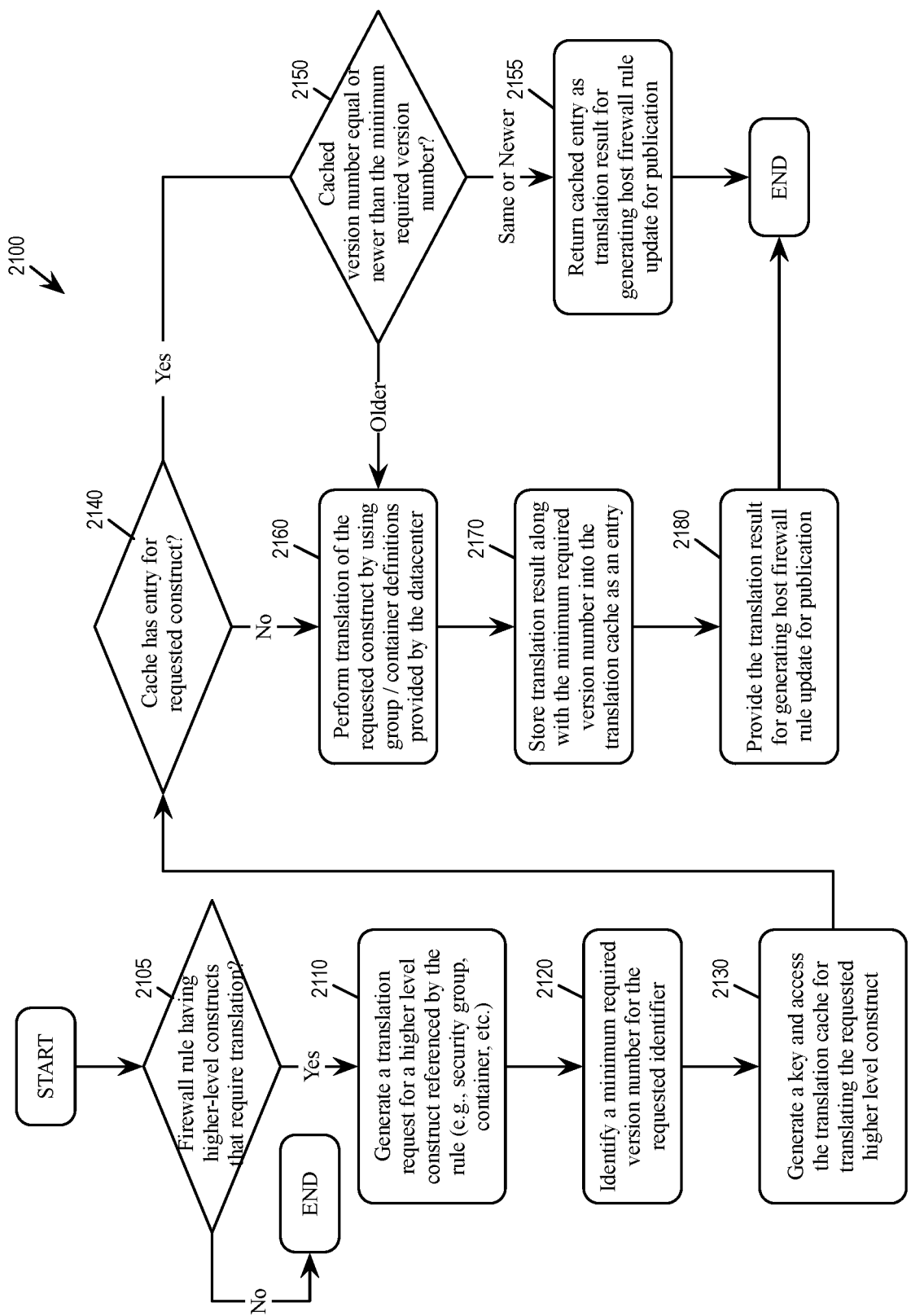
FIG. 21 conceptually illustrates a process for translating high-level constructs in firewall rules by using a cache based on version numbers.

At the stage 2002, the translation engine 1650 performs translation engine based on the content of the group/container definition storage 1625. The translation engine accordingly translates the security group "SG12" into IP address 9.10.11.12. The translation engine then updates the cache so that the entry 1996 would now translates the security group "SG12" into "9.10.11.12". Furthermore, the entry 1996 is now associated with a new version number. In some embodiments, this new version number is a snapshot of the current time, which can be newer than the minimum required version number. In some embodiments, the minimum required version number is used to timestamp this new cache entry. In the example of FIG. 21, the minimum required version number "87.4" is used for the new cache entry for "SG12".

FIG. 21 conceptually illustrates a process 2100 for translating high-level constructs in firewall rules by using a cache based on version numbers. The process 2100 is in some embodiments performed by the network manager as part of its publication thread, specifically as part of its translator operations or translation engine (1650) when the publication thread is examining a rule for creating host-level firewall configuration updates.

The process starts by determining (at 2105) whether the firewall rule being examined has high-level constructs that require translation such as a container or a security group. If not, the process 2100 ends. If translation is needed, the process proceeds to 2110.

At 2110, the process generates a translation request for a high-level construct referenced by the rule. The process also identifies (at 2120) a minimum required version number. This minimum required version is in some embodiments the version number of the section that contains the rule, or the version number of the entire firewall configuration. In some embodiments, the minimum required version is already stored in a thread local storage. The process then generates (at 2130) a key for accessing the translation cache for translating the requested high-level construct. In some embodiments, the key is generated from parameters that uniquely identify the requested high-level construct.

Next, the process determines (at 2140) if there is an entry in the cache for the requested high-level construct. If so, the process proceeds to 2150. If there is no entry for the requested high-level construct in the cache, the process proceeds to 2160.

At 2150, the process compares the version number of the stored entry with the minimum required version number and determines whether the cached version number for the requested high-level construct is equal to or newer than the minimum required version. If so, the process proceeds to 2155. Otherwise (i.e., the cached translation result has an older version number), the process proceeds to 2160.

At 2155, the process uses the cached result as the translation for the requested high-level constructs (because this is cache-hit) of the rule being examined. The process 2100 then ends.

At 2160, the process performs the translation of the requested construct (because this is cache miss) by using the group/container definitions provided by the user or the datacenter (e.g., the storage 1625). The process then stores (at 2170) the translation result along with the minimum required version number into the translation cache as an entry. The process also provides (at 2180) the result of the translation for the requested high-level constructs of the rule being examined. The process 2100 then ends.

When the process 2100 ends, the rule being examined is added to one of the host-level firewall configurations. If the rule includes references to high-level constructs, the translation result produced by the process 2100 would replace the high-level constructs in the rule before the rule is added to one of the host-level firewall configurations.

V. Network Control and Management

Figure 22:
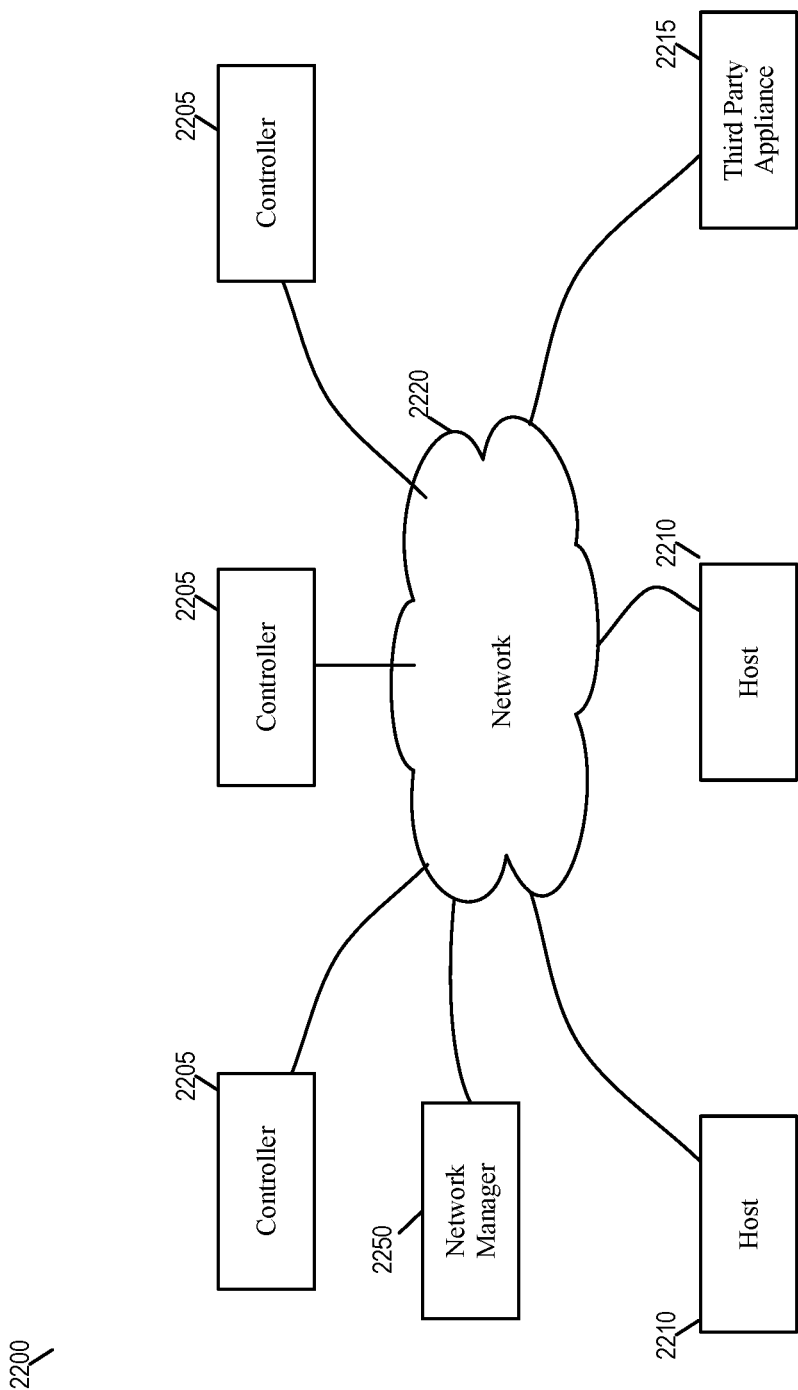
FIG. 22 illustrates a network control system of some embodiments of the invention.

FIG. 22 illustrates a network control system 2200 of some embodiments of the invention. As shown, the network control system 2200 includes a network manager 2250, multiple controllers 2205, multiple hosts 2210, and multiple unmanaged third-party appliances 2215, and a network 2220. Through the network, the network manager, the controllers, hosts and third party appliances are communicatively coupled. In some embodiments, the network control system is implemented in a datacenter and the network 2220 is the network fabric (e.g., switches, routers, wiring, etc.) that connects the various components.

In some embodiments, each host 2210 has one or more VMs executing on it. The host in some embodiments is similar to host 1002 of FIG. 10, and hence has the firewall enforcement architecture 1000. The third-party appliances are unmanaged appliances, such as third party firewall device.

The controllers 2205 are for controlling and managing the various forwarding elements in the network. In some embodiments, a network includes multiple physical forwarding elements that are controlled by one or more controllers (e.g., managed by the controllers to implement one or more LFEs). In some embodiments, third-party appliances are forwarding elements that are not managed or are minimally managed by the controller(s). In multi-tenant hosted environment of some embodiments, multiple controllers manage multiple physical forwarding elements that operate at the edge of the network (i.e., manage PFEs that execute on the hosts or directly connect to the hosts). The connection between the PFEs on the edge, however, traverses through internal network fabric that includes third-party appliances (such as third-party top-of-rack switches). In some managed networks of some embodiments, the managed forwarding elements include both managed edge forwarding elements and managed non-edge forwarding elements. In some of these embodiments, the managed non-edge forwarding elements perform functions that are not readily handled by the managed edge forwarding elements in those embodiments. These non-edge forwarding elements are referred to as service nodes in some embodiments.

In some embodiments, the network manager is responsible for receiving user/tenant firewall specification and accordingly provisions various logical entities (e.g., LFEs) and services (e.g., firewall) in the network system by generating the corresponding configuration data for various host machines and controllers. The network manager 2250 is similar to network managers described by reference to FIGS. 1, 3, 5 above.

In some embodiments, the network manager generates and distributing AppliedTo firewall rules and non-AppliedTo firewall rules to the hosts and third-party appliances based on user input (e.g., through API provided to the user). Some embodiments also use the controllers 2205 to distribute the firewall rule configuration and distribution workload. For instance, in some embodiments, a first controller is responsible for a first set of firewall rules for a first set of logical networks, a second controller is responsible for a second set of firewall rules for a second set of logical networks, a third controller is responsible for a third set of firewall rules for a third set of logical networks, and so on. Other embodiments, however, use only the network manager 2250 to configure and distribute the firewall rules to all of the hosts and third-party appliances.

Figure 23:
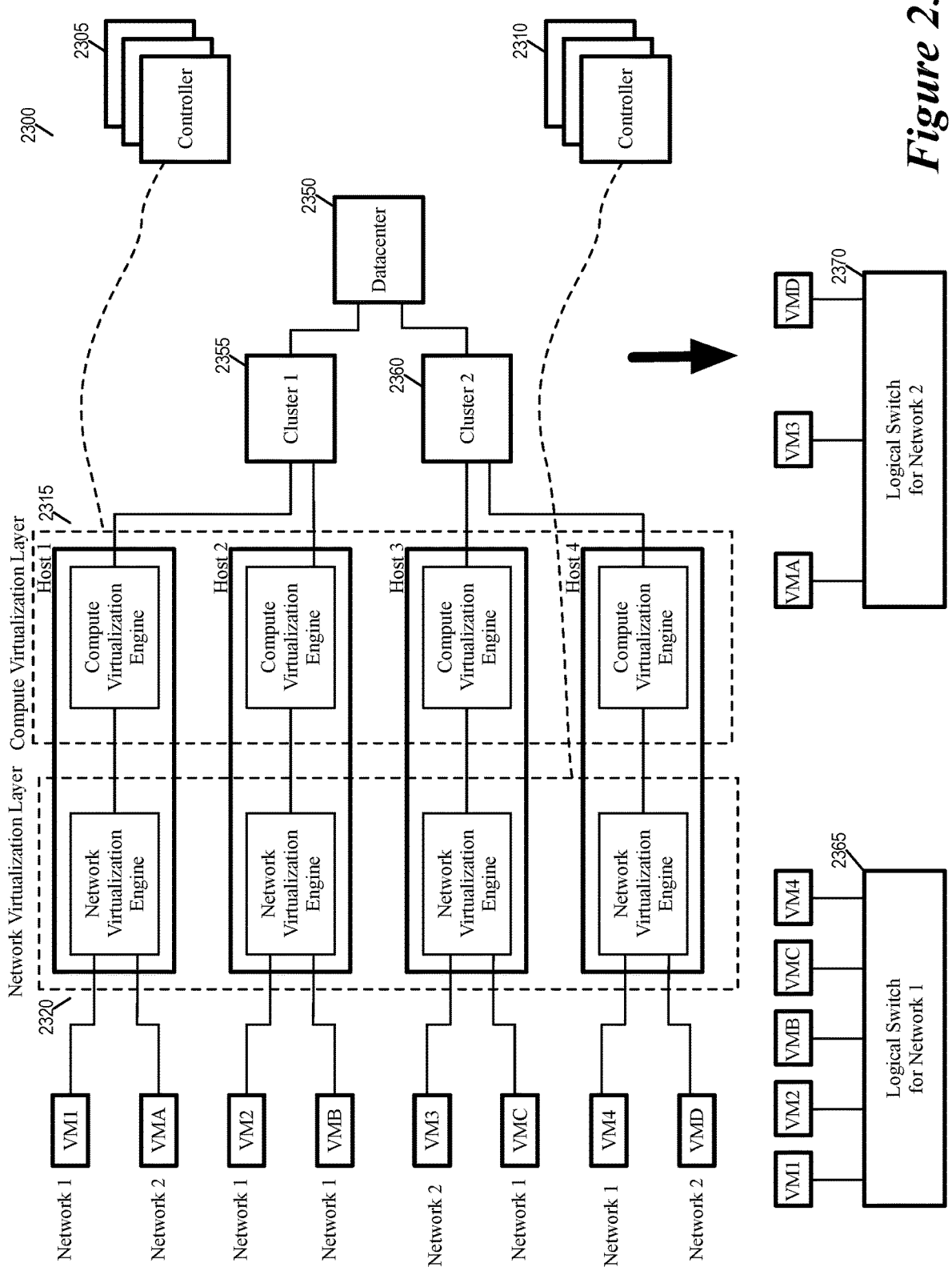
FIG. 23 illustrates another view of a network control system of some embodiments.

FIG. 23 illustrates another view of a network control system 2300 of some embodiments. As shown in this figure, the network control system 2300 uses first and second sets of controllers 2305 and 2310 to control respectively a compute virtualization layer 2315 and a network virtualized layer 2320 in a hosted system that virtualizes its hosts to perform both compute and network virtualization.

In this example, a datacenter 2350 includes two clusters 2355 and 2360, each cluster includes two host computers, and two VMs execute on each host computer. Moreover, the software switches (not shown) of the hosts are virtualized to implement two logical switches 2365 and 2370 that respectively connect five VMs of one tenant and three VMs of another tenant.

In some embodiments, the second set of controllers that manage the network virtualization also provide the AppliedTo firewall configuration and distribution. In other embodiments, a third set of controllers are used to provide the firewall configuration and distribution, while the first and second sets of controllers manage the computer and network virtualization. In still other embodiments, the same set of controllers manages the computer virtualization, the network virtualization and the firewall configuration/distribution.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
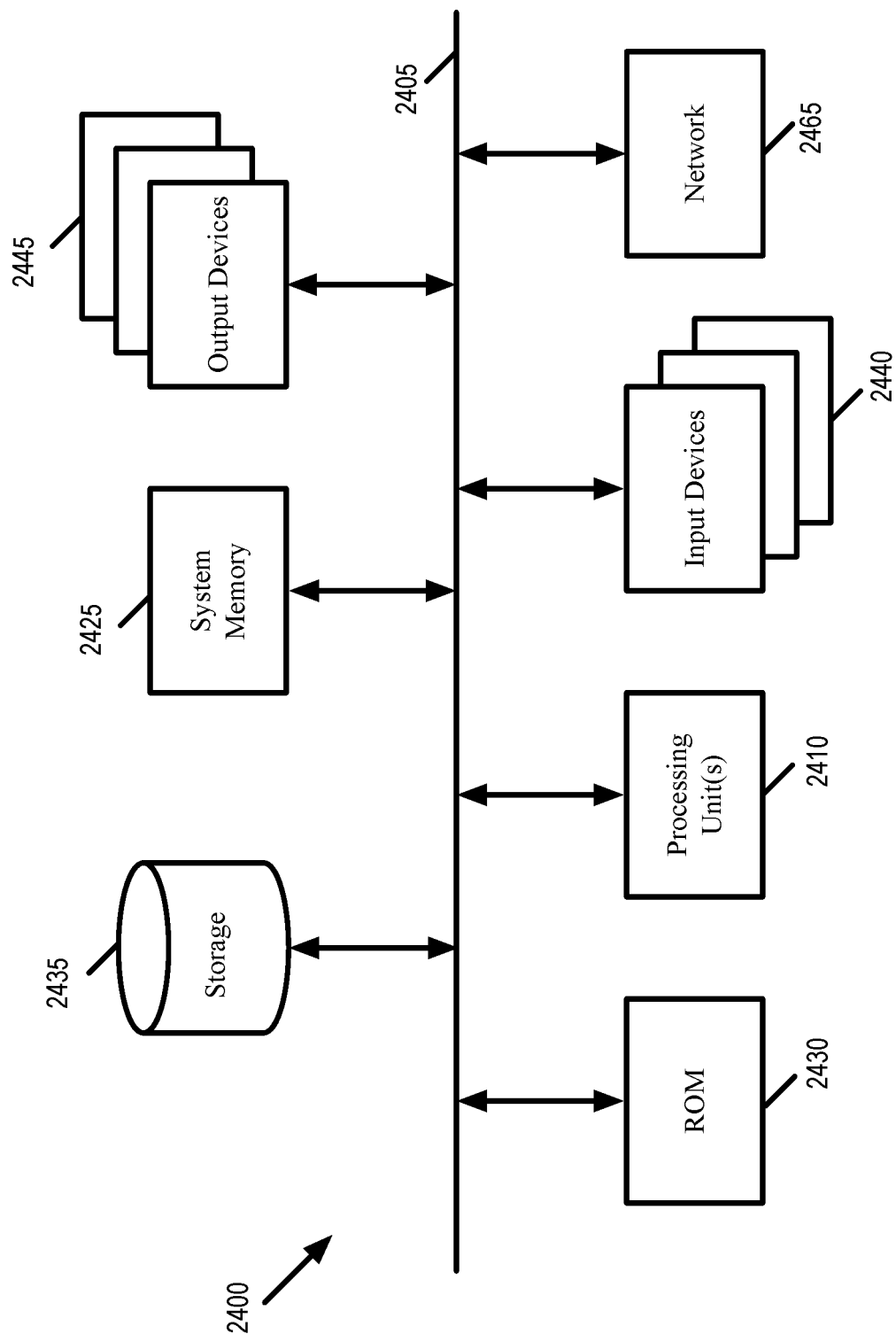
FIG. 24 conceptually illustrates an electronic system with which some embodiments of the invention are implemented.

FIG. 24 conceptually illustrates an electronic system 2400 with which some embodiments of the invention are implemented. The electronic system 2400 can be used to execute any of the control, virtualization, or operating system applications described above. The electronic system 2400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2400 includes a bus 2405, processing unit(s) 2410, a system memory 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the system memory 2425, and the permanent storage device 2435.

From these various memory units, the processing unit(s) 2410 retrieve instructions to execute and data to process in order to execute the processes of the invention. The processing unit(s) may be a single processor or a multi-core processor in different embodiments.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash drive, etc.) as the permanent storage device. Like the permanent storage device 2435, the system memory 2425 is a read-and-write memory device. However, unlike storage device 2435, the system memory is a volatile read-and-write memory, such a random access memory. The system memory stores some of the instructions and data that the processor needs at runtime. In some embodiments, the invention's processes are stored in the system memory 2425, the permanent storage device 2435, and/or the read-only memory 2430. From these various memory units, the processing unit(s) 2410 retrieve instructions to execute and data to process in order to execute the processes of some embodiments.

The bus 2405 also connects to the input and output devices 2440 and 2445. The input devices enable the user to communicate information and select commands to the electronic system. The input devices 2440 include alphanumeric keyboards and pointing devices (also called "cursor control devices"). The output devices 2445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 24, bus 2405 also couples electronic system 2400 to a network 2465 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including high-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. For instance, a number of the figures (including FIGS. 6-8, 11-13, 17-18, and 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which the network manager aggregates firewall rule sets for distribution into host-level or compute-cluster level data storages, before distributing the rules sets to different hosts or different sets of hosts in different clusters. Other embodiments, however, extract the rules differently. For instance, in some embodiments, the rule extractor initially groups the rule into different sets that are for different logical network constructs (e.g., logical switches, logical routers, logical networks, etc.). To distribute these rule sets, the network manager (e.g., the rule extractor or rule distributor) then distributes the rules sets for the different logical network constructs to different hosts or compute clusters that implement the logical network constructs. In view of the foregoing, one of ordinary skill in the art would understand that the invention is not to be limited by the foregoing illustrative details, but rather is to be defined by the appended claims.

What is claimed is:

1. A method for managing firewall protection in a datacenter comprising a plurality of host machines that each hosts a set of data compute nodes, the method comprising:
at a network manager executing on a computer of the datacenter,
receiving a plurality of updates to sections of a firewall rule configuration stored in a firewall rule configuration storage of the datacenter, the firewall rule configuration comprising a plurality of firewall rules that are to be enforced at the plurality of host machines, and associating each updated section with a version number;
using a version number associated with an updated section to identify a host machine in the datacenter that has not received one of the plurality of updates;
generating a host-level firewall configuration update comprising the updates relevant to the identified host machine and associating the host-level firewall configuration update with a particular version number of the version numbers associated with the relevant updates; and
distributing the host-level firewall configuration update to the identified host machine and associating the identified host machine with the particular version number,
wherein said identified host machine uses the host-level firewall configuration update to process packets for a data compute node executing on the identified host machine in accordance with firewall actions specified by the host-level firewall configuration update.

2. The method of claim 1, wherein the plurality of rules in the firewall rule configuration comprises rules that are specified for a plurality of different tenants, wherein the plurality of updates comprises updates from at least two different tenants.

3. The method of claim 1, wherein the identified host machine is a first host machine and the host-level configuration update is a first host-level configuration update, the method further comprising:
identifying a second host machine in the datacenter that has not received one of the plurality of updates;
generating a second host-level firewall configuration update comprising the updates relevant to the identified second host machine and associating the second host-level configuration update with another version number; and
distributing the second host-level firewall configuration update to the identified second host machine and associating the identified second host machine with the other version number,
wherein said identified second host machine uses the second host-level firewall configuration update to process packets for a data compute node executing on the identified second host machine in accordance with firewall actions specified by the second host-level firewall configuration update.

4. The method of claim 1, wherein associating the identified host machine with the particular version number comprises recording the particular version number in a firewall configuration status with a reference to the identified host machine, the firewall configuration status storing a plurality of version numbers associated with host machines.

5. The method of claim 4, wherein distributing the host-level firewall configuration update to the identified host machine and associating the identified host machine with the particular version number further comprise sending the particular version number to the identified host machine and recording the particular version number in the firewall configuration status when an acknowledgement comprising the particular version number is received from the identified host machine.

6. The method of claim 1, wherein each version number is a timestamp captured when a section was updated.

7. The method of claim 1, wherein the particular version number associated with the host-level firewall configuration update is the version number associated with the most recent update of the host-level firewall configuration update.

8. The method of claim 1, wherein the plurality of updates are received via a set of application programming interface (API) routines, wherein each version number is a timestamp captured when an API is invoked for updating a section, wherein a same version number is assigned to a set of at least two sections of the firewall rule configuration when an API is invoked for updating the set of sections, and a same version number is assigned to all sections of the firewall rule configuration when an API for updating the entire firewall rule configuration is invoked.

9. The method of claim 1 further comprising
monitoring for obsolescence of the local-level firewall configuration of the identified host machine by comparing the particular version number with the version numbers associated with the sections of the firewall rule configuration after the local-level firewall configuration update is generated.

10. The method of claim 1, wherein associating an updated section with a version number comprises recording the version number with a reference to the updated section in a version aggregator storing a plurality of version numbers associated with sections.

11. A non-transitory machine readable medium storing a network manager that when executed by at least one processing unit of a computer in a datacenter manages firewall protection in the datacenter, the datacenter comprising a plurality of host machines that each hosts a set of data compute nodes, the network manager comprising sets of instructions for:
receiving a plurality of updates to sections of a firewall rule configuration stored in a firewall rule configuration storage of the datacenter, the firewall rule configuration comprising a plurality of firewall rules that are to be enforced at the plurality of host machines, and associating each updated section with a version number;
using a version number associated with an updated section to identify a host machine in the datacenter that has not received one of the plurality of updates;
generating a host-level firewall configuration update comprising the updates relevant to the identified host machine and associating the host-level configuration update with a particular version number of the version numbers associated with the relevant updates; and
distributing the host-level firewall configuration update to the identified host machine and associating the identified host machine with the particular version number,
wherein said identified host machine uses the host-level firewall configuration update to process packets for a data compute node executing on the identified host machine in accordance with firewall actions specified by the host-level firewall configuration update.

12. The non-transitory machine readable medium of claim 11, wherein the plurality of rules in the firewall rule configuration comprises rules that are specified for a plurality of different tenants, wherein the first plurality of updates comprises updates from at least two different tenants.

13. The non-transitory machine readable medium of claim 11, wherein the identified host machine is a first host machine and the host-level configuration update is a first host-level configuration update, the network manager further comprising sets of instructions for:
identifying a second host machine in the datacenter that has not received one of the plurality of updates;
generating a second host-level firewall configuration update comprising the updates relevant to the identified second host machine and associating the second host-level configuration update with another version number; and
distributing the second host-level firewall configuration update to the identified second host machine and associating the identified second host machine with the other version number,
wherein said identified second host machine uses the second host-level firewall configuration update to process packets for a data compute node executing on the identified second host machine in accordance with firewall actions specified by the second host-level firewall configuration update.

14. The non-transitory machine readable medium of claim 11, wherein the set of instructions for associating the identified host machine with the particular version number comprises recording the particular version number in a firewall configuration status with a reference to the identified host machine, the firewall configuration status storing a plurality of version numbers associated with host machines.

15. The non-transitory machine readable medium of claim 11, wherein each version number is a timestamp captured when a section was updated.

16. The non-transitory machine readable medium of claim 11, wherein the particular version number associated with the host-level firewall configuration update is the version number associated with the most recent update of the host-level firewall configuration update.

17. The non-transitory machine readable medium of claim 11, wherein the sets of instructions for associating an updated section with a version number comprise a set of instructions for recording the version number with a reference to the updated section in a version aggregator, the version aggregator storing a plurality of version numbers associated with sections.

18. The non-transitory machine readable medium of claim 14, wherein the sets of instructions for distributing the host-level firewall configuration update to the identified host machine and associating the identified host machine with the particular version number further comprise sets of instructions for sending the particular version number to the identified host machine and recording the particular version number in the firewall configuration status when an acknowledgement comprising the particular version number is received from the identified host machine.

19. The non-transitory machine readable medium of claim 11, wherein the plurality of updates are received via a set of application programming interface (API) routines, wherein each version number is a timestamp captured when an API is invoked for updating a section, wherein a same version number is assigned to a set of at least two sections of the firewall rule configuration when an API is invoked for updating the set of sections, and a same version number is assigned to all sections of the firewall rule configuration when an API for updating the entire firewall rule configuration is invoked.

20. The non-transitory machine readable medium of claim 11, the network manager further comprising sets of instructions for monitoring for obsolescence of the local-level firewall configuration of the identified host machine by comparing the particular version number with the version numbers associated with the sections of the firewall rule configuration after the local-level firewall configuration update is generated.

* * * * *